US011871763B2

(12) United States Patent
Simmons

(10) Patent No.: US 11,871,763 B2
(45) Date of Patent: Jan. 16, 2024

(54) LOW SUGAR MULTIPHASE FOODSTUFFS

(71) Applicant: Cambridge Glycoscience Ltd, Cambridge (GB)

(72) Inventor: Thomas J. Simmons, Cambridge (GB)

(73) Assignee: CAMBRIDGE GLYCOSCIENCE LTD, Cambridge (GB)

(*) Notice: Subject to any disclaimer, the term of this patent is extended or adjusted under 35 U.S.C. 154(b) by 0 days.

(21) Appl. No.: 17/837,868

(22) Filed: Jun. 10, 2022

(65) Prior Publication Data

US 2022/0304329 A1 Sep. 29, 2022

Related U.S. Application Data

(63) Continuation of application No. PCT/EP2020/085810, filed on Dec. 11, 2020.

(60) Provisional application No. 62/947,433, filed on Dec. 12, 2019, provisional application No. 62/978,696, filed on Feb. 19, 2020.

(51) Int. Cl.
| | |
|---|---|
| A23G 3/42 | (2006.01) |
| A23L 33/24 | (2016.01) |
| A23L 27/30 | (2016.01) |
| A23L 33/125 | (2016.01) |
| A21D 2/18 | (2006.01) |
| A21D 13/06 | (2017.01) |
| A23G 9/34 | (2006.01) |

(52) U.S. Cl.
CPC .............. *A23G 3/42* (2013.01); *A21D 2/181* (2013.01); *A21D 13/06* (2013.01); *A23G 9/34* (2013.01); *A23L 27/30* (2016.08); *A23L 33/125* (2016.08); *A23L 33/24* (2016.08); *A23V 2200/132* (2013.01)

(58) Field of Classification Search
None
See application file for complete search history.

(56) References Cited

U.S. PATENT DOCUMENTS

| | | |
|---|---|---|
| 6,667,066 B2 | 12/2003 | Labeille et al. |
| 7,033,626 B2 | 4/2006 | Spendler et al. |
| 7,151,079 B2 | 12/2006 | Fack et al. |
| 7,378,103 B2 | 5/2008 | Kanji et al. |
| 7,598,069 B2 | 10/2009 | Felby et al. |
| 7,754,456 B2 | 7/2010 | Penttila et al. |
| 7,977,319 B1 | 7/2011 | Levine |
| 7,993,463 B2 | 8/2011 | Griffin et al. |
| 7,993,890 B2 | 8/2011 | Soerensen et al. |

(Continued)

FOREIGN PATENT DOCUMENTS

| | | |
|---|---|---|
| CA | 2831543 A1 | 10/2012 |
| CN | 1482868 A | 3/2004 |

(Continued)

OTHER PUBLICATIONS

Machine translation of JP2008-120789, Ichiro et al., publication date: May 29, 2008. pp. 1-31. (Year: 2008).*

(Continued)

*Primary Examiner* — Jenna A Watts
(74) *Attorney, Agent, or Firm* — Wilson Sonsini Goodrich & Rosati

(57) ABSTRACT

Lower calorie multiphase foodstuffs comprising oligosaccharides, or mixtures thereof, with a perceived sweetness to humans that is at least as sweet as a higher calorie foodstuff are provided herein.

18 Claims, 12 Drawing Sheets

(56) References Cited

U.S. PATENT DOCUMENTS

| | | | |
|---|---|---|---|
| 8,057,840 B2 | 11/2011 | Harrison et al. |
| 8,202,842 B2 | 6/2012 | Sinclair et al. |
| 8,247,200 B2 | 8/2012 | Foody et al. |
| 8,663,952 B2 | 3/2014 | He et al. |
| 8,679,794 B2 | 3/2014 | Muniglia et al. |
| 8,709,763 B2 | 4/2014 | Lali et al. |
| 8,894,771 B2 | 11/2014 | Floyd et al. |
| 8,927,038 B2 | 1/2015 | Broekaert et al. |
| 8,956,846 B2 | 2/2015 | Ben Chaabane et al. |
| 9,062,328 B2 | 6/2015 | Medoff |
| 9,090,916 B2 | 7/2015 | Casanave et al. |
| 9,113,652 B2 | 8/2015 | Pilling et al. |
| 9,150,895 B2 | 10/2015 | Kurihara et al. |
| 9,410,216 B2 | 8/2016 | Eyal et al. |
| 9,458,482 B2 | 10/2016 | Bals et al. |
| 9,580,729 B2 | 2/2017 | Noda et al. |
| 9,605,291 B2 | 3/2017 | Yamada et al. |
| 9,663,836 B2 | 5/2017 | Jansen et al. |
| 9,670,516 B2 | 6/2017 | Minamino et al. |
| 9,783,860 B2 | 10/2017 | Floyd et al. |
| 9,797,021 B2 | 10/2017 | Floyd et al. |
| 9,920,309 B2 | 3/2018 | Reisinger et al. |
| 9,920,346 B2 | 3/2018 | Funada et al. |
| 9,955,707 B2 | 5/2018 | Delbaere |
| 9,963,725 B2 | 5/2018 | Lali et al. |
| 9,963,728 B2 | 5/2018 | Minamino et al. |
| 9,982,280 B2 | 5/2018 | Noordam et al. |
| 9,988,657 B2 | 6/2018 | Nagy et al. |
| 10,041,138 B1 | 8/2018 | Eyal et al. |
| 10,131,923 B2 | 11/2018 | Noordam et al. |
| 10,167,576 B2 | 1/2019 | Chao et al. |
| 10,174,351 B2 | 1/2019 | Smits et al. |
| 10,253,343 B2 | 4/2019 | Yamada et al. |
| 10,351,633 B2 | 7/2019 | Cheng et al. |
| 10,368,569 B2 | 8/2019 | Toksoz et al. |
| 10,426,791 B2 | 10/2019 | Speelmans et al. |
| 10,428,362 B2 | 10/2019 | Nagy et al. |
| 10,472,657 B2 | 11/2019 | Nagy et al. |
| 10,487,369 B2 | 11/2019 | Floyd et al. |
| 10,557,153 B2 | 2/2020 | De et al. |
| 10,563,238 B2 | 2/2020 | Yamada et al. |
| 10,570,432 B2 | 2/2020 | Nishino et al. |
| 10,633,461 B2 | 4/2020 | Richard et al. |
| 10,752,705 B2 | 8/2020 | Geremia et al. |
| 10,858,712 B2 | 12/2020 | Kilambi et al. |
| 11,006,658 B2 | 5/2021 | Simmons |
| 11,134,709 B2 | 10/2021 | Hofmekler |
| 11,151,848 B2 | 10/2021 | Strong et al. |
| 11,180,786 B2 | 11/2021 | Cao et al. |
| 11,193,005 B2 | 12/2021 | Behabtu |
| 11,208,674 B2 | 12/2021 | Konishi et al. |
| 11,248,247 B2 | 2/2022 | Simmons |
| 11,253,818 B2 | 2/2022 | Kurihara et al. |
| 11,254,957 B2 | 2/2022 | Retsina et al. |
| 11,279,960 B2 | 3/2022 | Kasahara et al. |
| 11,297,865 B2 | 4/2022 | Simmons et al. |
| 11,596,165 B2 | 3/2023 | Simmons |
| 11,771,123 B2 | 10/2023 | Simmons et al. |
| 2003/0091691 A1 | 5/2003 | Olsen et al. |
| 2004/0258829 A1 | 12/2004 | Zheng et al. |
| 2007/0248649 A1 | 10/2007 | Sawatzki et al. |
| 2008/0102163 A1* | 5/2008 | O'Toole ................ A21D 13/20 426/61 |
| 2009/0042266 A1 | 2/2009 | Vehmaanpera et al. |
| 2009/0062232 A1 | 3/2009 | Fujikawa et al. |
| 2009/0232892 A1 | 9/2009 | Yamasaki et al. |
| 2009/0305935 A1 | 12/2009 | Cascao-Pereira et al. |
| 2011/0143402 A1 | 6/2011 | De Laat et al. |
| 2011/0171710 A1 | 7/2011 | Yu et al. |
| 2012/0035127 A1 | 2/2012 | Goffin et al. |
| 2012/0115192 A1 | 5/2012 | Lali et al. |
| 2012/0135500 A1 | 5/2012 | Aehle et al. |
| 2012/0231147 A1 | 9/2012 | Srinivasan et al. |
| 2012/0264873 A1 | 10/2012 | Eyal et al. |
| 2013/0095531 A1 | 4/2013 | Schooneveld-Bergmans et al. |
| 2013/0157318 A1 | 6/2013 | Ishikawa et al. |
| 2013/0164420 A1 | 6/2013 | Catani et al. |
| 2014/0030381 A1 | 1/2014 | Markysyan |
| 2014/0306036 A1 | 10/2014 | Sasako et al. |
| 2015/0065454 A1 | 3/2015 | Dupasquier et al. |
| 2016/0007642 A1 | 1/2016 | Geremia et al. |
| 2016/0081381 A1 | 3/2016 | Medoff |
| 2016/0082022 A1 | 3/2016 | Medoff |
| 2016/0208300 A1 | 7/2016 | Yamada et al. |
| 2016/0235098 A1 | 8/2016 | Cox |
| 2016/0326559 A1 | 11/2016 | Funada et al. |
| 2016/0340705 A1 | 11/2016 | Lali et al. |
| 2017/0114371 A1 | 4/2017 | Pedersen et al. |
| 2017/0295805 A1 | 10/2017 | Abu-Hardan et al. |
| 2017/0303548 A1 | 10/2017 | Krogh et al. |
| 2017/0303550 A1 | 10/2017 | Abu-Hardan et al. |
| 2018/0134741 A1 | 5/2018 | Falck |
| 2019/0029272 A1 | 1/2019 | Niemann |
| 2019/0059435 A1 | 2/2019 | Delwiche et al. |
| 2019/0153555 A1 | 5/2019 | Eyal et al. |
| 2019/0233862 A1 | 8/2019 | Cao et al. |
| 2019/0281874 A1 | 9/2019 | Davidek et al. |
| 2020/0071736 A1 | 3/2020 | Hammerer et al. |
| 2020/0113215 A1 | 4/2020 | Hofmekler |
| 2020/0123577 A1 | 4/2020 | De Laat et al. |
| 2020/0128860 A1 | 4/2020 | Hofmekler |
| 2020/0216574 A1 | 7/2020 | Richard et al. |
| 2020/0263265 A1 | 8/2020 | Wu et al. |
| 2020/0299791 A1 | 9/2020 | McKay et al. |
| 2020/0308212 A1 | 10/2020 | Falck |
| 2021/0120855 A1 | 4/2021 | Park et al. |
| 2021/0137965 A1 | 5/2021 | Zhou et al. |
| 2021/0177021 A1 | 6/2021 | Simmons |
| 2021/0207321 A1 | 7/2021 | Loureiro et al. |
| 2021/0227853 A1 | 7/2021 | Pia |
| 2021/0253977 A1 | 8/2021 | Huang et al. |
| 2021/0315245 A1 | 10/2021 | Simmons |
| 2021/0330729 A1 | 10/2021 | Ganz et al. |
| 2021/0347694 A1 | 11/2021 | Havenith et al. |
| 2021/0395284 A1 | 12/2021 | Baur et al. |
| 2022/0017766 A1 | 1/2022 | Kalb |
| 2022/0132868 A1 | 5/2022 | Holden et al. |
| 2022/0132896 A1 | 5/2022 | Kannar et al. |
| 2022/0132897 A1 | 5/2022 | Simmons |

FOREIGN PATENT DOCUMENTS

| | | |
|---|---|---|
| CN | 101272794 A | 9/2008 |
| CN | 101899488 A | 12/2010 |
| CN | 102084055 A | 6/2011 |
| CN | 102925516 A | 2/2013 |
| CN | 103053903 A | 4/2013 |
| CN | 106367449 A | 2/2017 |
| CN | 107746866 A | 3/2018 |
| CN | 108157664 A | 6/2018 |
| CN | 108588144 A | 9/2018 |
| EP | 0438536 B1 | 10/1994 |
| EP | 1228098 B1 | 9/2006 |
| EP | 1466926 B1 | 8/2007 |
| EP | 1751296 B1 | 4/2009 |
| EP | 1699974 B1 | 7/2009 |
| EP | 2255663 A2 | 12/2010 |
| EP | 2256208 A1 | 12/2010 |
| EP | 2235195 B1 | 7/2011 |
| EP | 2076271 B1 | 9/2011 |
| EP | 1871400 B1 | 10/2011 |
| EP | 1811038 B1 | 2/2012 |
| EP | 2225387 B1 | 9/2012 |
| EP | 2265127 B1 | 10/2013 |
| EP | 2665823 A1 | 11/2013 |
| EP | 2427565 B1 | 1/2014 |
| EP | 1977652 B1 | 3/2015 |
| EP | 3010352 A1 | 4/2016 |
| EP | 3013155 A1 | 5/2016 |
| EP | 3037005 A1 | 6/2016 |
| EP | 1706477 B1 | 10/2016 |
| EP | 2313514 B1 | 11/2016 |
| EP | 2784156 B1 | 6/2017 |
| EP | 2817374 B1 | 6/2017 |

(56) References Cited

FOREIGN PATENT DOCUMENTS

| | | |
|---|---|---|
| EP | 2996492 B1 | 7/2017 |
| EP | 3041941 B1 | 12/2017 |
| EP | 2548966 B1 | 7/2018 |
| EP | 2548965 B1 | 8/2018 |
| EP | 3374315 A1 | 9/2018 |
| EP | 2117322 B1 | 10/2018 |
| EP | 3177728 B1 | 10/2018 |
| EP | 3177729 B1 | 10/2018 |
| EP | 3182830 B1 | 10/2018 |
| EP | 3190189 B1 | 12/2018 |
| EP | 3415632 A1 | 12/2018 |
| EP | 3438272 A1 | 2/2019 |
| EP | 2734633 B1 | 5/2019 |
| EP | 2917359 B1 | 7/2019 |
| EP | 3511418 A1 | 7/2019 |
| EP | 3530743 A1 | 8/2019 |
| EP | 3541870 A1 | 9/2019 |
| EP | 2917355 B1 | 10/2019 |
| EP | 3088530 B1 | 4/2020 |
| EP | 3511418 B1 | 7/2020 |
| EP | 3737769 A1 | 11/2020 |
| EP | 3010352 B1 | 12/2020 |
| EP | 3784045 A1 | 3/2021 |
| EP | 3815540 A1 | 5/2021 |
| EP | 3960772 A1 | 3/2022 |
| EP | 3981379 A2 | 4/2022 |
| EP | 3993644 A1 | 5/2022 |
| EP | 3438272 B1 | 6/2022 |
| JP | S5840066 A | 3/1983 |
| JP | H10117800 A | 5/1998 |
| JP | 2003334000 A | 11/2003 |
| JP | 2006087319 A | 4/2006 |
| JP | 2007049914 A | 3/2007 |
| JP | 2008120789 A | 5/2008 |
| JP | 2009089626 A | 4/2009 |
| JP | 2009125064 A | 6/2009 |
| JP | 2010200720 A | 9/2010 |
| JP | 2010215556 A | 9/2010 |
| JP | 2010226995 A | 10/2010 |
| JP | 2012527886 A | 11/2012 |
| JP | 2014140347 A | 8/2014 |
| JP | 2017502701 A | 1/2017 |
| KR | 20190133438 A | 12/2019 |
| WO | WO-8902225 A1 | 3/1989 |
| WO | WO-2012076911 A2 | 6/2012 |
| WO | WO-2012107204 A1 | 8/2012 |
| WO | WO-2012133495 A1 | 10/2012 |
| WO | WO-2012141256 A1 | 10/2012 |
| WO | WO-2013016115 A1 | 1/2013 |
| WO | WO-2013096603 A2 | 6/2013 |
| WO | WO-2013159005 A2 | 10/2013 |
| WO | WO-2014170498 A1 | 10/2014 |
| WO | WO-2015107413 A1 | 7/2015 |
| WO | WO-2017057718 A1 | 4/2017 |
| WO | WO-2017107527 A1 | 6/2017 |
| WO | WO-2018106656 A1 | 6/2018 |
| WO | WO-2019010336 A1 | 1/2019 |
| WO | WO-2019055717 A1 | 3/2019 |
| WO | WO-2019102218 A2 | 5/2019 |
| WO | WO-2019138024 A1 | 7/2019 |
| WO | WO-2019162416 A1 | 8/2019 |
| WO | WO-2019227525 A1 | 12/2019 |
| WO | WO-2019229228 A1 | 12/2019 |
| WO | WO-2019239366 A1 | 12/2019 |
| WO | WO-2020009964 A1 | 1/2020 |
| WO | WO-2020035599 A1 | 2/2020 |
| WO | WO-2020097458 A1 | 5/2020 |
| WO | WO-2021032647 A1 | 2/2021 |
| WO | WO-2021074271 A1 | 4/2021 |
| WO | WO-2021074316 A1 | 4/2021 |
| WO | WO-2021116437 A2 | 6/2021 |
| WO | WO-2021116437 A3 | 7/2021 |
| WO | WO-2021140225 A1 | 7/2021 |
| WO | WO-2021144282 A1 | 7/2021 |
| WO | WO-2021243151 A1 | 12/2021 |
| WO | WO-2021257921 A1 | 12/2021 |
| WO | WO-2022034078 A1 | 2/2022 |
| WO | WO-2022060726 A1 | 3/2022 |
| WO | WO-2022067131 A1 | 3/2022 |
| WO | WO-2022069084 A1 | 4/2022 |
| WO | WO-2022073646 A1 | 4/2022 |
| WO | WO-2023187211 A1 | 10/2023 |
| WO | WO-2023187213 A1 | 10/2023 |

OTHER PUBLICATIONS

Machine translation of JP2009-089626, Mitsuyo et al., publication date: Apr. 30, 2009. pp. 1-26. (Year: 2009).*
Co-pending U.S. Appl. No. 17/846,188, inventors Simmons; Thomas J. et al., filed on Jun. 22, 2022.
Co-pending U.S. Appl. No. 17/858,609, inventors Simmons; Thomas J. et al., filed on Jul. 6, 2022.
Co-pending U.S. Appl. No. 17/865,142, inventors Bartosiak-Jentys; Jeremy et al., filed on Jul. 14, 2022.
Aachary et al. Xylooligosaccharides (XOS) as an Emerging Prebiotic: Microbial Synthesis, Utilization, Structural Characterization, Bioactive Properties, and Applications. Comprehensive Reviews in Food Science and Food Safety, vol. 10, pp. 2-16 (2011).
Basholli-Salihu et al. The Use of Cellobiose and Fructooligosaccharide on Growth and Stability of *Bifidobacterium infantis* in Fermented Milk. Food and Nutrition Sciences, 2013, 4, 1301-1306. Published Online Dec. 2013. DOI: http://dx.doi.org/10.4236/fns.2013.412167.
Beldman et al. Application of cellulase and pectinase from fungal origin for the liquefaction and saccharification of biomass. Enzyme and Microbial Technology, vol. 6, Issue 11, pp. 503-507 (Nov. 1984). DOI: https://doi.org/10.1016/0141-0229(84)90004-8.
Bhale et al. Enzymatic activity of *Trichoderma* species. Novus Natural Science Research, 2012, vol. 1, No. 4. 8 pages.
Brijwani et al. Production of a cellulolytic enzyme system in mixed-culture solid-state fermentation of soybean hulls supplemented with wheat bran. Process Biochemistry, vol. 45, No. 1, 120-128 (2010).
Chen et al. Characterization of a novel xylanase from Aspergillus flavus with the unique properties in production of xylooligosaccharides. J Basic Microbiol. Apr. 2019;59(4):351-358. doi: 10.1002/jobm.201800545. Epub Feb. 12, 2019.
Chica, et al. Semi-rational approaches to engineering enzyme activity: combining the benefits of directed evolution and rational design. Curr Opin Biotechnol. Aug. 2005;16(4):378-84.
Co-pending U.S. Appl. No. 17/691,931, inventors Simmons; Thomas J. et al., filed on Mar. 10, 2022.
Dallabernardina et al. Mixed-Linkage Glucan Oligosaccharides Produced by Automated Glycan Assembly Serve as Tools To Determine the Substrate Specificity of Lichenase.Chemistry. Mar. 2, 2017;23(13):3191-3196. doi: 10.1002/chem.201605479. Epub Feb. 3, 2017.
Danneels et al. A quantitative indicator diagram for lytic polysaccharide monooxygenases reveals the role of aromatic surface residues in HjLPMO9A regioselectivity. PLoS One. 2017; 12(5): e0178446. Published online May 31, 2017. doi: 10.1371/journal.pone.0178446.
De La Fuente et al. Development of a robust method for the quantitative determination of disaccharides in honey by gas chromatography. J Chromatogr A, 1135 (2006) 212-218.
Dos Santos et al. Structural basis for xyloglucan specificity and α-d-Xylp(1 → 6)-D-Glcp recognition at the −1 subsite within the GH5 family. Biochemistry. Mar. 17, 2015;54(10):1930-42. doi: 10.1021/acs.biochem.5b00011. Epub Mar. 6, 2015.
EFSA Panel on Dietetic Products, Nutrition and Allergies (NDA) (2018). Safety of xylo-oligosaccharides (XOS) as a novel food pursuant to Regulation (EU) 2015/2283: (Scientific Opinion). E F S A Journal, 16(7), [5361]. DOI: https://doi.org/10.2903/j.efsa.2018.5361. 20 pages.
El Khoury et al. Beta Glucan: Health Benefits in Obesity and Metabolic Syndrome. J Nutr Metab. 2012; 2012: 851362. Published online Dec. 11, 2011. doi: 10.1155/2012/851362. 28 pages.

(56) References Cited

OTHER PUBLICATIONS

EP18157957.4 Extended European Search Report dated Jul. 13, 2018.

Falck et al. Arabinoxylanase from glycoside hydrolase family 5 is a selective enzyme for production of specific arabinoxylooligosaccharides. Food Chem. Mar. 1, 2018;242:579-584. doi: 10.1016/j.foodchem.2017.09.048. Epub Sep. 12, 2017.

Fanuel et al. The Podospora anserina lytic polysaccharide monooxygenase PaLPMO9H catalyzes oxidative cleavage of diverse plant cell wall matrix glycans. Biotechnol Biofuels. 2017; 10: 63. Published online Mar. 11, 2017. doi: 10.1186/s13068-017-0749-5.

Gorton. Spare the sugar. bakingbusiness.com. Mar. 31, 2013. Retrieved Sep. 16, 2020 from: https://www.bakingbusiness.com/articles/34774-spare-the-sugar. 8 pages.

Goubet et al. Polysaccharide analysis using carbohydrate gel electrophoresis: a method to study plant cell wall polysaccharides and polysaccharide hydrolases. Anal Biochem. Jan. 1, 2002;300(1):53-68.

GRAS Notification—Claim of GRAS Status (Revised May 21, 2010), Claim of Exemption from the Requirement for Premarket Approval Requirements Pursuant to Proposed 21 CFR § 170.36(c)(1), pp. 000007 and 000015. EAS Consulting Group, LLC, Alexandria, Virginia, USA. Retrieved Dec. 2 from URL: http://wayback.archive-it.org/7993/20171031045331/https://www.fda.gov/downloads/Food/IngredientsPackagingLabeling/GRAS/NoticeInventory/UCM269544.pdf.

Greek Yogurt with Honey Base, Database Accession No. 4046243, Database GNPD online (Jun. 6, 2016). Mintel. 4 pages.

Green et al. Industrial Fungal Enzymes: An Occupational Allergen Perspective. Journal of Allergy, vol. 2011, Article ID 682574, 11 pages.

Gupta et al. Xylooligosaccharide—A Valuable Material from Waste to Taste: A Review. J Environ Res Develop, vol. 10, No. 3, pp. 555-563 (Jan.-Mar. 2016).

Hakala et al. Enzyme-aided alkaline extraction of oligosaccharides and polymeric xylan from hardwood kraft pulp. Carbohydr Polym. Mar. 1, 2013;93(1):102-8. doi: 10.1016/j.carbpol.2012.05.013. Epub May 11, 2012.

Hang et al. Enzymatic Production of Soluble Sugars from Corn Husks. LWT—Food Science and Technology, vol. 32, Issue 4, pp. 208-210 (Jun. 1999). DOI: https://doi.org/10.1006/fstl.1998.0530.

Jayapal et al. Value addition to sugarcane bagasse: Xylan extraction and its process optimization for xylooligosaccharides production. Industrial Crops and Products, vol. 42, pp. 14-24 (2013).

Jousse et al. Simplified Kinetic Scheme of Flavor Formation by the Maillard Reaction. Journal of Food Science, vol. 67, No. 7, pp. 2534-2542 (2002).

Karadeniz et al. Sugar composition of apple juices. European Food Research and Technology, vol. 215, pp. 145-148 (2002).

Kracher et al. Active-site copper reduction promotes substrate binding of fungal lytic polysaccharide monooxygenase and reduces stability. J Biol Chem. Feb. 2, 2018; 293(5): 1676-1687. Published online Dec. 19, 2017. doi: 10.1074/jbc.RA117.000109.

Kuhad et al. Microbial Cellulases and Their Industrial Applications. Enzyme Res. 2011; 2011: 280696. Published online Sep. 7, 2011. doi: 10.4061/2011/280696.

Lecumberri et al. A diet rich in dietary fiber from cocoa improves lipid profile and reduces malondialdehyde in hypercholesterolemic rats. Nutrition. Apr. 2007;23(4):332-41. doi: 10.1016/j.nut.2007.01.013. Epub Mar. 23, 2007.

Linares-Pastén et al. Structural Considerations on the Use of Endo-Xylanases for the Production of prebiotic Xylooligosaccharides from Biomass. Curr Protein Pept Sci. Jan. 2018; 19(1): 48-67. Published online Jan. 2018. doi: 10.2174/1389203717666160923155209.

Loose et al. Activation of bacterial lytic polysaccharide monooxygenases with cellobiose dehydrogenase. Protein Sci. Dec. 2016; 25(12): 2175-2186. Published online Sep. 26, 2016. doi: 10.1002/pro.3043.

Lu et al. Extraction and modification of hemicellulose from lignocellulosic biomass: A review. Green Processing and Synthesis 2021; 10: 779-804.

Maehara et al. GH30 Glucuronoxylan-Specific Xylanase from *Streptomyces turgidiscabies* C56. Appl Environ Microbiol. Feb. 15, 2018; 84(4): e01850-17. Published online Jan. 31, 2018. Prepublished online Nov. 27, 2017.

Mathew et al. Xylo- and arabinoxylooligosaccharides from wheat bran by endoxylanases, utilisation by probiotic bacteria, and structural studies of the enzymes. Appl Microbiol Biotechnol. Apr. 2018;102(7):3105-3120. doi: 10.1007/s00253-018-8823-x. Epub Feb. 14, 2018.

Meier et al. Oxygen Activation by Cu LPMOs in Recalcitrant Carbohydrate Polysaccharide Conversion to Monomer Sugars. Chem Rev. Mar. 14, 2018; 118(5): 2593-2635. Published online Nov. 20, 2017. doi: 10.1021/acs.chemrev.7b00421.

Motta et al. Chapter 10: "A Review of Xylanase Production by the Fermentation of Xylan: Classification, Characterization and Applications," pp. 251-275. In Sustainable Degradation of Lignocellulosic Biomass, Chandel and Da Silva, eds. (May 15, 2013).

Nordberg Karlsson et al. Endo-xylanases as tools for production of substituted xylooligosaccharides with prebiotic properties. Appl Microbiol Biotechnol. 2018; 102(21): 9081-9088. Published online Sep. 8, 2018. doi: 10.1007/s00253-018-9343-4.

Park et al. Effect of fructo-oligosaccharide and isomalto-oligosaccharide addition on baking quality of frozen dough. Food Chem. Dec. 15, 2016;213:157-162. doi: 10.1016/j.foodchem.2016.06.067. Epub Jun. 21, 2016.

PCT/EP2019/054380 International Search Report and Written Opinion dated Jun. 27, 2019.

PCT/EP2019/072026 International Search Report and Written Opinion dated Dec. 2, 2019.

PCT/EP2020/072929 International Search Report and Written Opinion dated Dec. 8, 2020.

PCT/EP2020/085810 International Search Report and Written Opinion dated Jun. 9, 2021.

PCT/EP2021/050311 International Search Report and Written Opinion dated May 3, 2021.

Qi et al. Application of ultrafiltration and nanofiltration for recycling cellulase and concentrating glucose from enzymatic hydrolyzate of steam exploded wheat straw. Bioresour Technol. Jan. 2012;104:466-72. doi: 10.1016/j.biortech.2011.10.049. Epub Oct. 31, 2011.

Qing et al. "Chapter 19: Xylooligosaccharides Production, Quantification, and Characterization in Context of Lignocellulosic Biomass Pretreatment," pp. 391-415. In Aqueous Pretreatment of Plant Biomass forBiological and Chemical Conversion to Fuels and Chemicals, First Edition.Edited by Charles E. Wyman (2013).

Réhault-Godbert et al. The Golden Egg: Nutritional Value, Bioactivities, and Emerging Benefits for Human Health. Nutrients 11, 684 (Mar. 22, 2019). 26 pages.

Schmiele et al. Mixolab™ for rheological evaluation of wheat flour partially replaced by soy protein hydrolysate and fructooligosaccharides for bread production. LWT—Food Science and Technology, vol. 76, Part B, pp. 259-269 (Mar. 2017). Available online Jul. 5, 2016. DOI: https://doi.org/10.1016/j.lwt.2016.07.014.

Short-Chain Fructooligosaccharides: Handling/Processing. Technical Evaluation Report. U.S. Department of Agriculture (USDA) Agricultural Marketing Service (AMS). Aug. 11, 2006. Retrieved Sep. 16, 2020 from URL: https://www.ams.usda.gov/sites/default/files/media/Fructooligosaccharides%20TR.pdf, 7 pages.

Simmons et al. An unexpectedly lichenase-stable hexasaccharide from cereal, horsetail and lichen mixed-linkage β-glucans (MLGs): implications for MLG subunit distribution. Phytochemistry. Nov. 2013;95:322-32. doi: 10.1016/j.phytochem.2013.08.003. Epub Sep. 8, 2013.

Simmons et al. Bonds broken and formed during the mixed-linkage glucan : xyloglucan endotransglucosylase reaction catalysed by Equisetum hetero-trans-β-glucanase.Biochem J. Apr. 1, 2017; 474(7): 1055-1070. Published online Mar. 8, 2017. Prepublished online Jan. 20, 2017. doi: 10.1042/BCJ20160935.

Simmons et al. Structural and electronic determinants of lytic polysaccharide monooxygenase reactivity on polysaccharide sub-

(56) References Cited

OTHER PUBLICATIONS strates. Nat Commun. 2017; 8: 1064. Published online Oct. 20, 2017. doi: 10.1038/s41467-017-01247-3.
Singh et al. Protein Engineering Approaches in the Post-Genomic Era. Curr Protein Pept Sci. 18: 1-11 (2017).
Sun et al. Hydrolysis of lignocellulosic materials for ethanol production: a review. Bioresour Technol. May 2002;83(1):1-11. doi: 10.1016/s0960-8524(01)00212-7.
Tanaka et al. Creation of cellobiose and xylooligosaccharides-coutilizing *Escherichia coli* displaying both β-glucosidase and β-xylosidase on its cell surface. ACS Synth. Biol. 2014, 3, 7, 446-453. Published online Oct. 24, 2013. DOI: https://doi.org/10.1021/sb400070q.
U.S. Appl. No. 16/844,960 Notice of Allowance dated Feb. 3, 2021.
U.S. Appl. No. 16/844,960 Office Action dated Sep. 22, 2020.
U.S. Appl. No. 17/033,321 Notice of Allowance dated Oct. 6, 2021.
U.S. Appl. No. 17/033,321 Office Action dated Aug. 2, 2021.
U.S. Appl. No. 17/033,321 Office Action dated Jan. 11, 2021.
U.S. Appl. No. 17/083,121 Notice of Allowance dated Aug. 23, 2021.
U.S. Appl. No. 17/083,121 Notice of Allowance dated Dec. 8, 2021.
U.S. Appl. No. 17/083,121 Office Action dated May 14, 2021.
U.S. Appl. No. 17/571,199 Office Action dated Apr. 28, 2022.
Villares et al. Lytic polysaccharide monooxygenases disrupt the cellulose fibers structure. Sci Rep. 2017; 7: 40262. Published online Jan. 10, 2017. doi: 10.1038/srep40262.
Wang et al. Relative fermentation of oligosaccharides from human milk and plants by gut microbes. European Food Research and Technology, vol. 243, pp. 133-146 (2017). Published online Jun. 20, 2016.
Watanabe, Eiichi. Membrane Separation in Cellulose Saccharification and Mixed Enzyme Culture Liquid Recycling. [Medicine and Biology, vol. No. 119, Issue No. 3, Sep. 10, 1989]. 7 pages.
Xiao et al. Application of Xylo-oligosaccharide in modifying human intestinal function. African Journal of Microbiology Research 6(9):2116-2119 (Mar. 9, 2012).
Zhang et al. Hemicellulose isolation, characterization, and the production of xylo-oligosaccharides from the wastewater of a viscose fiber mill. Carbohydr Polym. May 5, 2016;141:238-43. doi: 10.1016/j.carbpol.2016.01.022. Epub Jan. 12, 2016.
U.S. Appl. No. 17/229,628 Office Action dated Nov. 10, 2022.
U.S. Appl. No. 17/571,199 Notice of Allowance dated Oct. 14, 2022.
U.S. Appl. No. 17/571,199 Office Action dated Sep. 7, 2022.
U.S. Appl. No. 17/846,188 Office Action dated Nov. 28, 2022.
U.S. Appl. No. 17/865,142 Office Action dated Oct. 25, 2022.
Farahnaky et al. The impact of concentration, temperature and pH on dynamic rheology of psyllium gels. Journal of Food Engineering, vol. 100, Issue 2, pp. 294-301 (2010). Available online Apr. 18, 2010.
Laser Diffraction. (Web Page). Malvern Panalytical. URL: https://www.malvernpanalytical.com/en/products/technology/light-scattering/laser-diffraction. 4 pages. Mar. 7, 2023. Retrieved May 4, 2023 from Internet Archive Wayback Machine at URL: https://web.archive.org/web/20230307025844/https://www.malvernpanalytical.com/en/products/technology/light-scattering/laser-diffraction.
Singh et al. Mannans: An overview of properties and application in food products. International Journal of Biological Macromolecules, vol. 119, pp. 79-95 (2018). Available online Jul. 23, 2018.
U.S. Appl. No. 17/229,628 Office Action dated Apr. 5, 2023.
U.S. Appl. No. 17/571,199 Notice of Allowance dated Feb. 7, 2023.
U.S. Appl. No. 17/846,188 Office Action dated Mar. 21, 2023.
U.S. Appl. No. 17/865,142 Office Action dated Apr. 3, 2023.
Maple et al. Detailed Tautomeric Equilibrium of Aqueous D-Glucose. Observation of Six Tautomers by Ultrahigh Resolution Carbon-13 NMR. J Am Chem Soc 1987, 109, 3168-3169.
PCT/EP2023/058589 Invitation to Pay Additional Fees and Provisional Opinion dated Jul. 11, 2023.
PCT/EP2023/058592 Invitation to Pay Additional Fees and Provisional Opinion dated Jul. 14, 2023.
Senevirathne et al. Effect of Mixed Microbial Culture Treatment on the Nutritive Value of Coffee, Green Tea and Oolong Tea Residues and the Effect of the Fermented Residues on in Vitro Rumen Fermentation. APCBEE Procedia 4 (2012) 66-72.
U.S. Appl. No. 16/999,483 Office Action dated Jul. 28, 2023.
U.S. Appl. No. 17/229,628 Notice of Allowance dated Jun. 20, 2023.
U.S. Appl. No. 17/846,188 Notice of Allowance dated Aug. 14, 2023.
U.S. Appl. No. 17/846,188 Notice of Allowance dated Aug. 24, 2023.
U.S. Appl. No. 17/846,188 Notice of Allowance dated Jun. 20, 2023.
U.S. Appl. No. 17/846,188 Notice of Allowance dated May 30, 2023.
Zannini et al. Arabinoxylans as Functional Food Ingredients: A Review. Foods 11, 1026 (Apr. 1, 2022). 28 pages.
Zivkovic et al. Bovine Milk as a Source of Functional Oligosaccharides for Improving Human Health. Adv Nutr 2:284-289 (2011).
Co-pending U.S. Appl. No. 18/465,833, inventor Simmons; Thomas J., filed Sep. 12, 2023.
PCT/EP2023/058589 International Search Report and Written Opinion dated Sep. 1, 2023.
PCT/EP2023/058592 International Search Report and Written Opinion dated Sep. 22, 2023.
U.S. Appl. No. 17/229,628 Notice of Allowance dated Sep. 15, 2023.

\* cited by examiner

LOW SUGAR MULTIPHASE FOODSTUFFS

CROSS REFERENCE

This application is a continuation of International Application No. PCT/EP2020/085810, filed Dec. 11, 2020, which claims the benefit of U.S. Provisional Patent Application No. 62/947,433, filed Dec. 12, 2019, and U.S. Provisional Patent Application No. 62/978,696, filed Feb. 19, 2020, each of which is hereby incorporated by reference in their entirety.

BACKGROUND

Sugary foods and drinks are an important part of cultural and lifestyle habits across the world, but the sugar they contain has been linked to obesity, diabetes, poor dental health, and disruptive behavior in people. Because of this, consumer preferences have been shifting away from sugar-containing foods, and governments are increasingly implementing regulation to encourage the consumption of less sugar.

As such, industry has been searching for appropriate low-calorie sweeteners for many decades to substitute for sugar in food and beverages. Unfortunately, many sugar substitutes are produced from non-natural resources, and often offer bitter undertones or other unpleasant tastes along with their sweetness, both of which consumers find unappealing. Moreover, while many sweeteners are able to mimic the sweetness of sugar in food and drinks, few are able to mimic the broad range of roles that sugar plays in food, such as adding bulk, modulating texture, providing structure, acting as a preservative, and modulating color and flavor through caramelization and Maillard reactions. In addition, many bulking sweeteners that are able to mimic these physical properties of sugar have gastrointestinal tolerance issues that limit their use to levels well below the amount required to replace sugar in a standard Western diet.

SUMMARY

In some cases, a foodstuff may comprise: a first phase comprising cello-oligosaccharides with a degree of polymerization (DP) from two to six and xylo-oligosaccharides with a DP from two to twelve, wherein the first phase may comprise from 5% to 95% by dry weight of the cello-oligosaccharides and the xylo-oligosaccharides; and a second phase comprising a sweetener comprising at least one of glucose, fructose, galactose, sucrose, maltose, or lactose, wherein the second phase may comprise from 10% to 100% by dry weight of the sweetener. In some cases, the cello-oligosaccharides and xylo-oligosaccharides may be present at a w/w ratio of 5:95 to 95:5 in the foodstuff.

In some cases, the cello-oligosaccharides and xylo-oligosaccharides may be present at a w/w ratio of 5:95 to 95:5 in the first phase. In some cases, cello-oligosaccharides and xylo-oligosaccharides may be present at a w/w ratio of 5:95 to 95:5 in the second phase. In some cases, the first phase may comprise less than 25% by dry weight of the sweetener. In some cases, the second phase may comprise less than 50% by dry weight of the cello-oligosaccharides and the xylo-oligosaccharides.

In some cases, the foodstuff may comprise from 5% to 50% by dry weight of the sweetener. In some cases, the foodstuff may comprise from 5% to 75% by dry weight of the cello-oligosaccharides and the xylo-oligosaccharides. In some cases, a ratio of the first phase to the second phase may be from 10:1 to 1:10 by dry weight.

In some cases, the first phase may be a fat-based composition, water-based composition, or bakery composition. In some cases, the second phase may be a fat-based composition, water-based composition, or bakery composition. In some cases, the first phase may be a bakery composition and the second phase may be a fat-based composition. In some cases, the first phase may be a bakery composition and the second phase may be a water-based composition. In some cases, the first phase may be a fat-based composition and the second phase may be a water-based composition. In some cases, the second phase may be a bakery composition and the first phase may be a fat-based composition. In some cases, the second phase may be a bakery composition and the first phase may be a water-based composition. In some cases, the second phase may be a fat-based composition and the first phase may be a water-based composition.

In certain cases, a foodstuff may comprise: a first phase comprising at least one type of oligosaccharide selected from: cello-oligosaccharides with a degree of polymerization (DP) from two to six; xylo-oligosaccharides with a DP from two to twelve; manno-oligosaccharides having a DP from two to twelve; mixed-linkage glucan oligosaccharides with a DP from two to five; and xyloglucan oligosaccharides having a DP from four to twelve; and a second phase comprising a monosaccharide, a disaccharide, or both.

In certain cases, the first phase may comprise at least two types of oligosaccharide selected from: cello-oligosaccharides with a DP from two to six; xylo-oligosaccharides with a DP from two to twelve; manno-oligosaccharides having a DP from two to twelve; mixed-linkage glucan oligosaccharides with a DP from two to five; and xyloglucan oligosaccharides having a DP from four to twelve.

In certain cases, the first phase may be different than the second phase. An average density of the first phase may be less than an average density of the second phase. The average density of the second phase may be at least 1.5 times, 2 times, 5 times, or 10 times greater than the average density of the first phase. An average density of the second phase may be less than an average density of the first phase. The average density of the first phase may be at least 1.5 times, 2 times, 5 times, or 10 times greater than the average density of the second phase.

In certain cases, an average sweetness level of the first phase w/w may be less than an average sweetness level of the second phase w/w. The sweetness level may be a sweetness perception by a human subject.

In certain cases, the second phase may be at least 1.5 times, 2 times, 5 times, or 10 times sweeter than the first phase. In certain cases, the total mass of the at least one type of oligosaccharide in the first phase may be equal to at least 1.5 times, 2.0 times, 2.5 times, 3.0 times, 3.5 times, 4.0 times, 4.5 times, 5.0 times the total mass of the at least one monosaccharide or disaccharide in the second phase.

In certain cases, the first phase may be substantially uniformly dispersed throughout the foodstuff. The second phase may be nonuniformly dispersed throughout the foodstuff. The second phase may be nonuniformly dispersed throughout the first phase. The second phase may comprise particles from 1 mm to 20 mm, 2 mm to 16 mm, or 3 mm to 12 mm thick.

In certain cases, the second phase may be disposed on a portion of an outer surface of the first phase. In certain cases, the second phase may be coated on a portion of an outer surface of the first phase. In certain cases, the second phase may be disposed on a portion of an outer surface of the foodstuff. In certain cases, the second phase may be coated on a portion of an outer surface of the foodstuff. In certain cases, the second phase may be disposed within a portion of the first phase. In certain cases, the second phase may be disposed within a portion of the foodstuff. In certain cases, the second phase may form a layer from 1 mm to 10 mm, 1.5 mm to 8 mm, or 2 mm to 6 mm thick.

In certain cases, a volume of the first phase may be greater than a volume of the second phase in the foodstuff. In certain cases, the volume of the first phase may be 1.5 times, 2 times, 5 times, or 10 times greater than the volume of the second phase in the foodstuff. In certain cases, a mass of the first phase may be greater than a mass of the second phase in the foodstuff. In certain cases, the mass of the first phase may be 1.5 times, 2 times, 5 times, or 10 times greater than the mass of the second phase in the foodstuff. In certain cases, the foodstuff may comprise a polysaccharide, wherein the polysaccharide may be a cellulosic polysaccharide, a hemicellulosic polysaccharide, a polysaccharide derivative, or a polysaccharide aggregate. In certain cases, the first phase may comprise a polysaccharide, wherein the polysaccharide may be a cellulosic polysaccharide, a hemicellulosic polysaccharide, a polysaccharide derivative, or a polysaccharide aggregate.

In certain cases, the second phase may comprise a polysaccharide, wherein the polysaccharide may be a cellulosic polysaccharide, a hemicellulosic polysaccharide, a polysaccharide derivative, or a polysaccharide aggregate. In certain cases, the polysaccharide may be a cellulosic polysaccharide. In certain cases, the hemicellulosic polysaccharide may be xylan. In certain cases, the hemicellulosic polysaccharide may be mannan. In certain cases, the polysaccharide derivative may be carboxymethylcellulose. In certain cases, the polysaccharide aggregate may be lignocellulosic material, for example, partially digested lignocellulosic material, such as from an enzymatic reaction that produced the oligosaccharides.

In certain cases, the foodstuff may comprise less than 15% by dry weight of the polysaccharide. In certain cases, the first phase may comprise less than 15% by dry weight of the polysaccharide. In certain cases, the second phase may be substantially free of the polysaccharide. In certain cases, the first phase may comprise oligosaccharides that have been subjected to a browning reaction. In certain cases, the first phase may comprise oligosaccharides that have been subjected to a caramelization or a Mailliard reaction. In certain cases, the first phase and/or the second phase may be substantially free of one or more allergens, wherein the one or more allergens may be selected from wheat gluten, nuts, dairy, or egg.

In certain cases, the first phase may be formed from a dough, batter, paste, cookie, biscuit, cake, sponge, scone, mousse, pudding, custard, yogurt, frozen yogurt, ice cream, gelato, sorbet, sherbet, panna cotta, fudge, jelly, jam, or a combination thereof. In certain cases, the first phase may comprise a baked dough, cookie, bread, cake, biscuit, scone, pastry, pie, brownie, croissant, cheesecake, batter, paste, mousse, pudding, custard, yogurt, frozen yogurt, ice cream, gelato, funnel cake, sorbet, sherbet, panna cotta, fudge, or a combination thereof. In certain cases, the second phase may be formed from a nougat, fruit, dried fruit, Funfetti®, marshmallow, biscuit, cookie, cookie dough, jam, preserve, marshmallow, buttercream, meringue, praline, icing sugar, sugar, cocoa, cocoa powder, nuts, caramel, caramelized nuts, caramelized fruits, condensed milk, evaporated milk, sauce, syrup, frosting, glaze, fondant, candy bar, hard candy, cream, chocolate confection, peanut butter confection, mint confection, butterscotch confection, or a combination thereof. In certain cases, the fruit may comprise a fresh fruit or a dried fruit.

In certain cases, the second phase may comprise a nougat, fruit, dried fruit, Funfetti®, marshmallow, biscuit, cookie, cookie dough, jam, preserve, marshmallow, buttercream, meringue, praline, icing sugar, sugar, cocoa, cocoa powder, nuts, caramel, caramelized products such as caramelized nuts or caramelized fruits, condensed milk, evaporated milk, sauce, syrup, frosting, glaze, fondant, candy bar, hard candy, cream, chocolate confection, peanut butter confection, mint confection, butterscotch confection, or a combination thereof. In certain cases, the fruit may comprise a fresh fruit or a dried fruit.

In certain cases, the foodstuff may be a cake, cupcake, cheesecake, cookie, croissant, cronut, brownie, brookie, pie, cobbler, pastry, bun, scone, bread, roll, Danish, donut, torte, muffin, cupcake, milkshake, ice cream, frozen yogurt, custard, gelato, waffle, pancake, jam, jelly, macaron, tart, kouign amann, duffin, pecan, madeleine, kugelhopf, beignet, brioche, bundt cake, funnel cake, panna cotta, fudge, scone, or a combination thereof. In certain cases, the foodstuff may be substantially free of a high-intensity sweetener. In certain cases, the first phase may be substantially free of a high-intensity sweetener. In certain cases, the second phase may be substantially free of a high-intensity sweetener. In certain cases, the foodstuff may be substantially free of a polyol. In certain cases, the first phase may be substantially free of a polyol. In certain cases, the second phase may be substantially free of a polyol. In certain cases, the second phase may comprise glucose, fructose, galactose, sucrose, maltose, lactose, or a combination thereof.

In certain cases, the monosaccharide, disaccharide, or both may be less than 10% by dry weight of the first phase. In certain cases, the monosaccharide, disaccharide, or both may be less than 5%, less than 4%, less than 3%, less than 2.5%, less than 2%, or less than 1% by dry weight of the first phase. In certain cases, the first phase may be substantially free of monosaccharides, disaccharides, or both. In certain cases, the first phase may be substantially free of glucose, fructose, galactose, sucrose, maltose, and lactose. In certain cases, the first phase may comprise at least 1% by dry weight of the at least one type of oligosaccharide. In certain cases, the first phase may comprise at least 2.5%, at least 5%, at least 10%, at least 12.5%, or at least 15% by dry weight of the at least one type of oligosaccharide.

In certain cases, the at least one type of oligosaccharide may comprise the cello-oligosaccharides with a DP from two to six. In certain cases, the at least one type of oligosaccharide may comprise the xylo-oligosaccharides with a DP from two to twelve. In certain cases, the at least one type of oligosaccharide may comprise the mixed-linkage glucan oligosaccharides with a DP from two to five. In certain cases, the at least one type of oligosaccharide may comprise the manno-oligosaccharides having a DP from two to twelve. In certain cases, the at least one type of oligosaccharide may comprise the xyloglucan oligosaccharides having a DP from four to twelve. In certain cases, the at least one type of oligosaccharide may comprise cello-oligosaccharides and xylo-oligosaccharides. In certain cases, the at least one type of oligosaccharide may comprise cello-oligosaccharides and manno-oligosaccharides. In certain cases, the cello-oligosaccharides comprise at least 10% by dry weight, at least 15% by dry weight, at least 20% by dry weight, at least 25% by dry weight, or at least 30% by dry weight of the foodstuff. In certain cases, the cello-oligosaccharides comprise greater than 50%, greater than 60%, greater than 70%, greater than 80%, or greater than 90% cellobiose. In certain cases, the xylo-oligosaccharides may comprise at least 10% by dry weight, at least 15% by dry weight, at least 20% by dry weight, at least 25% by dry weight, or at least 30% by dry weight of the foodstuff.

In certain cases, the xylo-oligosaccharides may comprise greater than 30%, greater than 40%, greater than 50%, greater than 70%, or greater than 75% xylobiose. In certain cases, the manno-oligosaccharides may comprise at least 10% by dry weight, at least 15% by dry weight, at least 20% by dry weight, at least 25% by dry weight, or at least 30% by dry weight of the foodstuff. In certain cases, the manno-oligosaccharides may comprise greater than 30%, greater than 40%, greater than 50%, greater than 70%, or greater than 75% disaccharide. In certain cases, the xylo-oligosaccharides may comprise xylo-oligosaccharides with one or more side branches. In certain cases, the one or more side branches may comprise glucuronosyl side branches, methylglucuronosyl side branches, arabinosyl side branches, or combinations thereof. In certain cases, the xylo-oligosaccharides may comprise xylose and arabinose monomers at a ratio from 20:1 to 2:1, 18:1 to 4:1, or 16:1 to 6:1. In certain cases, the manno-oligosaccharides may comprise at least 10% by dry weight, at least 15% by dry weight, at least 20% by dry weight, at least 25% by dry weight, or at least 30% by dry weight of the foodstuff.

In certain cases, the mixed-linkage glucan oligosaccharides may comprise at least 10% by dry weight, at least 15% by dry weight, at least 20% by dry weight, at least 25% by dry weight, or at least 30% by dry weight of the foodstuff. In certain cases, the xyloglucan oligosaccharides may comprise at least 10% by dry weight, at least 15% by dry weight, at least 20% by dry weight, at least 25% by dry weight, or at least 30% by dry weight of the foodstuff. In certain cases, the second phase may comprise at least 1% by dry weight, at least 2% by dry weight, at least 3% by dry weight, at least 5% by dry weight, at least 8% by dry weight, at least 10% by dry weight, or at least 15% by dry weight of the monosaccharide, the disaccharide, or both.

In certain cases, the second phase may comprise glucose. In certain cases, the second phase may comprise fructose. In certain cases, the second phase may comprise sucrose. In certain cases, the second phase may comprise galactose. In certain cases, the second phase may comprise maltose. In certain cases, the second phase may comprise lactose. In certain cases, the second phase may comprise less than 10%, 5%, 2%, or 1% of the at least one type of oligosaccharide. In certain cases, the second phase may be substantially free of the at least one type of oligosaccharide.

In certain cases, the foodstuff may comprise a phenolic compound. In certain cases, the phenolic compound may comprise lignin, a lignin breakdown product, ferulic acid, a ferulic acid derivative, or any combination thereof. In certain cases, the first phase may comprise the phenolic compound. In certain cases, the second phase may be substantially free of the phenolic compound. In certain cases, the first phase further may comprise oil, flour, egg, margarine, butter, shortening, baking soda, baking powder, yeast, or corn starch. In certain cases, the second phase further may comprise palm oil, cocoa butter, butter, shortening, margarine, milk, or cream.

In certain cases, the at least one type of oligosaccharide or the at least two types of oligosaccharide of the first phase may be in a non-crystalline form. In certain cases, the monosaccharide, the disaccharide, or both of the second phase may be in a crystalline or semi-crystalline form. In certain cases, the at least one type of oligosaccharide or the at least two types of oligosaccharide in the first phase may be in a non-crystalline form, and wherein the monosaccharide, the disaccharide, or both of the second phase may be in a crystalline or semi-crystalline form.

In various cases, a foodstuff may comprise: a first phase comprising cello-oligosaccharides with a degree of polymerization (DP) from two to six and xylo-oligosaccharides with a DP from two to twelve; and a second phase comprising glucose, fructose, galactose, sucrose, maltose, lactose, or a combination thereof.

In some cases, a method of preparing a foodstuff may comprise: providing a first phase comprising at least one type of oligosaccharide selected from: cello-oligosaccharides with a degree of polymerization (DP) from two to six; xylo-oligosaccharides with a DP from two to twelve; manno-oligosaccharides having a DP from two to twelve; mixed-linkage glucan oligosaccharides with a DP from two to five; and xyloglucan oligosaccharides having a DP from four to twelve; and providing a second phase comprising a monosaccharide, a disaccharide, or both; and mixing, combining, connecting, and/or coating the first phase and the second phase with one another.

In some cases, after combining the first phase and the second phase, the foodstuff may be baked, cooked, grilled, fried, frozen, heated, or treated in some other way. In some cases, the first phase and the second phase may be physically stuck together in the foodstuff. In some cases, the first phase and the second phase may not be physically stuck together in the foodstuff. In some cases, the first phase may be different than the second phase. In some cases, an average density of the first phase may be less than an average density of the second phase. In some cases, the average density of the second phase may be at least 1.5 times, 2 times, 5 times, or 10 times greater than the average density of the first phase. In some cases, an average density of the second phase may be less than an average density of the first phase. In some cases, the average density of the first phase may be at least 1.5 times, 2 times, 5 times, or 10 times greater than the average density of the second phase.

In some cases, an average sweetness level of the first phase may be less than an average sweetness level of the second phase. In some cases, the sweetness level may be a sweetness perception by a subject. In some cases, the second phase may be at least 1.5 times, 2 times, 5 times, or 10 times sweeter than the first phase. In some cases, the volume of the first phase may be 1.5 times, 2 times, 5 times, or 10 times greater than the second phase in the foodstuff. In some cases, the mass of the first phase may be 1.5 times, 2 times, 5 times, or 10 times greater than the mass of the second phase in the foodstuff.

In some cases, the first phase may comprise a dough, batter, paste, mousse, pudding, custard, yogurt, frozen yogurt, ice cream, gelato, sorbet, sherbet, panna cotta, fudge, or a combination thereof. In some cases, the second phase may be formed from a fruit, syrup, frosting, glaze, fondant, candy bar, hard candy, cream, chocolate confection, peanut butter confection, mint confection, butterscotch confection, or a combination thereof. In some cases, the fruit may comprise a fresh fruit or a dried fruit.

In some cases, the second phase may comprise a fruit, syrup, frosting, glaze, fondant, candy bar, hard candy, cream, chocolate confection, peanut butter confection, mint confection, butterscotch confection, or a combination thereof. In some cases, the fruit may comprise a fresh fruit or a dried fruit.

In some cases, the foodstuff may be a cake, cupcake, cheesecake, cookie, croissant, cronut, brownie, brookie, pie, cobbler, pastry, bun, scone, bread, roll, Danish, donut, torte, muffin, cupcake, milkshake, ice cream, frozen yogurt, custard, gelato, waffle, pancake, jam, jelly, macaron, tart, kouign amann, duffin, pecan, madeleine, kugelhopf, beignet, brioche, bundt cake, funnel cake, panna cotta, fudge, scone, or a combination thereof.

In some cases, the foodstuff may be substantially free of a high-intensity sweetener. In some cases, the foodstuff may be substantially free of a polyol. In some cases, the foodstuff may comprise a polysaccharide, wherein the polysaccharide may be a cellulosic polysaccharide, a hemicellulosic polysaccharide, a polysaccharide derivative, or a polysaccharide aggregate. In some cases, the polysaccharide may be a cellulosic polysaccharide. In some cases, the hemicellulosic polysaccharide may be xylan. In some cases, the polysaccharide derivative may be carboxymethylcellulose. In some cases, the polysaccharide aggregate may be undigested lignocellulosic material.

In some cases, the foodstuff may comprise less than 15% by dry weight of the polysaccharide. In some cases, the first phase may comprise less than 15% by dry weight of the polysaccharide. In some cases, the second phase may be substantially free of the polysaccharide. In some cases, the first phase may be substantially free of a high-intensity sweetener. In some cases, the second phase may be substantially free of a high-intensity sweetener. In some cases, the first phase may be substantially free of a polyol. In some cases, the second phase may be substantially free of a polyol.

In some cases, the second phase may comprise glucose, fructose, galactose, sucrose, maltose, lactose, or a combination thereof. In some cases, the monosaccharide, disaccharide or both may be less than 10% by dry weight of the first phase. In some cases, the monosaccharide may be less than 5%, less than 4%, less than 3%, less than 2.5%, less than 2%, or less than 1% by dry weight of the first phase. In some cases, the first phase may be substantially free of monosaccharides, disaccharides, or both.

In some cases, the first phase may be substantially free of glucose, fructose, galactose, sucrose, maltose, and lactose. In some cases, the first phase may comprise at least 1% by dry weight of the at least one type of oligosaccharide. In some cases, the first phase may comprise at least 2.5%, at least 5%, at least 10%, at least 12.5%, or at least 15% by dry weight of the at least one type of oligosaccharide. In some cases, the at least one type of oligosaccharide may comprise the cello-oligosaccharides with a DP from two to six. In some cases, the at least two types of oligosaccharides may comprise the xylo-oligosaccharides with a DP from two to twelve. In some cases, the at least one type of oligosaccharide may comprise the mixed-linkage glucan oligosaccharides with a DP from two to five. In some cases, the at least one type of oligosaccharide may comprise the manno-oligosaccharides having a DP from two to twelve. In some cases, the at least one type of oligosaccharide may comprise the xyloglucan oligosaccharides having a DP from four to twelve. In some cases, the at least one type of oligosaccharide may comprise cello-oligosaccharides and xylo-oligosaccharides. In some cases, the at least one type of oligosaccharide may comprise cello-oligosaccharides and manno-oligosaccharides.

In some cases, the cello-oligosaccharides may comprise at least 10% by dry weight, at least 15% by dry weight, at least 20% by dry weight, at least 25% by dry weight, or at least 30% by dry weight of the foodstuff. In some cases, the cello-oligosaccharides may comprise greater than 50%, greater than 60%, greater than 70%, greater than 80%, or greater than 90% cellobiose. In some cases, the xylo-oligosaccharides may comprise at least 10% by dry weight, at least 15% by dry weight, at least 20% by dry weight, at least 25% by dry weight, or at least 30% by dry weight of the foodstuff. In some cases, the xylo-oligosaccharides may comprise xylo-oligosaccharides with one or more side branches. In some cases, the one or more side branches may comprise glucuronosyl side branches, methylglucuronosyl side branches, arabinosyl side branches, or combinations thereof. In some cases, the xylo-oligosaccharides may comprise xylose and arabinose monomers at a ratio from 20:1 to 2:1, 18:1 to 4:1, or 16:1 to 6:1. In some cases, the manno-oligosaccharides may comprise at least 10% by dry weight, at least 15% by dry weight, at least 20% by dry weight, at least 25% by dry weight, or at least 30% by dry weight of the foodstuff.

In some cases, the mixed-linkage glucan oligosaccharides may comprise at least 10% by dry weight, at least 15% by dry weight, at least 20% by dry weight, at least 25% by dry weight, or at least 30% by dry weight of the foodstuff. In some cases, the xyloglucan oligosaccharides may comprise at least 10% by dry weight, at least 15% by dry weight, at least 20% by dry weight, at least 25% by dry weight, or at least 30% by dry weight of the foodstuff. In some cases, the second phase may comprise at least 1% by dry weight, at least 2% by dry weight, at least 3% by dry weight, at least 5% by dry weight, at least 8% by dry weight, at least 10% by dry weight, or at least 15% by dry weight of the monosaccharide, disaccharide, or both.

In some cases, the second phase may comprise glucose. In some cases, the second phase may comprise fructose. In some cases, the second phase may comprise sucrose. In some cases, the second phase may comprise galactose. In some cases, the second phase may comprise maltose. In some cases, the second phase may comprise lactose. In some cases, the second phase may comprise less than 10%, 5%, 2%, or 1% of the at least one type of oligosaccharide. In some cases, the second phase may be substantially free of the at least one type of oligosaccharide. In some cases, the foodstuff may comprise a phenolic compound. In some cases, the phenolic compound may comprise lignin, a lignin breakdown product, ferulic acid, a ferulic acid derivative or any combination thereof. In some cases, the first phase may comprise the phenolic compound. In some cases, the second phase may be substantially free of the phenolic compound.

In some cases, the first phase further may comprise oil, flour, egg, margarine, butter, shortening, baking soda, baking powder, yeast, or corn starch. In some cases, the second phase further may comprise palm oil, cocoa butter, butter, shortening, margarine, milk, or cream.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
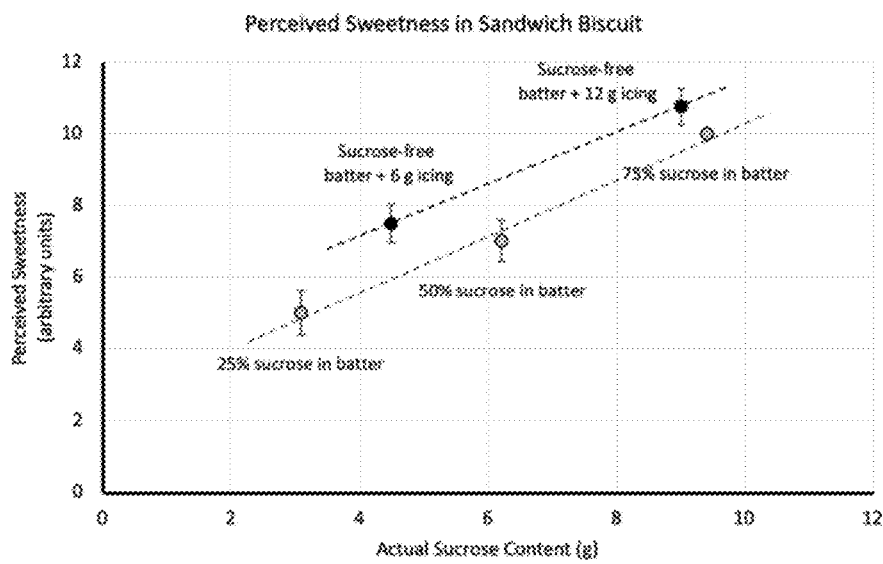
FIG. 1 illustrates perceived sweetness of sandwich cookies (biscuits) made with batter comprising oligosaccharide, lacking sucrose, and comprising icing made with sucrose compared to cookies made with batters comprising varying levels of sucrose. Data are averages of 4 measurements +/- standard error.
Figure 2:
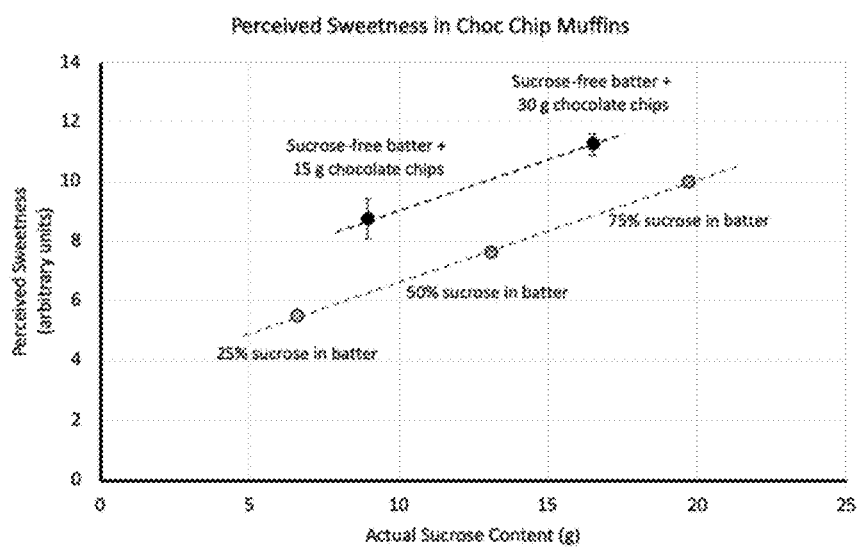
FIG. 2 illustrates perceived sweetness of chocolate chip muffins made with batter comprising oligosaccharide, lacking sucrose, and comprising chocolate chips made with sucrose compared to muffins made with batters comprising varying levels of sucrose. Data are averages of 4 measurements +/- standard error.
Figure 3:
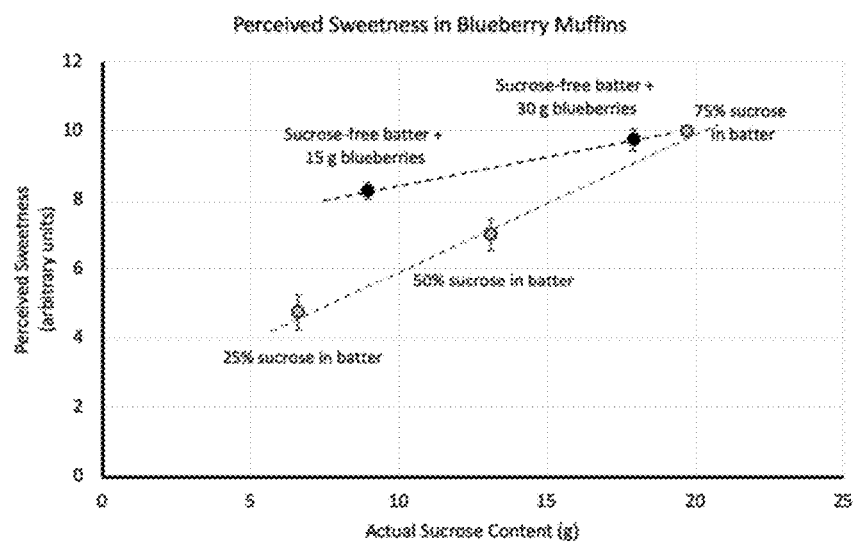
FIG. 3 illustrates perceived sweetness of blueberry muffins made with batter comprising oligosaccharide, lacking sucrose, and comprising blueberries with natural sugar compared to muffins made with batters comprising varying levels of sucrose. Data are averages of 4 measurements +/- standard error.
Figure 4:
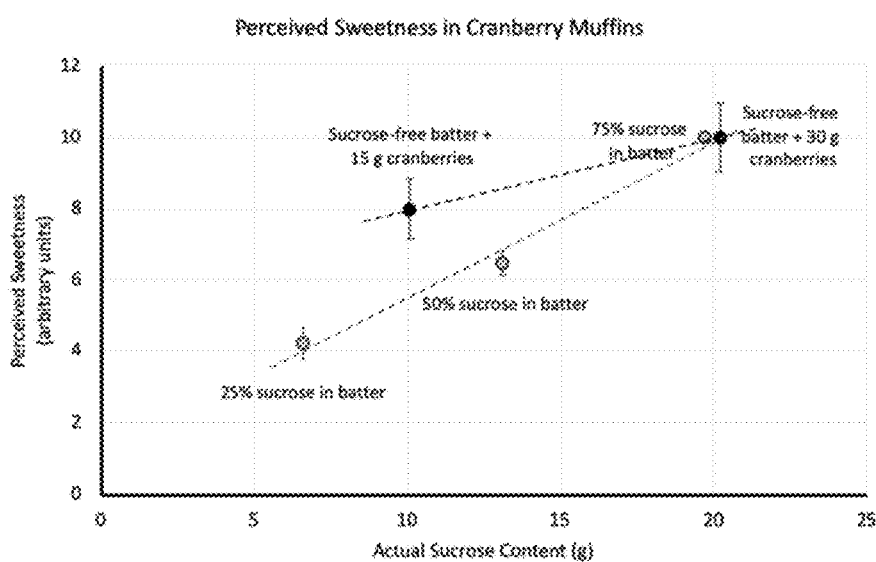
FIG. 4 illustrates perceived sweetness of cranberry muffins made with batter comprising oligosaccharide, lacking sucrose, and comprising cranberries with natural sugar compared to muffins made with batters comprising varying levels of sucrose. Data are averages of 4 measurements +/- standard error.
Figure 5:
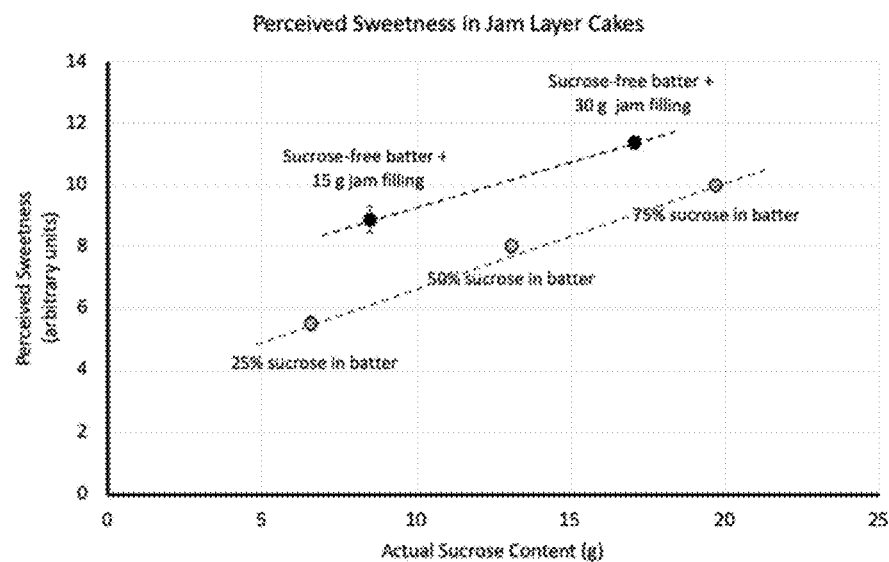
FIG. 5 illustrates perceived sweetness of jam layer cakes made with batter comprising oligosaccharide, lacking sucrose, and comprising jam made with sucrose and comprising natural sugars compared to cakes made with batters comprising varying levels of sucrose. Data are averages of 4 measurements +/- standard error.

Described herein are multiphase foodstuffs, which can have a reduced caloric content, but with a perceived sweetness that can be at least about equal to a higher calorie, full-sugar foodstuff. The types of foodstuffs contemplated herein are those that would normally be baked, manufactured, mixed, frozen, and/or processed using naturally occurring or extracted monosaccharides and/or disaccharides such as glucose or sucrose. A multiphase foodstuff might comprise, for example, a frosted cake, a chocolate chip cookie, an oatmeal raisin cookie, a sandwich cookie, a blueberry muffin, a filled pastry, and the like. By making use of multiple phases, a foodstuff can be made that has a reduced caloric content, but that includes the perceived sweetness of a full-sugar foodstuff.

According to the disclosure provided herein, one phase, such as a cake, may comprise a low-calorie sweetener such as an oligosaccharide that replaces a monosaccharide and/or disaccharide sugar/sweetener that would normally be used, while another phase such as the frosting for the cake would comprise sucrose as generally used in most recipes. Often, the phase comprising the high-calorie sugar would be a minor component with respect to volume and/or mass of the foodstuff (e.g., frosting, icing, chocolate chips, or fruit) and the phase comprising the oligosaccharide would comprise a major component with respect to volume and/or mass of the foodstuff (e.g., the cake or cookie).

As used herein, "food" and "foodstuff" generally refer to any item destined for consumption, which may be consumption by a human or by any other animal. It may be food, feed, a beverage, or an ingredient to be used in the production of any of the above.

As used herein, "nutraceutical" generally refers to any composition introduced into a human or other animal, whether by ingestion, injection, absorption, or any other method, for the purpose of providing nutrition to the human or other animal. Use of such a nutraceutical may take the form of a drink with added dietary fiber, a prebiotic additive, a pill or other capsule, or any other suitable use.

As used herein, "polysaccharide" generally refers to a saccharide polymer of any length greater than about 20 residues. Polysaccharides may be highly branched, lightly branched, or unbranched. Polysaccharides may include any manner of glycosidic bond in any combination; any number of, for example, α or β linkages; and any combination of monomer types, such as glucose, glucosamine, mannose, xylose, galactose, fucose, fructose, glucuronic acid, arabinose, or derivatives thereof, such as any combination of the above monomers decorated with acetyl or other groups. The polysaccharide may be a cellulosic or hemicellulosic polymer. Hemicellulosic polymers envisaged including xylan, glucuronoxylan, arabinoxylan, glucomannan, and xyloglucan. In some embodiments, cellulose is the preferred cellulosic polymer.

As used herein, "lignocellulose" generally refers to polysaccharide-comprising aggregates that are, or are derived from, plant cell wall material. For example, they may include one or more of the following polysaccharides associated together: cellulose, xylan, mannan, and mixed-linkage glucan.

As used herein "highly branched," "lightly branched," and "unbranched" generally refer to the number of sidechains per stretch of main chain in a saccharide. Highly branched saccharides have on average from 4 to 10 side chains per 10 main-chain residues, slightly branched saccharides have on average from 1 to 3 side chains per 10 main-chain residues, and unbranched saccharides have only one main chain and no side chains. The average is calculated by dividing the number of side chains in a saccharide by the number of main-chain residues.

As used herein, "saccharide" generally refers to any polysaccharide and/or oligosaccharide, such as monosaccharide and/or disaccharide.

As used herein, "oligosaccharide" generally refers to saccharide polymers having chain lengths less than or equal to about 20 saccharide residues. Oligosaccharides may be highly branched, lightly branched, or unbranched; and may include glycosidic bonds in any combination, any number of α or β linkages, and any combination of monomer types, such as glucose, glucosamine, mannose, xylose, galactose, fucose, fructose, glucuronic acid, arabinose, or derivatives thereof. Suitable derivatives include the above monomers including acetyl or other groups.

As used herein, "monosaccharide" and "disaccharide" generally refer to saccharide compounds consisting of one or two residues, respectively. Monosaccharides are compounds such as glucose, glucosamine, xylose, galactose, fucose, fructose, glucuronic acid, arabinose, galacturonic acid, or epimers or other derivatives thereof. Suitable derivatives include acetyl or other groups. Disaccharides are compounds consisting of two monosaccharides joined via any glycosidic bond.

As used herein, "cello-oligosaccharides" generally refers to oligosaccharides composed of one or more glucose residues linked by β-1,4-glycosidic bonds, and may be chemically related to that by oxidation, reduction, esterification, epimerization, or another chemical modification.

As used herein, "xylo-oligosaccharides" generally refers to oligosaccharides composed primarily of xylose residues (typically linked by β-1,4-glycosidic bonds) and may also contain glucuronic acid residues and/or arabinose residues and/or acetyl groups and/or any other modification, and may be chemically related to that by oxidation, reduction, esterification, epimerization, or another chemical modification.

As used herein, "mixed-linkage glucan-oligosaccharides" generally refers to oligosaccharides composed of one or more glucose residues linked by at least one β-1,3-glycosidic bond and at least one β-1,4-glycosidic bond, and may be chemically related to that by oxidation, reduction, esterification, epimerization, or another chemical modification.

As used herein, "manno-oligosaccharides" generally refers to oligosaccharides composed of one or more mannose residues and optionally containing one or more glucose and/or galactose residues, and may be chemically related to that by oxidation, reduction, esterification, epimerization, or another chemical modification.

As used herein, "chito-oligosaccharides" generally refers to oligosaccharides composed of one or more glucosamine and/or N-acetyl-glucosamine residues, and may be chemically related to that by oxidation, reduction, esterification, epimerization, or another chemical modification.

As used herein, "cellulose" generally refers to polysaccharides composed of glucose residues linked by β-1,4-glycosidic bonds, and derivatives thereof "Xylan" refers to polysaccharides composed of a backbone of xylose residues and may also contain glucuronic acid residues and/or arabinose residues and/or acetyl groups and/or any other modification. "Mixed-linkage glucan" refers to polysaccharides composed of glucose residues linked by β-1,3-glycosidic bonds and β-1,4-glycosidic bonds. "Mannan" refers to polysaccharides composed of greater than 40% mannose residues and optionally containing glucose and/or galactose residues. "Chitin" or "chitosan" refer to polysaccharides composed of glucosamine and/or N-acetyl-glucosamine residues.

The term "about" as used herein can mean within 1 or more than 1 standard deviation. Alternatively, "about" can mean a range of up to 10%, up to 5%, or up to 1% of a given value. For example, about can mean up to ±10%, ±9%, ±8%, ±7%, ±6%, ±5%, ±4%, ±3%, ±2%, or ±1% of a given value.

The term "high-intensity sweetener," as used herein, generally refers to a sweetening component that possess a perceived sweetness many times sweeter than sucrose. High-intensity sweeteners include saccharin, aspartame, acesulfame potassium (Ace-K), sucralose, neotame, and advantame. High-intensity sweeteners also include extracts such as steviol glycosides obtained from the leaves of the stevia plant (*Stevia rebaudiana* (Bertoni) Bertoni) and extracts obtained from *Siraitia grosvenorii* Swingle fruit (also known as luo han guo or monk fruit).

The term "sugar alcohol," as used herein, generally refers to a polyol sweetening agent. Common sugar alcohols used for sweetening foods comprise sorbitol, xylitol, and lactitol. The term "polyol," as used herein, generally refers to a polyol sweetening agent, such as sugar alcohols. Common polyols used for sweetening foods comprise erythritol, sorbitol, xylitol, and lactitol.

The term "substantially free," as used herein with respect to a sugar alcohol, polyol, or high-intensity sweetener, generally refers to an amount less than an amount that contributes to the perceived sweetness of the foodstuff to which the sugar alcohol, polyol, or high-intensity sweetener is added. Generally, a foodstuff that is substantially free of a high-intensity sweetener, or polyol will have a trace amount or less. For example, the first phase, the second phase, or the component (e.g., of the foodstuff) may have less than 5%, 4.5%, 4%, 3.5%, 3%, 2.5%, 2%, 1.5%, 1%, 0.9%, 0.8%, 0.7%, 0.6%, 0.5%, 0.4%, 0.3%, 0.2%, 0.1%, 0.01%, 0.001%, or 0.0001% by dry weight of the sugar alcohol, polyol, or high-intensity sweetener. In another example, the first phase, the second phase, or the component (e.g., of the foodstuff) may have less than 5%, 4.5%, 4%, 3.5%, 3%, 2.5%, 2%, 1.5%, 1%, 0.9%, 0.8%, 0.7%, 0.6%, 0.5%, 0.4%, 0.3%, 0.2%, 0.1%, 0.01%, 0.001%, or 0.0001% by dry weight of the oligosaccharide.

Introduction

Described herein are multiphase foodstuffs that may comprise at least two phases. The first phase may be a primary phase of the foodstuff. In some instances, the first phase may provide bulk, a matrix, and/or structure to a foodstuff. For example, the first phase may be dough, batter, pudding, custard, yogurt, ice cream, sorbet, sherbet, gelato, or another suitable primary component of a foodstuff. The first phase is described in further detail below. The second phase may be a secondary phase of the foodstuff. The second phase may provide a contrasting flavor, texture, and/or color to a foodstuff. That is, the flavor, texture, and/or color of the second phase may be different than the flavor, texture, and/or color of the first phase. The first phase may hold and/or support the second phase. In various instances, the second phase may be an add-in or add-on which is coupled to or combined with the first phase to form the foodstuff. For example, the second phase may be fresh fruit, dried fruit, chocolate chips, icing, frosting, candy pieces, syrup, or another suitable secondary component of a foodstuff. In other words, the second phase may be dispersed throughout, disposed within, and/or disposed on at least a portion of the first phase.

In some cases, the first phase may be greater in volume and/or mass relative to the second phase. For example, in an embodiment where the foodstuff is a chocolate chip cupcake, the first phase may be the baked batter and the second phase may be the chocolate chips. As a portion of the total volume and/or mass of the chocolate chip cupcake, the baked batter may be a greater portion of the total volume and/or mass than the chocolate chips of the chocolate chip cupcake. Additionally, in certain embodiments, the foodstuff may comprise additional phases such as a third, fourth, fifth, sixth, seventh, eighth phase, or more. For example, a vanilla ice cream with chocolate syrup and caramel syrup mixed into the ice cream may comprise a first phase (the ice cream), a second phase (the chocolate syrup), and a third phase (the caramel syrup).

The terms first phase and second phase (and related terms, e.g., third phase, fourth phase, etc.) are used for convenience throughout the present disclosure. In any of the embodiments provided herein, unless clearly indicated otherwise, the characteristics, components, or features of the first phase may be applied to the second phase and vice versa (the same applies to the other phases as provided herein). For example, in some embodiments, the first phase may be greater in volume and/or mass relative to the second phase, however, in some other embodiments, the second phase may be greater in volume and/or mass relative to the first phase.

Further, a transition between the first phase and the second phase of the foodstuff may be gradual. Stated another way, the transition may not be abrupt. Upon preparing, baking, and/or allowing the foodstuff to sit for the period of time, the first phase may at least partially displace or move into a least a portion of the second phase, or vice versa. Accordingly, there may be a transition zone between the first phase and the second phase. For example, in an embodiment where the foodstuff is a chocolate chip cupcake, one or more of the chocolate chips forming the second phase may at least partially melt during baking of the chocolate chip cupcake. Accordingly, at least a portion of the one or more chocolate chips may infiltrate a portion of the first phase, for example, a portion of the first phase at or adjacent the second phase. Stated another way, a portion of the second phase may melt into, ooze into, soak into, or otherwise infiltrate a portion of the first phase, or vice versa.

A phase can be a distinct, or substantially distinct, component of a foodstuff that is a mixture of one or more base ingredients of the phase. Stated another way, a phase may be a discrete domain that has one or more distinct characteristics, components, or features from, or in comparison to, another phase (e.g., a distinct volume, mass, melting temperature, etc.). For example, the first phase may have a first discrete melting temperature and the second phase may have a second discrete melting temperature, wherein the first discrete melting temperature is different than the second discrete melting temperature.

A phase is not generally the individual base ingredients of the phase, such as eggs, flour, sweeteners, milk, cream, etc., but the phase may be the mixture of one or more such base ingredients, such as a dough, batter, or ice cream—whether baked, frozen, or at room temperature. Phases can also include naturally occurring ingredients, which are not mixtures of base ingredients, that are normally added (e.g., added whole or substantially whole) to baked goods. Such ingredients include fresh fruits, dried fruits, extracts, syrups, jams, jellies, compotes, preserves, nuts, and/or candied nuts, that add desirable flavors, textures, and/or colors to a foodstuff. Generally, a phase may be palatable to a human where the base ingredient by itself may not be. For example, unbaked cookie dough or a cake without icing would generally be consumed by a human, whereas raw eggs, flour, and/or sweeteners would not. A phase can include, without limitation, a dough, batter, paste, mousse, pudding, custard, yogurt, frozen yogurt, ice cream, gelato, sorbet, sherbet, panna cotta, fudge, fruit, syrup, icing, frosting, glaze, fondant, candy bar, hard candy, toffee, cream, peanut butter, almond butter, cashew butter, candied nuts, hazelnut-chocolate spread, chocolate confection, peanut butter confection, mint confection, or butterscotch confection. Other suitable phases are also within the scope of this disclosure.

Alternatively, described herein are foodstuffs wherein a single phase comprises two or more different sweetener components. Such sweetener components may comprise an oligosaccharide component and a monosaccharide and/or disaccharide component.

Multiphase Foodstuffs

The foodstuffs described herein are generally foodstuffs that are considered sweets, desserts, candies, or breakfast items and include, by way of non-limiting example, a cake, cupcake, cheesecake, cookie, croissant, cronut, brownie, brookie, pie, cobbler, pastry, bun, scone, bread, roll, Danish, donut, torte, muffin, cupcake, milkshake, ice cream, frozen yogurt, custard, gelato, waffle, pancake, jam, jelly, macaron, tart, kouign amann, duffin, pecan, madeleine, kugelhopf, beignet, brioche, bundt cake, funnel cake, panna cotta, fudge, scone, or a combination thereof.

The foodstuff described herein can be frozen, baked, fried, boiled, or otherwise suitably prepared for human consumption. The foodstuffs, described herein, can also be pre-made or mixed, and ready to be baked or cooked by the end consumer. For example, a pre-made cake batter or cookie dough supplied to a consumer that is ready to be baked. Also contemplated are boxed mixtures that generally require the addition of one or more wet ingredients such as oil, butter, milk, cream, or eggs. Also contemplated are whole frozen or refrigerated foodstuffs that require thawing and/or heating by a consumer prior to consumption.

In an aspect, a multiphase foodstuff with at least a first and a second phase can comprise a second phase admixed with a first phase. In certain embodiments, the second phase can be mixed nonuniformly through the first phase or through a portion of the first phase. In certain embodiments, the second phase can be mixed uniformly through the first phase. In these aspects, the second phase, or fragments of the second phase, can maintain their essential properties as with a blueberry in a blueberry muffin or a chocolate chip in a chocolate chip cookie. Additional phases can also be admixed resulting in a foodstuff that comprises a third, fourth, fifth, sixth, seventh, or eighth phase. Any one or more of these phases can be admixed into a first phase nonuniformly or uniformly.

In another aspect, a second phase of a multiphase foodstuff can serve as a filling, icing, and/or frosting. In certain embodiments, the second phase can be disposed on or around a first phase or a portion of a first phase, such as with an iced and/or frosted cake. When the second phase is disposed on the first phase, the second phase can completely or partially coat the first phase, cover completely or partially the top of the first phase, or cover completely or partially the top and sides of the first phase. In certain embodiments, the second phase can be disposed inside a first phase, such as with a pie or jelly or cream filled pastry. In certain embodiments, the second phase can be disposed between two phases, such as with a layer cake that has frosting disposed between the layers. Additional phases can also be disposed on or within a first phase resulting in a foodstuff that comprises third, fourth, fifth, sixth, seventh, or eighth phases. Any one or more of these phases can be disposed inside of, surrounding completely or in part, on top of completely or in part, on the top and sides of completely or in part, or between any one or more phases.

In some cases, the phases (e.g., the first phase, second phase, third phase, etc.) may be composed of components or ingredients that, in the production process, are mixed before the two (or more) phases are combined into a foodstuff (e.g., a finished product or a final multiphase product). In certain cases, the phases may be heated, cooked, baked, boiled, fried, cooled, or treated in some other way in the production process before being combined into the finished product. In various cases, the phases may be physically stuck together in the finished product. In some cases, the phases may not be physically stuck together in the finished product (e.g., a muesli may include different phases that are not stuck together). In certain cases, the phases may merge at the interface of one phase and the other, for example, during baking of the final product (e.g., such as when chocolate chips partially melt into at least a portion of the surrounding cookie dough during baking).

In some embodiments, the first phase may be a fat-based, water-based, or bakery composition. In certain embodiments, the second phase may be a fat-based, water-based, or bakery composition. A fat-based composition may refer to a composition where the main component in which sugars or oligosaccharides are dispersed is composed of fats. Examples of fat-based compositions can include chocolate, ice cream, cream, and cheese. A water-based composition may refer to a composition where the main component in which sugars or oligosaccharides are dispersed is composed of water (e.g., wherein the main component is aqueous). Examples of water-based compositions can include fruits, compotes, drizzles, sauces, and icings. A bakery composition may refer to a composition made from dough or batter and which is typically cooked by baking. Examples of bakery compositions can include bread, cookies, cakes, doughnuts, and pastries.

In some instances, the second phase may be substantially uniformly dispersed throughout the foodstuff. In certain instances, the first phase may be nonuniformly dispersed throughout the foodstuff. In various instances, the first phase may be nonuniformly dispersed throughout the first phase. In some cases, the first phase may be disposed on a portion of an outer surface of the second phase. In certain cases, the first phase may be coated on a portion of an outer surface of the second phase.

In some embodiments, the second phase may be disposed on a portion of an outer surface of the foodstuff. The second phase may be coated on a portion of an outer surface of the foodstuff. The second phase may be disposed within a portion of the first phase. The second phase may be disposed within a portion of the foodstuff.

In certain embodiments, the first phase may be disposed on a portion of an outer surface of the foodstuff. The first phase may be coated on a portion of an outer surface of the foodstuff. The first phase may be disposed within a portion of the second phase. The first phase may be disposed within a portion of the foodstuff.

In various embodiments, a volume of the first phase may be greater than a volume of the second phase in the foodstuff. The volume of the first phase may be 1.5 times, 2 times, 5 times, or 10 times greater than the second phase in the foodstuff. A volume of the second phase may be greater than a volume of the first phase in the foodstuff. The volume of the second phase may be 1.5 times, 2 times, 5 times, or 10 times greater than the first phase in the foodstuff.

In some embodiments, a mass of the first phase may be greater than a mass of the second phase in the foodstuff. The mass of the first phase may be 1.5 times, 2 times, 5 times, or 10 times greater than the second phase in the foodstuff. A mass of the second phase may be greater than a mass of the first phase in the foodstuff. The mass of the second phase may be 1.5 times, 2 times, 5 times, or 10 times greater than the first phase in the foodstuff.

The different phases of a multiphase foodstuff can be differentiated based upon the sweetness of each phase (e.g., the sweetness as perceived by a human consumer). In certain embodiments, the average sweetness of a first phase may be greater than the average sweetness of a second phase. In certain embodiments, the average sweetness of a first phase may be at least about 1.5 times, at least about 2 times, at least about 3 times, at least about 4 times, at least about 5 times, at least about 6 times, at least about 7 times, at least about 8 times, at least about 9 times, or at least about 10 times greater than the average sweetness of a second phase. In certain embodiments, the average sweetness of a second phase may be greater than the average sweetness of a first phase. In certain embodiments, the average sweetness of a second phase may be at least about 1.5 times, at least about 2 times, at least about 3 times, at least about 4 times, at least about 5 times, at least about 6 times, at least about 7 times, at least about 8 times, at least about 9 times, or at least about 10 times greater than the average sweetness of a first phase. In various embodiments, the average sweetness of a first phase may be greater than the average sweetness of a second phase. In some embodiments, the average sweetness of a first phase may be at least 1.5 times, at least 2 times, at least 3 times, at least 4 times, at least 5 times, at least 6 times, at least 7 times, at least 8 times, at least 9 times, or at least 10 times greater than the average sweetness of a second phase. In certain embodiments, the average sweetness of a second phase may be greater than the average sweetness of a first phase. In certain embodiments, the average sweetness of a second phase may be at least 1.5 times, at least 2 times, at least 3 times, at least 4 times, at least 5 times, at least 6 times, at least 7 times, at least 8 times, at least 9 times, or at least 10 times greater than the average sweetness of a first phase.

The different phases of a multiphase foodstuff can be differentiated based upon the density of each phase. In certain embodiments, the average density of a first phase may be greater than the average density of a second phase. In certain embodiments, the average density of a first phase may be at least about 1.5 times, at least about 2 times, at least about 3 times, at least about 4 times, at least about 5 times, at least about 6 times, at least about 7 times, at least about 8 times, at least about 9 times, or at least about 10 times greater than the average density of a second phase. In certain embodiments, the average density of a second phase may be greater than the average density of a first phase. In certain embodiments, the average density of a second phase may be at least about 1.5 times, at least about 2 times, at least about 3 times, at least about 4 times, at least about 5 times, at least about 6 times, at least about 7 times, at least about 8 times, at least about 9 times, or at least about 10 times greater than the average density of a first phase.

In various embodiments, the average density of a first phase may be greater than the average density of a second phase. In some embodiments, the average density of a first phase may be at least 1.5 times, at least 2 times, at least 3 times, at least 4 times, at least 5 times, at least 6 times, at least 7 times, at least 8 times, at least 9 times, or at least 10 times greater than the average density of a second phase. In certain embodiments, the average density of a second phase may be greater than the average density of a first phase. In various embodiments, the average density of a second phase may be at least 1.5 times, at least 2 times, at least 3 times, at least 4 times, at least 5 times, at least 6 times, at least 7 times, at least 8 times, at least 9 times, or at least 10 times greater than the average density of a first phase.

The different phases of a multiphase foodstuff can be differentiated based upon the viscosity of each phase. In certain embodiments, the average viscosity of a first phase may be greater than the average viscosity of a second phase. In certain embodiments, the average viscosity of a first phase may be at least about 1.5 times, at least about 2 times, at least about 3 times, at least about 4 times, at least about 5 times, at least about 6 times, at least about 7 times, at least about 8 times, at least about 9 times, at least about 10 times, or at least about 100 times greater than the average viscosity of a second phase. In certain embodiments, the average viscosity of a second phase may be greater than the average viscosity of a first phase. In certain embodiments, the average viscosity of a second phase may be at least about 1.5 times, at least about 2 times, at least about 3 times, at least about 4 times, at least about 5 times, at least about 6 times, at least about 7 times, at least about 8 times, at least about 9 times, at least about 10 times, or at least about 100 times greater than the average viscosity of a first phase.

In various embodiments, the average viscosity of a first phase may be greater than the average viscosity of a second phase. In some embodiments, the average viscosity of a first phase may be at least 1.5 times, at least 2 times, at least 3 times, at least 4 times, at least 5 times, at least 6 times, at least 7 times, at least 8 times, at least 9 times, at least 10 times, or at least 100 times greater than the average viscosity of a second phase. In certain embodiments, the average viscosity of a second phase may be greater than the average viscosity of a first phase. In various embodiments, the average viscosity of a second phase may be at least 1.5 times, at least 2 times, at least 3 times, at least 4 times, at least 5 times, at least 6 times, at least 7 times, at least 8 times, at least 9 times, at least 10 times, or at least 100 times greater than the average viscosity of a first phase.

The different phases of a multiphase foodstuff can be differentiated based upon the volume and/or mass of each phase. In certain embodiments, the average volume and/or mass of a first phase may be greater than the average volume and/or mass of a second phase. In certain embodiments, the average volume and/or mass of a first phase may be at least about 1.5 times, at least about 2 times, at least about 3 times, at least about 4 times, at least about 5 times, at least about 6 times, at least about 7 times, at least about 8 times, at least about 9 times, at least about 10 times, at least about 20 times, at least about 30 times, at least about 40 times, at least about 50 times, or at least about 100 times greater than the average volume and/or mass of a second phase. In certain embodiments, the average volume and/or mass of a second phase may be greater than the average volume and/or mass of a first phase. In certain embodiments, the average volume and/or mass of a second phase may be at least about 1.5 times, at least about 2 times, at least about 3 times, at least about 4 times, at least about 5 times, at least about 6 times, at least about 7 times, at least about 8 times, at least about 9 times, at least about 10 times, at least about 20 times, at least about 30 times, at least about 40 times, at least about 50 times, or at least about 100 times greater than the average volume and/or mass of a first phase. In certain embodiments, for example, where the second phase may be an icing, frosting, or glaze, the first or second phase can be at least about 100, at least about 200, at least about 300, at least about 400, at least about 500, at least about 600, at least about 700, at least about 800, at least about 900, or at least about 1000 times greater than the average volume and/or mass of a first phase.

In various embodiments, the average volume and/or mass of a first phase may be greater than the average volume and/or mass of a second phase. In some embodiments, the average volume and/or mass of a first phase may be at least 1.5 times, at least 2 times, at least 3 times, at least 4 times, at least 5 times, at least 6 times, at least 7 times, at least 8 times, at least 9 times, at least 10 times, at least 20 times, at least 30 times, at least 40 times, at least 50 times, or at least 100 times greater than the average volume and/or mass of a second phase. In certain embodiments, the average volume and/or mass of a second phase may be greater than the average volume and/or mass of a first phase. In various embodiments, the average volume and/or mass of a second phase may be at least 1.5 times, at least 2 times, at least 3 times, at least 4 times, at least 5 times, at least 6 times, at least 7 times, at least 8 times, at least 9 times, at least 10 times, at least 20 times, at least 30 times, at least 40 times, at least 50 times, or at least 100 times greater than the average volume and/or mass of a first phase. In some embodiments, for example, where the second phase may be an icing, frosting, or glaze, the first or second phase can be at least 100, at least 200, at least 300, at least 400, at least 500, at least 600, at least 700, at least 800, at least 900, or at least 1000 times greater than the average volume and/or mass of a first phase.

In certain embodiments, the first phase of a multiphase foodstuff may be, or may have been, subjected to a browning reaction. In certain embodiments, the browning reaction may not be an enzymatic browning reaction. In certain embodiments, the browning reaction may be a caramelization reaction. In certain embodiments, the browning reaction may be a Maillard reaction.

In certain embodiments the first phase may be, or may have been, subjected to a browning reaction, and the second phase may not be, or may have not been, subjected to a browning reaction.

In certain embodiments, the second phase of a multiphase foodstuff may be, or may have been, subjected to a browning reaction. In certain embodiments, the browning reaction may not be an enzymatic browning reaction. In certain embodiments, the browning reaction may be a caramelization reaction. In certain embodiments, the browning reaction may be a Maillard reaction.

In certain embodiments the second phase may be, or may have been, subjected to a browning reaction, and the first phase may not be, or may have not been, subjected to a browning reaction.

In certain embodiments, the first phase and the second phase may be, or may have been, subjected to a browning reaction. In certain embodiments, the browning reaction may not be an enzymatic browning reaction. In certain embodiments, the browning reaction may be a caramelization reaction. In certain embodiments, the browning reaction may be a Maillard reaction.

In certain embodiments, the first phase of a multiphase foodstuff can comprise the by-products of a browning reaction. In certain embodiments, the by-products may be of a caramelization reaction. In certain embodiments, the by-products may be of a Maillard reaction. In certain embodiments, the first phase may comprise the by-products of a browning reaction and the second phase may not comprise the by-products of a browning reaction.

In certain embodiments, the second phase of a multiphase foodstuff can comprise the by-products of a browning reaction. In certain embodiments, the by-products may be of a caramelization reaction.

In certain embodiments, the by-products may be of a Maillard reaction. In certain embodiments, the second phase may comprise the by-products of a browning reaction and the first phase may not comprise the by-products of a browning reaction.

In certain embodiments, the second phase may comprise the by-products of a browning reaction and the first phase may comprise the by-products of a browning reaction.

In certain embodiments, the first phase, second phase, or both phases can be free, or substantially free, of gluten (e.g., wheat gluten). Additionally, a first or second phase can be free of a dietary allergen such as gliadin, lactose, dairy, eggs, nuts, and the like.

In certain aspects, the multiphase foodstuff described herein can comprise at least two phases, wherein the first phase comprises an oligosaccharide. The oligosaccharide of the first phase can be selected from: (a) cello-oligosaccharides with a degree of polymerization (DP) from two to six; (b) xylo-oligosaccharides with a DP from two to twelve; (c) mixed-linkage glucan oligosaccharides with a DP from two to five; (d) manno-oligosaccharides having a DP from two to twelve; (e) xyloglucan oligosaccharides having a DP from four to twelve; or (f) any combination thereof. The foodstuff, optionally, can comprise a second phase comprising a monosaccharide and/or a disaccharide (e.g., a baking sugar, table sugar, fructose, allulose, tagatose, dextrose, high-fructose corn syrup, maltose, lactose, sucrose, gentiobiose, sophorose, laminaribiose, allose, glucose, mannose, galactose, idose, altrose, gulose, talose, xylose, lyxose, ribose, or arabinose, or any other suitable monosaccharide/disaccharide sugar/sweetener). The monosaccharide and/or the disaccharide sugar/sweetener can comprise glucose, fructose, galactose, sucrose, maltose, lactose, another suitable monosaccharide or disaccharide, or a combination thereof. In certain embodiments, the first phase may be free, or substantially free, of a monosaccharide and/or disaccharide sugar/sweetener, and the second phase may be free, or substantially free, of an oligosaccharide. In some embodiments, the second phase may include at least one calorific monosaccharide (e.g., selected from glucose, fructose, and galactose) and/or at least one calorific disaccharide (e.g., selected from sucrose, maltose, and lactose). In certain embodiments, the first phase may include less than 10% w/w of the at least one calorific monosaccharide (e.g., selected from glucose, fructose and galactose) and/or the at least one calorific disaccharide (e.g., selected from sucrose, maltose, and lactose). In various embodiments, the first phase may include less than 10%, 9%, 8%, 7%, 6%, 5%, 4%, 3%, 2%, or 1% w/w of the at least one calorific monosaccharide. In some embodiments, the first phase may include less than 10%, 9%, 8%, 7%, 6%, 5%, 4%, 3%, 2%, or 1% w/w of the at least one calorific disaccharide.

In certain aspects, the amount of oligosaccharides in the first phase is greater, on a weight/weight basis, than the amount of monosaccharides and/or disaccharides in the first phase. In various aspects, the amount of oligosaccharides in the second phase is less, on a weight/weight basis, than the amount of monosaccharides and/or disaccharides in the second phase.

In various aspects, the foodstuff described herein can comprise at least two phases, for example, a first phase that comprises an oligosaccharide and a second phase that comprises a monosaccharide and/or disaccharide sugar/sweetener. The oligosaccharide of the first phase can be selected from: (a) cello-oligosaccharides with a DP from two to six; (b) xylo-oligosaccharides with a DP from two to twelve; (c) mixed-linkage glucan oligosaccharides with a DP from two to five; (d) manno-oligosaccharides having a DP from two to twelve; (e) xyloglucan oligosaccharides having a DP from four to twelve; or (f) any combination thereof. The monosaccharide and/or disaccharide sugar/sweetener can comprise glucose, fructose, galactose, sucrose, maltose, lactose, another suitable monosaccharide or disaccharide, or a combination thereof. In certain embodiments, the first phase may be free of, or substantially free of, a monosaccharide and/or disaccharide sugar/sweetener, and the second phase may be free of, or substantially free of, an oligosaccharide.

In some cases, the foodstuff described herein can comprise at least two phases, for example, a first phase that comprises a monosaccharide and/or disaccharide sugar/sweetener and a second phase that comprises an oligosaccharide. The monosaccharide and/or disaccharide sugar/sweetener of the first phase can comprise glucose, fructose, galactose, sucrose, maltose, lactose, another suitable monosaccharide or disaccharide, or a combination thereof. The oligosaccharide of the second phase can be selected from: (a) cello-oligosaccharides with a DP from two to six; (b) xylo-oligosaccharides with a DP from two to twelve; (c) mixed-linkage glucan oligosaccharides with a DP from two to five; (d) manno-oligosaccharides having a DP from two to twelve; (e) xyloglucan oligosaccharides having a DP from four to twelve; or (f) any combination thereof. In certain embodiments, the second phase may be free of, or substantially free of, a monosaccharide and/or disaccharide sugar/sweetener, and the first phase may be free of, or substantially free of, an oligosaccharide.

In some embodiments, a foodstuff may comprise a first phase comprising cello-oligosaccharides with a degree of polymerization (DP) from two to six and xylo-oligosaccharides with a DP from two to twelve. The first phase may comprise from 5% to 95%, 10% to 90%, 15% to 85%, 20% to 80%, 30% to 70%, 40% to 60%, 15% to 95%, 20% to 95%, 30% to 95%, 40% to 95%, 50% to 95%, 60% to 95%, 70% to 95%, 80% to 95%, 5% to 85%, 5% to 75%, 5% to 65%, 5% to 55%, 5% to 45%, 5% to 35%, 5% to 25%, or 5% to 15% by dry weight of the cello-oligosaccharides and the xylo-oligosaccharides. The foodstuff may further comprise a second phase comprising a sweetener comprising at least one of glucose, fructose, galactose, sucrose, maltose, or lactose. The second phase may comprise from 10% to 100%, 5% to 95%, 10% to 90%, 15% to 85%, 20% to 80%, 30% to 70%, 40% to 60%, 15% to 95%, 20% to 95%, 30% to 95%, 40% to 95%, 50% to 95%, 60% to 95%, 70% to 95%, 80% to 95%, 5% to 85%, 5% to 75%, 5% to 65%, 5% to 55%, 5% to 45%, 5% to 35%, 5% to 25%, or 5% to 15% by dry weight of the sweetener.

In some cases, the cello-oligosaccharides and xylo-oligosaccharides may be present at a w/w ratio of 5:95 to 95:5, 10:90 to 90:10, 20:80 to 80:20, 30:70 to 70:30, or 40:60 to 60:40 in the foodstuff. The cello-oligosaccharides and xylo-oligosaccharides may be present at a w/w ratio of 5:95 to 95:5, 10:90 to 90:10, 20:80 to 80:20, 30:70 to 70:30, or 40:60 to 60:40 in the first phase. The cello-oligosaccharides and xylo-oligosaccharides may be present at a w/w ratio of 5:95 to 95:5, 10:90 to 90:10, 20:80 to 80:20, 30:70 to 70:30, or 40:60 to 60:40 in the second phase.

The first phase may comprise less than 25%, 20%, 15%, 10%, 5%, or 1% by dry weight of the sweetener. The second phase may comprise less than 50%, 40%, 30%, 20%, 10%, or 5% by dry weight of the cello-oligosaccharides and the xylo-oligosaccharides. The foodstuff may comprise from 5% to 50%, 10% to 50%, 15% to 50%, 20% to 50%, 30% to 50%, 40% to 50%, 5% to 40%, 5% to 30%, 5% to 25%, 5% to 20%, 5% to 15%, 10% to 40%, 15% to 35%, or 20% to 30% by dry weight of the sweetener. The foodstuff may comprise from 5% to 75%, 15% to 75%, 25% to 75%, 35% to 75%, 45% to 75%, 55% to 75%, 65% to 75%, 5% to 65%, 5% to 55%, 5% to 45%, 5% to 35%, 5% to 25%, 5% to 15%, 15% to 65%, 25% to 55%, or 35% to 45% by dry weight of the cello-oligosaccharides and the xylo-oligosaccharides.

In certain instances, a ratio of the first phase to the second phase may be from 10:1 to 1:10 by dry weight. A ratio of the first phase to the second phase may be at least 10:1, 9:2, 8:3, 7:4, 6:5, 1:1, 5:6, 4:7, 3:8, 2:9, or 1:10. A ratio of the first phase to the second phase may be at most 10:1, 9:2, 8:3, 7:4, 6:5, 1:1, 5:6, 4:7, 3:8, 2:9, or 1:10.

The first phase may be a fat-based composition, water-based composition, or bakery composition. The second phase may be a fat-based composition, water-based composition, or bakery composition. The first phase may a bakery composition and the second phase may be a fat-based composition. The first phase may be a bakery composition and the second phase may be a water-based composition. The first phase may be a fat-based composition and the second phase may be a water-based composition. The second phase may be a bakery composition and the first phase may be a fat-based composition. The second phase may be a bakery composition and the first phase may be a water-based composition. The second phase may be a fat-based composition and the first phase may be a water-based composition.

Any of the phases described herein, in addition to comprising a sweetening component, can additionally comprise one or more other components or ingredients. Such components or ingredients may include, for example, butter, margarine, shortening, oil, palm oil, baking powder, baking soda, egg, yeast, corn starch, milk, cream, buttermilk, flour, salt, or any other suitable ingredient.

The cello-oligosaccharides used herein for the foodstuffs or in the oligosaccharide mixtures can comprise greater than about 50%, greater than about 60%, greater than about 70%, greater than about 70%, greater than about 80%, or greater than about 90% cellobiose. The cello-oligosaccharides used herein for the foodstuffs or in the oligosaccharide mixtures can comprise greater than 50%, greater than 55%, greater than 60%, greater than 65%, greater than 70%, greater than 75%, greater than 80%, greater than 85%, greater than 90%, greater than 95%, or greater than 99% cellobiose. The cello-oligosaccharides used herein for the foodstuffs or in the oligosaccharide mixtures can comprise at least 50%, at least 55%, at least 60%, at least 65%, at least 70%, at least 75%, at least 80%, at least 85%, at least 90%, at least 95%, or at least 99% cellobiose. The cello-oligosaccharides used herein for the foodstuffs or in the oligosaccharide mixtures can comprise any range between the percentages disclosed above (e.g., from 50% to 90% cellobiose).

The xylo-oligosaccharides used herein for the foodstuffs or in the oligosaccharide mixtures can comprise xylo-oligosaccharides with one or more side branches. The one or more side branches can comprise glucuronosyl side branches, methylglucuronosyl side branches, arabinosyl side branches, or combinations thereof.

The foodstuffs described herein may further comprise a polysaccharide, wherein the polysaccharide is a cellulosic polysaccharide, a hemicellulosic polysaccharide, a polysaccharide derivative, or a polysaccharide aggregate. In certain embodiments, the polysaccharide is a cellulosic polysaccharide. In certain cases, the hemicellulosic polysaccharide is xylan. In various cases, the polysaccharide derivative is carboxymethylcellulose. In some cases, the polysaccharide aggregate is undigested lignocellulosic material. In certain cases, the foodstuff comprises less than about 15% by dry weight of the polysaccharide. In some cases, the first phase comprises less than about 15% by dry weight of the polysaccharide. In various cases, the second phase comprises less than about 5%, about 4%, about 3%, about 2%, about 1%, or about 0.5% of the polysaccharide. In some cases, the second phase is free, or substantially free, of the polysaccharide. In some cases, the foodstuff comprises less than 15% by dry weight of the polysaccharide. In certain cases, the first phase comprises less than 15% by dry weight of the polysaccharide. In various cases, the second phase comprises less than 5%, 4%, 3%, 2%, 1%, or 0.5% of the polysaccharide. In some cases, the second phase is free of the polysaccharide.

The foodstuffs described herein can further comprise a phenolic compound. The phenolic compound can comprise lignin, a lignin breakdown product, ferulic acid, a ferulic acid derivative, or any combination thereof. In certain embodiments, the first phase comprises the phenolic compound. In various embodiments, the second phase is free, or substantially free, of the phenolic compound.

In some cases, one or more of the oligosaccharides (e.g., in the first phase) may be in a non-crystalline, or substantially non-crystalline, form. In certain cases, the monosaccharide, the disaccharide, or both (e.g., in the second phase) may be in a crystalline, or semi-crystalline, form. In various embodiments, one or more of oligosaccharides may be in a non-crystalline, or substantially non-crystalline, form, and the monosaccharide, the disaccharide, or both may be in a crystalline, or semi-crystalline, form.

In various aspects, the foodstuff described herein can comprise at least two phases, for example, a first phase that comprises at least one oligosaccharide and a second phase that comprises a monosaccharide and/or disaccharide sugar/sweetener. The at least one oligosaccharide of the first phase can be selected from: (a) cello-oligosaccharides with a DP from two to six; (b) xylo-oligosaccharides with a DP from two to twelve; (c) mixed-linkage glucan oligosaccharides with a DP from two to five; (d) manno-oligosaccharides having a DP from two to twelve; (e) xyloglucan oligosaccharides having a DP from four to twelve; or (f) any combination thereof. The monosaccharide and/or disaccharide sugar/sweetener can comprise glucose, fructose, galactose, sucrose, maltose, lactose, another suitable monosaccharide or disaccharide, or a combination thereof. In certain embodiments, the first phase may be free, or substantially free, of a monosaccharide and/or disaccharide sugar/sweetener, and the second phase may be free, or substantially free, of an oligosaccharide.

The second phase of a multiphase foodstuff can comprise a monosaccharide and/or disaccharide sugar/sweetener or any combination of monosaccharides or disaccharides sugar/sweetener. In certain embodiments, the monosaccharide and/or disaccharide sugar/sweetener may be selected from any one or more of glucose, fructose, galactose, sucrose, maltose, lactose, another suitable monosaccharide and/or disaccharide, or a combination thereof. In certain embodiments, the second phase may comprise glucose. In various embodiments, the second phase may comprise fructose. In some embodiments, the second phase may comprise sucrose. In certain embodiments, the second phase may comprise galactose. In various embodiments, the second phase may comprise maltose. In some embodiments, the second phase may comprise lactose. In certain embodiments, the monosaccharide and/or disaccharide sugar/sweetener of the second phase may comprise at least about 1%, at least about 2.5%, at least about 5%, at least about 7.5%, at least about 10%, at least about 12.5%, at least about 15%, at least about 17.5%, or at least about 20% by dry weight of the second phase. In certain embodiments, the monosaccharide and/or disaccharide sugar/sweetener may comprise at least about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the second phase. In certain embodiments, the monosaccharide and/or disaccharide sugar/sweetener of the second phase may comprise at least about 1%, at least about 2.5%, at least about 5%, at least about 7.5%, at least about 10%, at least about 12.5%, at least about 15%, at least about 17.5%, or at least about 20% by dry weight of the foodstuff. In certain embodiments, the monosaccharide and/or disaccharide sugar/sweetener may comprise at least about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the foodstuff.

In various embodiments, the monosaccharide and/or disaccharide sugar/sweetener of the second phase may comprise at least 1%, at least 2.5%, at least 5%, at least 7.5%, at least 10%, at least 12.5%, at least 15%, at least 17.5%, or at least 20% by dry weight of the second phase. In some embodiments, the monosaccharide and/or disaccharide sugar/sweetener may comprise at least 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the second phase. In certain embodiments, the monosaccharide and/or disaccharide sugar/sweetener of the second phase may comprise at least 1%, at least 2.5%, at least 5%, at least 7.5%, at least 10%, at least 12.5%, at least 15%, at least 17.5%, or at least 20% by dry weight of the foodstuff. In various embodiments, the monosaccharide and/or disaccharide sugar/sweetener may comprise at least 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the foodstuff.

The second phase can be made using a monosaccharide, a disaccharide, or any combination thereof. In certain embodiments, the second phase that comprises a monosaccharide and/or disaccharide sugar/sweetener may comprise less than about 10%, about 5%, about 2%, or about 1% by dry weight of a polysaccharide or oligosaccharide. In certain embodiments, the second phase that comprises a monosaccharide and/or disaccharide sugar/sweetener may be free, or substantially free, of a polysaccharide or oligosaccharide. In various embodiments, the second phase that comprises a monosaccharide and/or disaccharide sugar/sweetener may comprise less than 10%, 5%, 2%, or 1% by dry weight of a polysaccharide or oligosaccharide. In certain embodiments, the second phase that comprises a monosaccharide and/or disaccharide sugar/sweetener may be free of a polysaccharide or oligosaccharide.

The first phase of the multiphase foodstuff as described herein, can comprise a mixture of at least two oligosaccharides. In certain embodiments, the mixture of the at least two oligosaccharides can comprise at least about 1%, at least about 2.5%, at least about 5%, at least about 7.5%, at least about 10%, at least about 12.5%, at least about 15%, at least about 17.5%, or at least about 20% by dry weight of the first phase. In certain embodiments, the mixture of the at least two oligosaccharides can comprise at least about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the first phase. In certain embodiments, the mixture of the two oligosaccharides can comprise at least about 1%, at least about 2.5%, at least about 5%, at least about 7.5%, at least about 10%, at least about 12.5%, at least about 15%, at least about 17.5%, or at least about 20% by dry weight of the foodstuff. In certain embodiments, the mixture of the two oligosaccharides can comprise at least about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the foodstuff. In various embodiments, the mixture of the at least two oligosaccharides can comprise at least 1%, at least 2.5%, at least 5%, at least 7.5%, at least 10%, at least 12.5%, at least 15%, at least 17.5%, or at least 20% by dry weight of the first phase. In some embodiments, the mixture of the at least two oligosaccharides can comprise at least 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the first phase. In certain embodiments, the mixture of the two oligosaccharides can comprise at least 1%, at least 2.5%, at least 5%, at least 7.5%, at least 10%, at least 12.5%, at least 15%, at least 17.5%, or at least 20% by dry weight of the foodstuff. In various embodiments, the mixture of the two oligosaccharides can comprise at least 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the foodstuff.

The at least two oligosaccharides can comprise a mix of a first oligosaccharide and a second oligosaccharide. An oligosaccharide mixture may include about 5% of a first oligosaccharide and about 95% of a second oligosaccharide w/w. An oligosaccharide mixture may include about 10% of a first oligosaccharide and about 90% of a second oligosaccharide w/w. An oligosaccharide mixture may include about 15% of a first oligosaccharide and about 85% of a second oligosaccharide w/w. An oligosaccharide mixture may include about 20% of a first oligosaccharide and about 80% of a second oligosaccharide w/w. An oligosaccharide mixture may include about 25% of a first oligosaccharide and about 75% of a second oligosaccharide w/w. An oligosaccharide mixture may include about 30% of a first oligosaccharide and about 70% of a second oligosaccharide w/w. An oligosaccharide mixture may include about 35% of a first oligosaccharide and about 65% of a second oligosaccharide w/w. An oligosaccharide mixture may include about 40% of a first oligosaccharide and about 50% of a second oligosaccharide w/w. An oligosaccharide mixture may include about 45% of a first oligosaccharide and about 55% of a second oligosaccharide w/w. An oligosaccharide mixture may include about 50% of a first oligosaccharide and about 50% of a second oligosaccharide w/w. An oligosaccharide mixture may include about 55% of a first oligosaccharide and about 45% of a second oligosaccharide w/w. An oligosaccharide mixture may include about 60% of a first oligosaccharide and about 30% of a second oligosaccharide w/w. An oligosaccharide mixture may include about 65% of a first oligosaccharide and about 35% of a second oligosaccharide w/w. An oligosaccharide mixture may include about 70% of a first oligosaccharide and about 30% of a second oligosaccharide w/w. An oligosaccharide mixture may include about 75% of a first oligosaccharide and about 25% of a second oligosaccharide w/w. An oligosaccharide mixture may include about 80% of a first oligosaccharide and about 20% of a second oligosaccharide w/w. An oligosaccharide mixture may include about 85% of a first oligosaccharide and about 15% of a second oligosaccharide w/w. An oligosaccharide mixture may include about 90% of a first oligosaccharide and about 10% of a second oligosaccharide w/w. An oligosaccharide mixture may include about 95% of a first oligosaccharide and about 5% of a second oligosaccharide w/w.

An oligosaccharide mixture may include 5% of a first oligosaccharide and 95% of a second oligosaccharide w/w. An oligosaccharide mixture may include 10% of a first oligosaccharide and 90% of a second oligosaccharide w/w. An oligosaccharide mixture may include 15% of a first oligosaccharide and 85% of a second oligosaccharide w/w. An oligosaccharide mixture may include 20% of a first oligosaccharide and 80% of a second oligosaccharide w/w. An oligosaccharide mixture may include 25% of a first oligosaccharide and 75% of a second oligosaccharide w/w. An oligosaccharide mixture may include 30% of a first oligosaccharide and 70% of a second oligosaccharide w/w. An oligosaccharide mixture may include 35% of a first oligosaccharide and 65% of a second oligosaccharide w/w. An oligosaccharide mixture may include 40% of a first oligosaccharide and 50% of a second oligosaccharide w/w. An oligosaccharide mixture may include 45% of a first oligosaccharide and 55% of a second oligosaccharide w/w. An oligosaccharide mixture may include 50% of a first oligosaccharide and 50% of a second oligosaccharide w/w. An oligosaccharide mixture may include 55% of a first oligosaccharide and 45% of a second oligosaccharide w/w. An oligosaccharide mixture may include 60% of a first oligosaccharide and 30% of a second oligosaccharide w/w. An oligosaccharide mixture may include 65% of a first oligosaccharide and 35% of a second oligosaccharide w/w. An oligosaccharide mixture may include 70% of a first oligosaccharide and 30% of a second oligosaccharide w/w. An oligosaccharide mixture may include 75% of a first oligosaccharide and 25% of a second oligosaccharide w/w. An oligosaccharide mixture may include 80% of a first oligosaccharide and 20% of a second oligosaccharide w/w. An oligosaccharide mixture may include 85% of a first oligosaccharide and 15% of a second oligosaccharide w/w. An oligosaccharide mixture may include 90% of a first oligosaccharide and 10% of a second oligosaccharide w/w. An oligosaccharide mixture may include 95% of a first oligosaccharide and 5% of a second oligosaccharide w/w. In some examples, a first oligosaccharide may be cello-oligosaccharides and a second oligosaccharide may be xylo-oligosaccharides. In certain examples, a first oligosaccharide may be cello-oligosaccharides and a second oligosaccharide may be manno-oligosaccharides. In various examples, a first oligosaccharide may be xylo-oligosaccharides and a second oligosaccharide may be manno-oligosaccharides. Other combinations of a first oligosaccharide and a second oligosaccharide are also within the scope of this disclosure.

An oligosaccharide mixture may include two or more oligosaccharides, a first oligosaccharide and a second oligosaccharide which may be different than the first oligosaccharide. For instance, the first oligosaccharide may be a xylo-oligosaccharide, a cello-oligosaccharide, a manno-oligosaccharide, or another oligosaccharide as provided herein whereas the second oligosaccharide can be a xylo-oligosaccharide, a cello-oligosaccharide, a manno-oligosaccharide, or another oligosaccharide not used as the first oligosaccharide. The ratio of a first oligosaccharide to a second oligosaccharide in the mixture may be about 1:1. The ratio of a first oligosaccharide to a second oligosaccharide in the mixture may be about 1:2. The ratio of a first oligosaccharide to a second oligosaccharide in the mixture may be about 1:3. The ratio of a first oligosaccharide to a second oligosaccharide in the mixture may be about 1:4. The ratio of a first oligosaccharide to a second oligosaccharide in the mixture may be about 1:5. The ratio of a first oligosaccharide to a second oligosaccharide in the mixture may be about 1:6. The ratio of a first oligosaccharide to a second oligosaccharide in the mixture may be about 1:7. The ratio of a first oligosaccharide to a second oligosaccharide in the mixture may be about 1:8. The ratio of a first oligosaccharide to a second oligosaccharide in the mixture may be about 1:9. The ratio of a first oligosaccharide to a second oligosaccharide in the mixture may be 1:1. The ratio of a first oligosaccharide to a second oligosaccharide in the mixture may be 1:2. The ratio of a first oligosaccharide to a second oligosaccharide in the mixture may be 1:3. The ratio of a first oligosaccharide to a second oligosaccharide in the mixture may be 1:4. The ratio of a first oligosaccharide to a second oligosaccharide in the mixture may be 1:5. The ratio of a first oligosaccharide to a second oligosaccharide in the mixture may be 1:6. The ratio of a first oligosaccharide to a second oligosaccharide in the mixture may be 1:7. The ratio of a first oligosaccharide to a second oligosaccharide in the mixture may be 1:8. The ratio of a first oligosaccharide to a second oligosaccharide in the mixture may be 1:9.

The ratio of a first oligosaccharide to a second oligosaccharide in the mixture may be about 2:1. The ratio of a first oligosaccharide to a second oligosaccharide in the mixture may be about 2:3. The ratio of a first oligosaccharide to a second oligosaccharide in the mixture may be about 2:5. The ratio of a first oligosaccharide to a second oligosaccharide in the mixture may be about 2:7. The ratio of a first oligosaccharide to a second oligosaccharide in the mixture may be about 2:9. The ratio of a first oligosaccharide to a second oligosaccharide in the mixture may be 2:1. The ratio of a first oligosaccharide to a second oligosaccharide in the mixture may be 2:3. The ratio of a first oligosaccharide to a second oligosaccharide in the mixture may be 2:5. The ratio of a first oligosaccharide to a second oligosaccharide in the mixture may be 2:7. The ratio of a first oligosaccharide to a second oligosaccharide in the mixture may be 2:9. The oligosaccharides may be cello-oligosaccharides, manno-oligosaccharides, xylo-oligosaccharides, xyloglucan-oligosaccharides, mixed-linkage oligosaccharides, chito-oligosaccharides, or other oligosaccharides as provided herein, wherein the first oligosaccharide may be selected to be a different oligosaccharide than the second oligosaccharide.

The ratio of a first oligosaccharide to a second oligosaccharide in the mixture may be about 3:1. The ratio of a first oligosaccharide to a second oligosaccharide in the mixture may be about 3:2. The ratio of a first oligosaccharide to a second oligosaccharide in the mixture may be about 3:4. The ratio of a first oligosaccharide to a second oligosaccharide in the mixture may be about 3:5. The ratio of a first oligosaccharide to a second oligosaccharide in the mixture may be about 3:7. The ratio of a first oligosaccharide to a second oligosaccharide in the mixture may be about 3:8. The ratio of a first oligosaccharide to a second oligosaccharide in the mixture may be 3:1. The ratio of a first oligosaccharide to a second oligosaccharide in the mixture may be 3:2. The ratio of a first oligosaccharide to a second oligosaccharide in the mixture may be 3:4. The ratio of a first oligosaccharide to a second oligosaccharide in the mixture may be 3:5. The ratio of a first oligosaccharide to a second oligosaccharide in the mixture may be 3:7. The ratio of a first oligosaccharide to a second oligosaccharide in the mixture may be 3:8. The oligosaccharides may be cello-oligosaccharides, manno-oligosaccharides, xylo-oligosaccharides, xyloglucan-oligosaccharides, mixed-linkage oligosaccharides, chito-oligosaccharides, or other oligosaccharides provided herein, wherein the first oligosaccharide may be selected to be a different oligosaccharide than the second oligosaccharide.

The ratio of a first oligosaccharide to a second oligosaccharide in an oligosaccharide mixture including two or more oligosaccharides may be from 1:9 to 9:1. The ratio of a first oligosaccharide to a second oligosaccharide may be from 1:4 to 4:1. The ratio of a first oligosaccharide to a second oligosaccharide may be from 1:3 to 3:1. The ratio of a first oligosaccharide to a second oligosaccharide may be from 2:3 to 3:2. The oligosaccharides may be cello-oligosaccharides, manno-oligosaccharides, xylo-oligosaccharides, xyloglucan-oligosaccharides, mixed-linkage oligosaccharides, chito-oligosaccharides, or other oligosaccharides provided herein, wherein the first oligosaccharide may be selected to be a different oligosaccharide than the second oligosaccharide.

In certain embodiments, the at least two oligosaccharides may be selected from cello-oligosaccharides with a DP from two to six and cello-oligosaccharides with a DP from two to six. In certain embodiments, the at least two oligosaccharides may be selected from cello-oligosaccharides with a DP from two to six and xylo-oligosaccharides with a DP from two to twelve. In certain embodiments, the at least two oligosaccharides may be selected from cello-oligosaccharides with a DP from two to six and mixed-linkage glucan oligosaccharides with a DP from two to five. In certain embodiments, the at least two oligosaccharides may be selected from cello-oligosaccharides with a DP from two to six and manno-oligosaccharides having a DP from two to twelve. In certain embodiments, the at least two oligosaccharides may be selected from cello-oligosaccharides with a DP from two to six and xyloglucan oligosaccharides having a DP from four to twelve. In certain embodiments, the at least two oligosaccharides may be selected from xylo-oligosaccharides with a DP from two to twelve and cello-oligosaccharides with a DP from two to six. In certain embodiments, the at least two oligosaccharides may be selected from xylo-oligosaccharides with a DP from two to twelve and xylo-oligosaccharides with a DP from two to twelve. In certain embodiments, the at least two oligosaccharides may be selected from xylo-oligosaccharides with a DP from two to twelve and mixed-linkage glucan oligosaccharides with a DP from two to five. In certain embodiments, the at least two oligosaccharides may be selected from xylo-oligosaccharides with a DP from two to twelve and manno-oligosaccharides having a DP from two to twelve. In certain embodiments, the at least two oligosaccharides may be selected from xylo-oligosaccharides with a DP from two to twelve and xyloglucan oligosaccharides having a DP from four to twelve. In certain embodiments, the at least two oligosaccharides may be selected from mixed-linkage glucan oligosaccharides with a DP from two to five and cello-oligosaccharides with a DP from two to six. In certain embodiments, the at least two oligosaccharides may be selected from mixed-linkage glucan oligosaccharides with a DP from two to five and xylo-oligosaccharides with a DP from two to twelve. In certain embodiments, the at least two oligosaccharides may be selected from mixed-linkage glucan oligosaccharides with a DP from two to five and mixed-linkage glucan oligosaccharides with a DP from two to five. In certain embodiments, the at least two oligosaccharides may be selected from mixed-linkage glucan oligosaccharides with a DP from two to five and manno-oligosaccharides having a DP from two to twelve. In certain embodiments, the at least two oligosaccharides may be selected from mixed-linkage glucan oligosaccharides with a DP from two to five and xyloglucan oligosaccharides having a DP from four to twelve. In certain embodiments, the at least two oligosaccharides may be selected from manno-oligosaccharides having a DP from two to twelve and cello-oligosaccharides with a DP from two to six. In certain embodiments, the at least two oligosaccharides may be selected from manno-oligosaccharides having a DP from two to twelve and xylo-oligosaccharides with a DP from two to twelve. In certain embodiments, the at least two oligosaccharides may be selected from manno-oligosaccharides having a DP from two to twelve and mixed-linkage glucan oligosaccharides with a DP from two to five. In certain embodiments, the at least two oligosaccharides may be selected from manno-oligosaccharides having a DP from two to twelve and manno-oligosaccharides having a DP from two to twelve. In certain embodiments, the at least two oligosaccharides may be selected from manno-oligosaccharides having a DP from two to twelve and xyloglucan oligosaccharides having a DP from four to twelve. In certain embodiments, the at least two oligosaccharides may be selected from xyloglucan oligosaccharides having a DP from four to twelve and cello-oligosaccharides with a DP from two to six. In certain embodiments, the at least two oligosaccharides may be selected from xyloglucan oligosaccharides having a DP from four to twelve and xylo-oligosaccharides with a DP from two to twelve. In certain embodiments, the at least two oligosaccharides may be selected from xyloglucan oligosaccharides having a DP from four to twelve and mixed-linkage glucan oligosaccharides with a DP from two to five. In certain embodiments, the at least two oligosaccharides may be selected from xyloglucan oligosaccharides having a DP from four to twelve and manno-oligosaccharides having a DP from two to twelve. In certain embodiments, the at least two oligosaccharides may be selected from xyloglucan oligosaccharides having a DP from four to twelve and xyloglucan oligosaccharides having a DP from four to twelve.

The concentration of xylo-oligosaccharides with a DP of two in a xylo-oligosaccharide mixture may be about 2% to about 80% w/w. The concentration of xylo-oligosaccharides with a DP of two in a xylo-oligosaccharide mixture may be 2% to 80% w/w. The concentration of xylo-oligosaccharides with a DP of two may be at least 2%, 4%, 6%, 8%, 10%, 12%, 15%, 18%, 20%, 25%, or 30% w/w. The concentration of xylo-oligosaccharides with a DP of two may be higher in some cases, for instance, up to 35%, 40%, 45%, 50%, 55%, 60%, 65%, 70%, 75%, or 80% w/w.

The concentration of xylo-oligosaccharides with a DP of three in a xylo-oligosaccharide mixture may be about 2% to about 20% w/w. The concentration of xylo-oligosaccharides with a DP of three in a xylo-oligosaccharide mixture may be 2% to 20% w/w. The concentration of xylo-oligosaccharides with a DP of three may be at least 2%, 4%, 6%, 8%, 10%, 12%, 15%, 18%, or 20% w/w.

The concentration of xylo-oligosaccharides with a DP of four in a xylo-oligosaccharide mixture may be about 5% to about 20% w/w. The concentration of xylo-oligosaccharides with a DP of four in a xylo-oligosaccharide mixture may be 5% to 20% w/w. The concentration of xylo-oligosaccharides with a DP of four may be at least 5%, 8%, 10%, 12%, 15%, 18%, or 20% w/w.

The concentration of xylo-oligosaccharides with a DP of five in a xylo-oligosaccharide mixture may be about 5% to about 20% w/w. The concentration of xylo-oligosaccharides with a DP of five in a xylo-oligosaccharide mixture may be 5% to 20% w/w. The concentration of xylo-oligosaccharides with a DP of five may be at least 5%, 7%, 8%, 10%, 12%, 15%, 18%, or 20% w/w.

The concentration of xylo-oligosaccharides with a DP of six in a xylo-oligosaccharide mixture may be about 5% to about 25% w/w. The concentration of xylo-oligosaccharides with a DP of six in a xylo-oligosaccharide mixture may be 5% to 25% w/w. The concentration of xylo-oligosaccharides with a DP of six may be at least 5%, 8%, 10%, 12%, 15%, 18%, 20%, or 25% w/w.

The concentration of xylo-oligosaccharides with a DP of seven in a xylo-oligosaccharide mixture may be about 2% to about 20% w/w. The concentration of xylo-oligosaccharides with a DP of seven in a xylo-oligosaccharide mixture may be 2% to 20% w/w. The concentration of xylo-oligosaccharides with a DP of seven may be at least 2%, 4%, 6%, 8%, 10%, 12%, 15%, 17%, or 20% w/w.

The concentration of xylo-oligosaccharides with a DP of eight in a xylo-oligosaccharide mixture may be about 1% to about 15% w/w. The concentration of xylo-oligosaccharides with a DP of eight in a xylo-oligosaccharide mixture may be 1% to 15% w/w. The concentration of xylo-oligosaccharides with a DP of eight may be at least 1%, 2%, 3%, 4%, 5%, 6%, 7%, 8%, 9%, 10%, or 15% w/w.

The concentration of xylo-oligosaccharides with a DP of nine in a xylo-oligosaccharide mixture may be about 2% to about 15% w/w. The concentration of xylo-oligosaccharides with a DP of nine in a xylo-oligosaccharide mixture may be 2% to 15% w/w. The concentration of xylo-oligosaccharides with a DP of nine may be at least 1%, 2%, 3%, 4%, 5%, 6%, 7%, 8%, 9%, 10%, or 15% w/w.

The concentration of xylo-oligosaccharides with a DP of ten in a xylo-oligosaccharide mixture may be about 2% to about 15% w/w. The concentration of xylo-oligosaccharides with a DP of ten in a xylo-oligosaccharide mixture may be 2% to 15% w/w. The concentration of xylo-oligosaccharides with a DP of ten may be at least 1%, 2%, 3%, 4%, 5%, 6%, 7%, 8%, 9%, 10%, or 15% w/w.

The concentration of xylo-oligosaccharides with a DP of eleven in a xylo-oligosaccharide mixture may be about 2% to about 15% w/w. The concentration of xylo-oligosaccharides with a DP of eleven in a xylo-oligosaccharide mixture may be 2% to 15% w/w. The concentration of xylo-oligosaccharides with a DP of eleven may be at least 1%, 2%, 3%, 4%, 5%, 6%, 7%, 8%, 9%, 10%, or 15% w/w.

The concentration of xylo-oligosaccharides with a DP of twelve in a xylo-oligosaccharide mixture may be about 2% to about 15% w/w. The concentration of xylo-oligosaccharides with a DP of twelve in a xylo-oligosaccharide mixture may be 2% to 15% w/w. The concentration of xylo-oligosaccharides with a DP of twelve may be at least 1%, 2%, 3%, 4%, 5%, 6%, 7%, 8%, 9%, 10%, or 15% w/w.

The concentration of cello-oligosaccharides with a DP of two in a cello-oligosaccharide mixture may be about 2% to about 80% w/w. The concentration of cello-oligosaccharides with a DP of two in a cello-oligosaccharide mixture may be 2% to 80% w/w. The concentration of cello-oligosaccharides with a DP of two may be at least 2%, 4%, 6%, 8%, 10%, 12%, 15%, 18%, 20%, 25%, or 30% w/w. The concentration of cello-oligosaccharides with a DP of two may be higher in some cases, for instance, at least 35%, 40%, 45%, 50%, 55%, 60%, 65%, 70%, 75%, or 80% w/w.

The concentration of cello-oligosaccharides with a DP of three in a cello-oligosaccharide mixture may be about 2% to about 20% w/w. The concentration of cello-oligosaccharides with a DP of three in a cello-oligosaccharide mixture may be 2% to 20% w/w. The concentration of cello-oligosaccharides with a DP of three may be at least 2%, 4%, 6%, 8%, 10%, 12%, 15%, 18%, or 20% w/w.

The concentration of cello-oligosaccharides with a DP of four in a cello-oligosaccharide mixture may be about 5% to about 20% w/w. The concentration of cello-oligosaccharides with a DP of four in a cello-oligosaccharide mixture may be 5% to 20% w/w. The concentration of cello-oligosaccharides with a DP of four may be at least 5%, 8%, 10%, 12%, 15%, 18%, or 20% w/w.

The concentration of cello-oligosaccharides with a DP of five in a cello-oligosaccharide mixture may be about 5% to about 20% w/w. The concentration of cello-oligosaccharides with a DP of five in a cello-oligosaccharide mixture may be 5% to 20% w/w. The concentration of cello-oligosaccharides with a DP of five may be at least 5%, 7%, 8%, 10%, 12%, 15%, 18%, or 20% w/w.

The concentration of cello-oligosaccharides with a DP of six in a cello-oligosaccharide mixture may be about 5% to about 25% w/w. The concentration of cello-oligosaccharides with a DP of six in a cello-oligosaccharide mixture may be 5% to 25% w/w. The concentration of cello-oligosaccharides with a DP of six may be at least 5%, 8%, 10%, 12%, 15%, 18%, 20%, or 25% w/w.

The concentration of manno-oligosaccharides with a DP of two in a manno-oligosaccharide mixture may be about 2% to about 30% w/w. The concentration of manno-oligosaccharides with a DP of two in a manno-oligosaccharide mixture may be 2% to 30% w/w. The concentration of manno-oligosaccharides with a DP of two may be at least 2%, 4%, 6%, 8%, 10%, 12%, 15%, 18%, 20%, 25%, or 30% w/w.

The concentration of manno-oligosaccharides with a DP of three in a manno-oligosaccharide mixture may be about 2% to about 20% w/w. The concentration of manno-oligosaccharides with a DP of three in a manno-oligosaccharide mixture may be 2% to 20% w/w. The concentration of manno-oligosaccharides with a DP of three may be at least 2%, 4%, 6%, 8%, 10%, 12%, 15%, 18%, or 20% w/w.

The concentration of manno-oligosaccharides with a DP of four in a manno-oligosaccharide mixture may be about 5% to about 20% w/w. The concentration of manno-oligosaccharides with a DP of four in a manno-oligosaccharide mixture may be 5% to 20% w/w. The concentration of manno-oligosaccharides with a DP of four may be at least 5%, 8%, 10%, 12%, 15%, 18%, or 20% w/w.

The concentration of manno-oligosaccharides with a DP of five in a manno-oligosaccharide mixture may be about 5% to about 20% w/w. The concentration of manno-oligosaccharides with a DP of five in a manno-oligosaccharide mixture may be 5% to 20% w/w. The concentration of manno-oligosaccharides with a DP of five may be at least 5%, 7%, 8%, 10%, 12%, 15%, 18%, or 20% w/w.

The concentration of manno-oligosaccharides with a DP of six in a manno-oligosaccharide mixture may be about 5% to about 25% w/w. The concentration of manno-oligosaccharides with a DP of six in a manno-oligosaccharide mixture may be 5% to 25% w/w. The concentration of manno-oligosaccharides with a DP of six may be at least 5%, 8%, 10%, 12%, 15%, 18%, 20%, or 25% w/w.

The concentration of manno-oligosaccharides with a DP of seven in a manno-oligosaccharide mixture may be about 2% to about 20% w/w. The concentration of manno-oligosaccharides with a DP of seven in a manno-oligosaccharide mixture may be 2% to 20% w/w. The concentration of manno-oligosaccharides with a DP of seven may be at least 2%, 4%, 6%, 8%, 10%, 12%, 15%, 17%, or 20% w/w.

The concentration of manno-oligosaccharides with a DP of eight in a manno-oligosaccharide mixture may be about 1% to about 15% w/w. The concentration of manno-oligosaccharides with a DP of eight in a manno-oligosaccharide mixture may be 1% to 15% w/w. The concentration of manno-oligosaccharides with a DP of eight may be at least 1%, 2%, 3%, 4%, 5%, 6%, 7%, 8%, 9%, 10%, or 15% w/w.

The concentration of manno-oligosaccharides with a DP of nine in a manno-oligosaccharide mixture may be about 2% to about 15% w/w. The concentration of manno-oligosaccharides with a DP of nine in a manno-oligosaccharide mixture may be 2% to 15% w/w. The concentration of manno-oligosaccharides with a DP of nine may be at least 1%, 2%, 3%, 4%, 5%, 6%, 7%, 8%, 9%, 10%, or 15% w/w.

The concentration of manno-oligosaccharides with a DP of ten in a manno-oligosaccharide mixture may be about 2% to about 15% w/w. The concentration of manno-oligosaccharides with a DP of ten in a manno-oligosaccharide mixture may be 2% to 15% w/w. The concentration of manno-oligosaccharides with a DP of ten may be at least 1%, 2%, 3%, 4%, 5%, 6%, 7%, 8%, 9%, 10%, or 15% w/w.

The concentration of manno-oligosaccharides with a DP of eleven in a manno-oligosaccharide mixture may be about 2% to about 15% w/w. The concentration of manno-oligosaccharides with a DP of eleven in a manno-oligosaccharide mixture may be 2% to 15% w/w. The concentration of manno-oligosaccharides with a DP of eleven may be at least 1%, 2%, 3%, 4%, 5%, 6%, 7%, 8%, 9%, 10%, or 15% w/w.

The concentration of manno-oligosaccharides with a DP of twelve in a manno-oligosaccharide mixture may be about 2% to about 15% w/w. The concentration of manno-oligosaccharides with a DP of twelve in a manno-oligosaccharide mixture may be 2% to 15% w/w. The concentration of manno-oligosaccharides with a DP of twelve may be at least 1%, 2%, 3%, 4%, 5%, 6%, 7%, 8%, 9%, 10%, or 15% w/w.

The concentration of xyloglucan-oligosaccharides with a DP of four in a xyloglucan-oligosaccharide mixture may be about 5% to about 20% w/w. The concentration of xyloglucan-oligosaccharides with a DP of four in a xyloglucan-oligosaccharide mixture may be 5% to 20% w/w. The concentration of xyloglucan-oligosaccharides with a DP of four may be at least 5%, 8%, 10%, 12%, 15%, 18%, or 20% w/w.

The concentration of xyloglucan-oligosaccharides with a DP of five in a xyloglucan-oligosaccharide mixture may be about 5% to about 20% w/w. The concentration of xyloglucan-oligosaccharides with a DP of five in a xyloglucan-oligosaccharide mixture may be 5% to 20% w/w. The concentration of xyloglucan-oligosaccharides with a DP of five may be at least 5%, 7%, 8%, 10%, 12%, 15%, 18%, or 20% w/w.

The concentration of xyloglucan-oligosaccharides with a DP of six in a xyloglucan-oligosaccharide mixture may be about 5% to about 25% w/w. The concentration of xyloglucan-oligosaccharides with a DP of six in a xyloglucan-oligosaccharide mixture may be 5% to 25% w/w. The concentration of xyloglucan-oligosaccharides with a DP of six may be at least 5%, 8%, 10%, 12%, 15%, 18%, 20%, or 25% w/w.

The concentration of xyloglucan-oligosaccharides with a DP of seven in a xyloglucan-oligosaccharide mixture may be about 2% to about 20% w/w. The concentration of xyloglucan-oligosaccharides with a DP of seven in a xyloglucan-oligosaccharide mixture may be 2% to 20% w/w. The concentration of xyloglucan-oligosaccharides with a DP of seven may be at least 2%, 4%, 6%, 8%, 10%, 12%, 15%, 17%, or 20% w/w.

The concentration of xyloglucan-oligosaccharides with a DP of eight in a xyloglucan-oligosaccharide mixture may be about 1% to about 15% w/w. The concentration of xyloglucan-oligosaccharides with a DP of eight in a xyloglucan-oligosaccharide mixture may be 1% to 15% w/w. The concentration of xyloglucan-oligosaccharides with a DP of eight may be at least 1%, 2%, 3%, 4%, 5%, 6%, 7%, 8%, 9%, 10%, or 15% w/w.

The concentration of xyloglucan-oligosaccharides with a DP of nine in a xyloglucan-oligosaccharide mixture may be about 2% to about 15% w/w. The concentration of xyloglucan-oligosaccharides with a DP of nine in a xyloglucan-oligosaccharide mixture may be 2% to 15% w/w. The concentration of xyloglucan-oligosaccharides with a DP of nine may be at least 1%, 2%, 3%, 4%, 5%, 6%, 7%, 8%, 9%, 10%, or 15% w/w.

The concentration of xyloglucan-oligosaccharides with a DP of ten in a xyloglucan-oligosaccharide mixture may be about 2% to about 15% w/w. The concentration of xyloglucan-oligosaccharides with a DP of ten in a xyloglucan-oligosaccharide mixture may be 2% to 15% w/w. The concentration of xyloglucan-oligosaccharides with a DP of ten may be at least 1%, 2%, 3%, 4%, 5%, 6%, 7%, 8%, 9%, 10%, or 15% w/w.

The concentration of mixed-linkage glucan-oligosaccharides with a DP of two in a mixed-linkage glucan-oligosaccharide mixture may be about 2% to about 30% w/w. The concentration of mixed-linkage glucan-oligosaccharides with a DP of two in a mixed-linkage glucan-oligosaccharide mixture may be 2% to 30% w/w. The concentration of mixed-linkage glucan-oligosaccharides with a DP of two may be at least 2%, 4%, 6%, 8%, 10%, 12%, 15%, 18%, 20%, 25%, or 30% w/w.

The concentration of mixed-linkage glucan-oligosaccharides with a DP of three in a mixed-linkage glucan-oligosaccharide mixture may be about 2% to about 20% w/w. The concentration of mixed-linkage glucan-oligosaccharides with a DP of three in a mixed-linkage glucan-oligosaccharide mixture may be 2% to 20% w/w. The concentration of mixed-linkage glucan-oligosaccharides with a DP of three may be at least 2%, 4%, 6%, 8%, 10%, 12%, 15%, 18%, or 20% w/w.

The concentration of mixed-linkage glucan-oligosaccharides with a DP of four in a mixed-linkage glucan-oligosaccharide mixture may be about 5% to about 20% w/w. The concentration of mixed-linkage glucan-oligosaccharides with a DP of four in a mixed-linkage glucan-oligosaccharide mixture may be about 5% to about 20% w/w. The concentration of mixed-linkage glucan-oligosaccharides with a DP of four may be at least 5%, 8%, 10%, 12%, 15%, 18%, or 20% w/w.

The concentration of mixed-linkage glucan-oligosaccharides with a DP of five in a mixed-linkage glucan-oligosaccharide mixture may be about 5% to about 20% w/w. The concentration of mixed-linkage glucan-oligosaccharides with a DP of five in a mixed-linkage glucan-oligosaccharide mixture may be 5% to 20% w/w. The concentration of mixed-linkage glucan-oligosaccharides with a DP of five may be at least 5%, 7%, 8%, 10%, 12%, 15%, 18%, or 20% w/w.

In another aspect, the foodstuff described herein may comprise at least two phases, wherein a first phase that comprises at last three, at least four, at least five, or more oligosaccharides. As discussed above, the oligosaccharides of the first phase can be selected from: (a) cello-oligosaccharides with a DP from two to six; (b) xylo-oligosaccharides with a DP from two to twelve; (c) mixed-linkage glucan oligosaccharides with a DP from two to five; (d) manno-oligosaccharides having a DP from two to twelve; (e) xyloglucan oligosaccharides having a DP from four to twelve; and (f) any combination thereof. The foodstuff may, optionally, comprise a second phase comprising a monosaccharide and/or disaccharide sugar/sweetener, wherein the monosaccharide and/or disaccharide sugar/sweetener comprises glucose, fructose, galactose, sucrose, maltose, lactose, another suitable monosaccharide or disaccharide, or a combination thereof. In certain embodiments, the first phase may be free, or substantially free, of a monosaccharide and/or disaccharide sugar/sweetener and the second phase may be free, or substantially free, of an oligosaccharide.

In another aspect, the foodstuff described herein comprises at least two phases, a first phase that comprises at last three, at least four, at least five, or more oligosaccharides and a second phase that comprises a monosaccharide and/or disaccharide sugar/sweetener. The oligosaccharides of the first phase can be selected from: (a) cello-oligosaccharides with a DP from two to six; (b) xylo-oligosaccharides with a DP from two to twelve; (c) mixed-linkage glucan oligosaccharides with a DP from two to five; (d) manno-oligosaccharides having a DP from two to twelve; (e) xyloglucan oligosaccharides having a DP from four to twelve; or (f) any combination thereof. The monosaccharide and/or disaccharide sugar/sweetener can comprise glucose, fructose, galactose, sucrose, maltose, lactose, another suitable monosaccharide or disaccharide, or a combination thereof. In certain embodiments, the first phase may be free, or substantially free, of a monosaccharide and/or disaccharide sugar/sweetener and the second phase may be free, or substantially free, of an oligosaccharide.

The second phase of a multiphase foodstuff can comprise a monosaccharide, disaccharide, or any combination of monosaccharides and/or disaccharides (monosaccharide and/or disaccharide sugars/sweeteners). In certain embodiments, the monosaccharide and/or disaccharide sugar sweetener may be selected from any one or more of glucose, fructose, galactose, sucrose, maltose, lactose, another suitable monosaccharide or disaccharide, or a combination thereof. In certain embodiments, the second phase can comprise glucose. In various embodiments, the second phase can comprise fructose. In some embodiments, the second phase can comprise sucrose. In certain embodiments, the second phase can comprise galactose. In various embodiments, the second phase can comprise maltose. In some embodiments, the second phase can comprise lactose. In certain embodiments, the monosaccharide and/or disaccharide sugar/sweetener of the second phase can comprise at least about 1%, at least about 2.5%, at least about 5%, at least about 7.5%, at least about 10%, at least about 12.5%, at least about 15%, at least about 17.5%, or at least about 20% by dry weight of the second phase. In various embodiments, the monosaccharide and/or disaccharide sugar/sweetener can comprise at least about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the second phase. In certain embodiments, the monosaccharide and/or disaccharide sugar/sweetener of the second phase can comprise at least about 1%, at least about 2.5%, at least about 5%, at least about 7.5%, at least about 10%, at least about 12.5%, at least about 15%, at least about 17.5%, or at least about 20% by dry weight of the foodstuff. In certain embodiments, the monosaccharide and/or disaccharide sugar/sweetener can comprise at least about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the foodstuff.

In various embodiments, the monosaccharide and/or disaccharide sugar/sweetener of the second phase can comprise at least 1%, at least 2.5%, at least 5%, at least 7.5%, at least 10%, at least 12.5%, at least 15%, at least 17.5%, or at least 20% by dry weight of the second phase. In some embodiments, the monosaccharide and/or disaccharide sugar/sweetener can comprise at least 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the second phase. In certain embodiments, the monosaccharide and/or disaccharide sugar/sweetener of the second phase can comprise at least 1%, at least 2.5%, at least 5%, at least 7.5%, at least 10%, at least 12.5%, at least 15%, at least 17.5%, or at least 20% by dry weight of the foodstuff. In various embodiments, the monosaccharide and/or disaccharide sugar/sweetener can comprise at least 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the foodstuff.

The second phase can be made using a monosaccharide, disaccharide, or any combination thereof. In certain embodiments, the second phase that comprises a monosaccharide and/or disaccharide sugar/sweetener can comprise less than about 10%, about 5%, about 2%, or about 1% by dry weight of a polysaccharide or oligosaccharide. In certain embodiments, the second phase that comprises a monosaccharide and/or disaccharide sugar/sweetener may be free, or substantially free, of a polysaccharide or oligosaccharide. In various embodiments, the second phase that comprises a monosaccharide and/or disaccharide sugar/sweetener can comprise less than 10%, 5%, 2%, or 1% by dry weight of a polysaccharide or oligosaccharide. In some embodiments, the second phase that comprises a monosaccharide and/or disaccharide sugar/sweetener may be free of a polysaccharide or oligosaccharide.

The first phase of the multiphase foodstuff, as described herein, may comprise a mixture of three, four, five or more oligosaccharides. In certain embodiments, the mixture of the oligosaccharides may comprise at least about 1%, at least about 2.5%, at least about 5%, at least about 7.5%, at least about 10%, at least about 12.5%, at least about 15%, at least about 17.5%, or at least about 20% by dry weight of the first phase. In certain embodiments, the mixture of the oligosaccharides may comprise at least about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the first phase. In certain embodiments, the mixture of the oligosaccharides may comprise at least about 1%, at least about 2.5%, at least about 5%, at least about 7.5%, at least about 10%, at least about 12.5%, at least about 15%, at least about 17.5%, or at least about 20% by dry weight of the foodstuff. In certain embodiments, the mixture of the oligosaccharides can comprise at least about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the foodstuff.

In various embodiments, the mixture of the oligosaccharides may comprise at least 1%, at least 2.5%, at least 5%, at least 7.5%, at least 10%, at least 12.5%, at least 15%, at least 17.5%, or at least 20% by dry weight of the first phase. In some embodiments, the mixture of the oligosaccharides may comprise at least 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the first phase. In certain embodiments, the mixture of the oligosaccharides may comprise at least 1%, at least 2.5%, at least 5%, at least 7.5%, at least 10%, at least 12.5%, at least 15%, at least 17.5%, or at least 20% by dry weight of the foodstuff. In various embodiments, the mixture of the oligosaccharides can comprise at least 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the foodstuff.

An oligosaccharide mixture may include three, four, five, or more forms of oligosaccharides. For example, a first oligosaccharide, a second oligosaccharide, a third oligosaccharide, a fourth oligosaccharide, a fifth oligosaccharide, etc. An oligosaccharide mixture including three forms of oligosaccharides may include: about 20% of a first oligosaccharide, about 40% of a second oligosaccharide, and about 40% of a third oligosaccharide w/w; about 30% of a first oligosaccharide, about 30% of a second oligosaccharide, and about 40% of a third oligosaccharide w/w; about 10% of a first oligosaccharide, about 10% of a second oligosaccharide, and about 80% of a third oligosaccharide w/w; about 20% of a first oligosaccharide, about 20% of a second oligosaccharide, and about 60% of a third oligosaccharide w/w; about 20% of a first oligosaccharide, about 30% of a second oligosaccharide, and about 50% of a third oligosaccharide w/w. An oligosaccharide mixture including three forms of oligosaccharides may include: 20% of a first oligosaccharide, 40% of a second oligosaccharide, and 40% of a third oligosaccharide w/w; 30% of a first oligosaccharide, 30% of a second oligosaccharide, and 40% of a third oligosaccharide w/w; 10% of a first oligosaccharide, 10% of a second oligosaccharide, and 80% of a third oligosaccharide w/w; 20% of a first oligosaccharide, 20% of a second oligosaccharide, and 60% of a third oligosaccharide w/w; 20% of a first oligosaccharide, 30% of a second oligosaccharide, and 50% of a third oligosaccharide w/w. In some embodiments, the first oligosaccharide may be manno-oligosaccharides, the second oligosaccharide may be xylo-oligosaccharides, and the third oligosaccharide may be cello-oligosaccharides. In some other embodiments, the first oligosaccharide may be xyloglucan-oligosaccharides, the second oligosaccharide may be xylo-oligosaccharides, and the third oligosaccharide may be cello-oligosaccharides. Other combinations of the first oligosaccharide, the second oligosaccharide, and the third oligosaccharide are also within the scope of this disclosure. Likewise, any combination of at least two of a first oligosaccharide, a second oligosaccharide, a third oligosaccharide, a fourth oligosaccharide, a fifth oligosaccharide, and/or any other suitable number of oligosaccharides are also within the scope of this disclosure.

In some embodiments, combinations of oligosaccharides and monosaccharide and/or disaccharide sugars/sweeteners can be added to a single foodstuff or a single phase of a multiphase foodstuff.

In another aspect, a foodstuff may comprise: (a) a first sweetener component comprising at least two types of oligosaccharides selected from: (i) cello-oligosaccharides with a DP from two to six; (ii) xylo-oligosaccharides with a DP from two to twelve; (iii) mixed-linkage glucan oligosaccharides with a DP from two to five; (iv) manno-oligosaccharides having a DP from two to twelve; (v) xyloglucan oligosaccharides having a DP from four to twelve; and (vi) any combination thereof; and (b) a second sweetener component comprising a monosaccharide, a disaccharide, or both. The first and second sweetener component can be combined in a single phase such as a dough, batter, or mix.

In certain embodiments, the dough, batter, or mix further comprises any one or more of butter, margarine, shortening, oil, palm oil, baking powder, baking soda, egg, yeast, corn starch, milk, cream, buttermilk, flour, salt, and/or any other suitable ingredient. The foodstuff can be completely free, or substantially free, of a high-intensity sweetener. The foodstuff can be completely free, or substantially free, of a sugar alcohol or polyol.

In certain embodiments, the first and second sweetener components may have different melting temperatures. For example, the melting temperature of the first sweetener component may be at least about 1%, at least about 2%, at least about 5%, at least about 10%, at least about 15%, at least about 20%, at least about 25%, or at least about 50% greater than the melting temperature of the second sweetener component. In various embodiments, the melting temperature of the first sweetener component may be at least about 1%, at least about 2%, at least about 5%, at least about 10%, at least about 15%, at least about 20%, at least about 25%, or at least about 50% less than the melting temperature of the second sweetener component. In some embodiments, the melting temperature of the first sweetener component may be at least 1%, at least 2%, at least 5%, at least 10%, at least 15%, at least 20%, at least 25%, or at least 50% greater than the melting temperature of the second sweetener component. In certain embodiments, the melting temperature of the first sweetener component may be at least 1%, at least 2%, at least 5%, at least 10%, at least 15%, at least 20%, at least 25%, or at least 50% less than the melting temperature of the second sweetener component.

The second sweetener component of the foodstuff can comprise a monosaccharide, a disaccharide, or any combination of monosaccharides and/or disaccharides (monosaccharide and/or disaccharide sugars/sweeteners). In some embodiments, the monosaccharide and/or disaccharide sugar/sweetener may be selected from any one or more of glucose, fructose, galactose, sucrose, maltose, lactose, another suitable monosaccharide or disaccharide, or a combination thereof. In certain embodiments, the second phase comprises glucose. In various embodiments, the monosaccharide and/or disaccharide sugar/sweetener of the second phase may comprise at least about 1%, at least about 2.5%, at least about 5%, at least about 7.5%, at least about 10%, at least about 12.5%, at least about 15%, at least about 17.5%, or at least about 20% by dry weight of second sweetener component. In certain embodiments, the monosaccharide and/or disaccharide sugar/sweetener may comprise at least about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the second sweetener component. In certain embodiments, the monosaccharide and/or disaccharide sugar/sweetener may comprise at least about 1%, at least about 2.5%, at least about 5%, at least about 7.5%, at least about 10%, at least about 12.5%, at least about 15%, at least about 17.5%, or at least about 20% by dry weight of the foodstuff. In certain embodiments, the monosaccharide and/or disaccharide sugar/sweetener may comprise about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the foodstuff.

In various embodiments, the monosaccharide and/or disaccharide sugar/sweetener of the second phase may comprise at least 1%, at least 2.5%, at least 5%, at least 7.5%, at least 10%, at least 12.5%, at least 15%, at least 17.5%, or at least 20% by dry weight of second sweetener component.

In certain embodiments, the monosaccharide and/or disaccharide sugar/sweetener may comprise at least 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the second sweetener component. In some embodiments, the monosaccharide and/or disaccharide sugar/sweetener may comprise at least 1%, at least 2.5%, at least 5%, at least 7.5%, at least 10%, at least 12.5%, at least 15%, at least 17.5%, or at least 20% by dry weight of the foodstuff. In certain embodiments, the monosaccharide and/or disaccharide sugar/sweetener may comprise 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the foodstuff.

The first sweetener component can comprise at least two oligosaccharides or a mixture of at least two oligosaccharides. In certain embodiments, the mixture of the at least two oligosaccharides can comprise at least about 1%, at least about 2.5%, at least about 5%, at least about 7.5%, at least about 10%, at least about 12.5%, at least about 15%, at least about 17.5%, or at least about 20% by dry weight of the first sweetener component. In various embodiments, the mixture of the at least two oligosaccharides can comprise at least about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the first sweetener component. In certain embodiments, the mixture of the at least two oligosaccharides may comprise at least about 1%, at least about 2.5%, at least about 5%, at least about 7.5%, at least about 10%, at least about 12.5%, at least about 15%, at least about 17.5%, or at least about 20% by dry weight of the foodstuff. In certain embodiments, the mixture of the at least two oligosaccharides may comprise at least about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the foodstuff.

In various embodiments, the mixture of the at least two oligosaccharides can comprise at least 1%, at least 2.5%, at least 5%, at least 7.5%, at least 10%, at least 12.5%, at least 15%, at least 17.5%, or at least 20% by dry weight of the first sweetener component. In some embodiments, the mixture of the at least two oligosaccharides can comprise at least 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the first sweetener component. In certain embodiments, the mixture of the at least two oligosaccharides may comprise at least 1%, at least 2.5%, at least 5%, at least 7.5%, at least 10%, at least 12.5%, at least 15%, at least 17.5%, or at least 20% by dry weight of the foodstuff. In various embodiments, the mixture of the at least two oligosaccharides may comprise at least 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20% by dry weight of the foodstuff.

The at least two oligosaccharides of the first sweetener component can comprise a mix of a first oligosaccharide and a second oligosaccharide. An oligosaccharide mixture may include about 5% of a first oligosaccharide and about 95% of a second oligosaccharide w/w; about 10% of a first oligosaccharide and about 90% of a second oligosaccharide w/w; about 15% of a first oligosaccharide and about 85% of a second oligosaccharide w/w; about 20% of a first oligosaccharide and about 80% of a second oligosaccharide w/w; about 25% of a first oligosaccharide and about 75% of a second oligosaccharide w/w; about 30% of a first oligosaccharide and about 70% of a second oligosaccharide w/w; about 35% of a first oligosaccharide and about 65% of a second oligosaccharide w/w; about 40% of a first oligosaccharide and about 50% of a second oligosaccharide w/w; about 45% of a first oligosaccharide and about 55% of a second oligosaccharide w/w; about 50% of a first oligosaccharide and about 50% of a second oligosaccharide w/w; about 55% of a first oligosaccharide and about 45% of a second oligosaccharide w/w; about 60% of a first oligosaccharide and about 30% of a second oligosaccharide w/w; about 65% of a first oligosaccharide and about 35% of a second oligosaccharide w/w; about 70% of a first oligosaccharide and about 30% of a second oligosaccharide w/w; about 75% of a first oligosaccharide and about 25% of a second oligosaccharide w/w; about 80% of a first oligosaccharide and about 20% of a second oligosaccharide w/w; about 85% of a first oligosaccharide and about 15% of a second oligosaccharide w/w; about 90% of a first oligosaccharide and about 10% of a second oligosaccharide w/w; about 95% of a first oligosaccharide and about 5% of a second oligosaccharide w/w; or any other range between these values.

An oligosaccharide mixture may include 5% of a first oligosaccharide and 95% of a second oligosaccharide w/w; 10% of a first oligosaccharide and 90% of a second oligosaccharide w/w; 15% of a first oligosaccharide and 85% of a second oligosaccharide w/w; 20% of a first oligosaccharide and 80% of a second oligosaccharide w/w; 25% of a first oligosaccharide and 75% of a second oligosaccharide w/w; 30% of a first oligosaccharide and 70% of a second oligosaccharide w/w; 35% of a first oligosaccharide and 65% of a second oligosaccharide w/w; 40% of a first oligosaccharide and 50% of a second oligosaccharide w/w; 45% of a first oligosaccharide and 55% of a second oligosaccharide w/w; 50% of a first oligosaccharide and 50% of a second oligosaccharide w/w; 55% of a first oligosaccharide and 45% of a second oligosaccharide w/w; 60% of a first oligosaccharide and 30% of a second oligosaccharide w/w; 65% of a first oligosaccharide and 35% of a second oligosaccharide w/w; 70% of a first oligosaccharide and 30% of a second oligosaccharide w/w; 75% of a first oligosaccharide and 25% of a second oligosaccharide w/w; 80% of a first oligosaccharide and 20% of a second oligosaccharide w/w; 85% of a first oligosaccharide and 15% of a second oligosaccharide w/w; 90% of a first oligosaccharide and 10% of a second oligosaccharide w/w; 95% of a first oligosaccharide and 5% of a second oligosaccharide w/w; or any other range between these values.

In some embodiments, the first oligosaccharide may be cello-oligosaccharides and the second oligosaccharide may be xylo-oligosaccharides. In certain embodiments, the first oligosaccharide may be cello-oligosaccharides and the second oligosaccharide may be manno-oligosaccharides. In various embodiments, the first oligosaccharide may be xylo-oligosaccharides and the second oligosaccharide may be manno-oligosaccharides. Other combinations of the first oligosaccharide and the second oligosaccharide are also within the scope of this disclosure.

An oligosaccharide mixture may include two or more oligosaccharides, for example, a first oligosaccharide and a second oligosaccharide which may be different than the first oligosaccharide. The first oligosaccharide may be a xylo-oligosaccharide or a cello-oligosaccharide or a manno-oligosaccharide or another oligosaccharide as provided herein, and the second oligosaccharide may be a xylo-oligosaccharide or a cello-oligosaccharide or a manno-oligosaccharide or another oligosaccharide not used as the first oligosaccharides.

The ratio of a first oligosaccharide to a second oligosaccharide in the mixture may be about 1:1, 1:2, 1:3, 1:4, 1:5, 1:6, 1:7, 1:8, 1:9, or any range between these values. The ratio of a first oligosaccharide to a second oligosaccharide in the mixture may be 1:1, 1:2, 1:3, 1:4, 1:5, 1:6, 1:7, 1:8, 1:9, or any range between these values.

The ratio of a first oligosaccharide to a second oligosaccharide in the mixture may be about 2:1, 2:3, 2:5, 2:7, 2:9, or any range between these values. The ratio of a first oligosaccharide to a second oligosaccharide in the mixture may be 2:1, 2:3, 2:5, 2:7, 2:9, or any range between these values. The oligosaccharides may be cello-oligosaccharides, manno-oligosaccharides, xylo-oligosaccharides, xyloglucan-oligosaccharides, mixed-linkage oligosaccharides, chito-oligosaccharides, or other oligosaccharides as provided herein, wherein the first oligosaccharide is selected to be a different oligosaccharide than the second oligosaccharide.

The ratio of a first oligosaccharide to a second oligosaccharide in the mixture may be about 3:1, 3:2, 3:4, 3:5, 3:7, 3:8, or any range between these values. The ratio of a first oligosaccharide to a second oligosaccharide in the mixture may be 3:1, 3:2, 3:4, 3:5, 3:7, 3:8, or any range between these values.

The ratio of a first oligosaccharide to a second oligosaccharide in an oligosaccharide mixture including two or more oligosaccharides may be from 1:9 to 9:1, 1:4 to 4:1, 1:3 to 3:1, or 2:3 to 3:2.

An oligosaccharide mixture of a sweetener component can comprise an xylo-oligosaccharide mixture, a cello-oligosaccharide mixture, a manno-oligosaccharide mixture, a xyloglucan-oligosaccharide mixture, and/or a mixed-linkage glucan-oligosaccharide mixture.

The concentration of xylo-oligosaccharides with a DP of two in a xylo-oligosaccharide mixture may be about 2% to about 80% w/w. The concentration of xylo-oligosaccharides with a DP of two in a xylo-oligosaccharide mixture may be 2% to 80% w/w. The concentration of xylo-oligosaccharides with a DP of two may be at least 2%, 4%, 6%, 8%, 10%, 12%, 15%, 18%, 20%, 25%, or 30% w/w. The concentration of xylo-oligosaccharides with a DP of two may be higher in some cases, for instance, up to 35%, 40%, 45%, 50%, 55%, 60%, 65%, 70%, 75%, or 80% w/w.

The concentration of xylo-oligosaccharides with a DP of three in a xylo-oligosaccharide mixture may be about 2% to about 20% w/w. The concentration of xylo-oligosaccharides with a DP of three in a xylo-oligosaccharide mixture may be 2% to 20% w/w. The concentration of xylo-oligosaccharides with a DP of three may be at least 2%, 4%, 6%, 8%, 10%, 12%, 15%, 18%, or 20% w/w.

The concentration of xylo-oligosaccharides with a DP of four in a xylo-oligosaccharide mixture may be about 5% to about 20% w/w. The concentration of xylo-oligosaccharides with a DP of four in a xylo-oligosaccharide mixture may be 5% to 20% w/w. The concentration of xylo-oligosaccharides with a DP of four may be at least 5%, 8%, 10%, 12%, 15%, 18%, or 20% w/w.

The concentration of xylo-oligosaccharides with a DP of five in a xylo-oligosaccharide mixture may be about 5% to about 20% w/w. The concentration of xylo-oligosaccharides with a DP of five in a xylo-oligosaccharide mixture may be 5% to 20% w/w. The concentration of xylo-oligosaccharides with a DP of five may be at least 5%, 7%, 8%, 10%, 12%, 15%, 18%, or 20% w/w.

The concentration of xylo-oligosaccharides with a DP of six in a xylo-oligosaccharide mixture may be about 5% to about 25% w/w. The concentration of xylo-oligosaccharides with a DP of six in a xylo-oligosaccharide mixture may be 5% to 25% w/w. The concentration of xylo-oligosaccharides with a DP of six may be at least 5%, 8%, 10%, 12%, 15%, 18%, 20%, or 25% w/w.

The concentration of xylo-oligosaccharides with a DP of seven in a xylo-oligosaccharide mixture may be about 2% to about 20% w/w. The concentration of xylo-oligosaccharides with a DP of seven in a xylo-oligosaccharide mixture may be 2% to 20% w/w. The concentration of xylo-oligosaccharides with a DP of seven may be at least 2%, 4%, 6%, 8%, 10%, 12%, 15%, 17%, or 20% w/w.

The concentration of xylo-oligosaccharides with a DP of eight in a xylo-oligosaccharide mixture may be about 1% to about 15% w/w. The concentration of xylo-oligosaccharides with a DP of eight in a xylo-oligosaccharide mixture may be 1% to 15% w/w. The concentration of xylo-oligosaccharides with a DP of eight may be at least 1%, 2%, 3%, 4%, 5%, 6%, 7%, 8%, 9%, 10%, or 15% w/w.

The concentration of xylo-oligosaccharides with a DP of nine in a xylo-oligosaccharide mixture may be about 2% to about 15% w/w. The concentration of xylo-oligosaccharides with a DP of nine in a xylo-oligosaccharide mixture may be 2% to 15% w/w. The concentration of xylo-oligosaccharides with a DP of nine may be at least 1%, 2%, 3%, 4%, 5%, 6%, 7%, 8%, 9%, 10%, or 15% w/w.

The concentration of xylo-oligosaccharides with a DP of ten in a xylo-oligosaccharide mixture may be about 2% to about 15% w/w. The concentration of xylo-oligosaccharides with a DP of ten in a xylo-oligosaccharide mixture may be 2% to 15% w/w. The concentration of xylo-oligosaccharides with a DP of ten may be at least 1%, 2%, 3%, 4%, 5%, 6%, 7%, 8%, 9%, 10%, or 15% w/w.

The concentration of xylo-oligosaccharides with a DP of eleven in a xylo-oligosaccharide mixture may be about 2% to about 15% w/w. The concentration of xylo-oligosaccharides with a DP of eleven in a xylo-oligosaccharide mixture may be 2% to 15% w/w. The concentration of xylo-oligosaccharides with a DP of eleven may be at least 1%, 2%, 3%, 4%, 5%, 6%, 7%, 8%, 9%, 10%, or 15% w/w.

The concentration of xylo-oligosaccharides with a DP of twelve in a xylo-oligosaccharide mixture may be about 2% to about 15% w/w. The concentration of xylo-oligosaccharides with a DP of twelve in a xylo-oligosaccharide mixture may be 2% to 15% w/w. The concentration of xylo-oligosaccharides with a DP of twelve may be at least 1%, 2%, 3%, 4%, 5%, 6%, 7%, 8%, 9%, 10%, or 15% w/w.

The concentration of cello-oligosaccharides with a DP of two in a cello-oligosaccharide mixture may be about 2% to about 80% w/w. The concentration of cello-oligosaccharides with a DP of two in a cello-oligosaccharide mixture may be 2% to 80% w/w. The concentration of cello-oligosaccharides with a DP of two may be at least 2%, 4%, 6%, 8%, 10%, 12%, 15%, 18%, 20%, 25%, or 30% w/w. The concentration of cello-oligosaccharides with a DP of two may be higher in some cases, for instance, at least 35%, 40%, 45%, 50%, 55%, 60%, 65%, 70%, 75%, or 80% w/w.

The concentration of cello-oligosaccharides with a DP of three in a cello-oligosaccharide mixture may be about 2% to about 20% w/w. The concentration of cello-oligosaccharides with a DP of three in a cello-oligosaccharide mixture may be 2% to 20% w/w. The concentration of cello-oligosaccharides with a DP of three may be at least 2%, 4%, 6%, 8%, 10%, 12%, 15%, 18%, or 20% w/w.

The concentration of cello-oligosaccharides with a DP of four in a cello-oligosaccharide mixture may be about 5% to about 20% w/w. The concentration of cello-oligosaccharides with a DP of four in a cello-oligosaccharide mixture may be 5% to 20% w/w. The concentration of cello-oligosaccharides with a DP of four may be at least 5%, 8%, 10%, 12%, 15%, 18%, or 20% w/w.

The concentration of cello-oligosaccharides with a DP of five in a cello-oligosaccharide mixture may be about 5% to about 20% w/w. The concentration of cello-oligosaccharides with a DP of five in a cello-oligosaccharide mixture may be 5% to 20% w/w. The concentration of cello-oligosaccharides with a DP of five may be at least 5%, 7%, 8%, 10%, 12%, 15%, 18%, or 20% w/w.

The concentration of cello-oligosaccharides with a DP of six in a cello-oligosaccharide mixture may be about 5% to about 25% w/w. The concentration of cello-oligosaccharides with a DP of six in a cello-oligosaccharide mixture may be 5% to 25% w/w. The concentration of cello-oligosaccharides with a DP of six may be at least 5%, 8%, 10%, 12%, 15%, 18%, 20%, or 25% w/w.

The concentration of manno-oligosaccharides with a DP of two in a manno-oligosaccharide mixture may be about 2% to about 30% w/w. The concentration of manno-oligosaccharides with a DP of two in a manno-oligosaccharide mixture may be 2% to 30% w/w. The concentration of manno-oligosaccharides with a DP of two may be at least 2%, 4%, 6%, 8%, 10%, 12%, 15%, 18%, 20%, 25%, or 30% w/w.

The concentration of manno-oligosaccharides with a DP of three in a manno-oligosaccharide mixture may be about 2% to about 20% w/w. The concentration of manno-oligosaccharides with a DP of three in a manno-oligosaccharide mixture may be 2% to 20% w/w. The concentration of manno-oligosaccharides with a DP of three may be at least 2%, 4%, 6%, 8%, 10%, 12%, 15%, 18%, or 20% w/w.

The concentration of manno-oligosaccharides with a DP of four in a manno-oligosaccharide mixture may be about 5% to about 20% w/w. The concentration of manno-oligosaccharides with a DP of four in a manno-oligosaccharide mixture may be 5% to 20% w/w. The concentration of manno-oligosaccharides with a DP of four may be at least 5%, 8%, 10%, 12%, 15%, 18%, or 20% w/w.

The concentration of manno-oligosaccharides with a DP of five in a manno-oligosaccharide mixture may be about 5% to about 20% w/w. The concentration of manno-oligosaccharides with a DP of five in a manno-oligosaccharide mixture may be 5% to 20% w/w. The concentration of manno-oligosaccharides with a DP of five may be at least 5%, 7%, 8%, 10%, 12%, 15%, 18%, or 20% w/w.

The concentration of manno-oligosaccharides with a DP of six in a manno-oligosaccharide mixture may be about 5% to about 25% w/w. The concentration of manno-oligosaccharides with a DP of six in a manno-oligosaccharide mixture may be 5% to 25% w/w. The concentration of manno-oligosaccharides with a DP of six may be at least 5%, 8%, 10%, 12%, 15%, 18%, 20%, or 25% w/w.

The concentration of manno-oligosaccharides with a DP of seven in a manno-oligosaccharide mixture may be about 2% to about 20% w/w. The concentration of manno-oligosaccharides with a DP of seven in a manno-oligosaccharide mixture may be 2% to 20% w/w. The concentration of manno-oligosaccharides with a DP of seven may be at least 2%, 4%, 6%, 8%, 10%, 12%, 15%, 17%, or 20% w/w.

The concentration of manno-oligosaccharides with a DP of eight in a manno-oligosaccharide mixture may be about 1% to about 15% w/w. The concentration of manno-oligosaccharides with a DP of eight in a manno-oligosaccharide mixture may be 1% to 15% w/w. The concentration of manno-oligosaccharides with a DP of eight may be at least 1%, 2%, 3%, 4%, 5%, 6%, 7%, 8%, 9%, 10%, or 15% w/w.

The concentration of manno-oligosaccharides with a DP of nine in a manno-oligosaccharide mixture may be about 2% to about 15% w/w. The concentration of manno-oligosaccharides with a DP of nine in a manno-oligosaccharide mixture may be 2% to 15% w/w. The concentration of manno-oligosaccharides with a DP of nine may be at least 1%, 2%, 3%, 4%, 5%, 6%, 7%, 8%, 9%, 10%, or 15% w/w.

The concentration of manno-oligosaccharides with a DP of ten in a manno-oligosaccharide mixture may be about 2% to about 15% w/w. The concentration of manno-oligosaccharides with a DP of ten in a manno-oligosaccharide mixture may be 2% to 15% w/w. The concentration of manno-oligosaccharides with a DP of ten may be at least 1%, 2%, 3%, 4%, 5%, 6%, 7%, 8%, 9%, 10%, or 15% w/w.

The concentration of manno-oligosaccharides with a DP of eleven in a manno-oligosaccharide mixture may be about 2% to about 15% w/w. The concentration of manno-oligosaccharides with a DP of eleven in a manno-oligosaccharide mixture may be 2% to 15% w/w. The concentration of manno-oligosaccharides with a DP of eleven may be at least 1%, 2%, 3%, 4%, 5%, 6%, 7%, 8%, 9%, 10%, or 15% w/w.

The concentration of manno-oligosaccharides with a DP of twelve in a manno-oligosaccharide mixture may be about 2% to about 15% w/w. The concentration of manno-oligosaccharides with a DP of twelve in a manno-oligosaccharide mixture may be 2% to 15% w/w. The concentration of manno-oligosaccharides with a DP of twelve may be at least 1%, 2%, 3%, 4%, 5%, 6%, 7%, 8%, 9%, 10%, or 15% w/w.

The concentration of xyloglucan-oligosaccharides with a DP of four in a xyloglucan-oligosaccharide mixture may be about 5% to about 20% w/w. The concentration of xyloglucan-oligosaccharides with a DP of four in a xyloglucan-oligosaccharide mixture may be 5% to 20% w/w. The concentration of xyloglucan-oligosaccharides with a DP of four may be at least 5%, 8%, 10%, 12%, 15%, 18%, or 20% w/w.

The concentration of xyloglucan-oligosaccharides with a DP of five in a xyloglucan-oligosaccharide mixture may be about 5% to about 20% w/w. The concentration of xyloglucan-oligosaccharides with a DP of five in a xyloglucan-oligosaccharide mixture may be 5% to 20% w/w. The concentration of xyloglucan-oligosaccharides with a DP of five may be at least 5%, 7%, 8%, 10%, 12%, 15%, 18%, or 20% w/w.

The concentration of xyloglucan-oligosaccharides with a DP of six in a xyloglucan-oligosaccharide mixture may be about 5% to about 25% w/w. The concentration of xyloglucan-oligosaccharides with a DP of six in a xyloglucan-oligosaccharide mixture may be 5% to 25% w/w. The concentration of xyloglucan-oligosaccharides with a DP of six may be at least 5%, 8%, 10%, 12%, 15%, 18%, 20%, or 25% w/w.

The concentration of xyloglucan-oligosaccharides with a DP of seven in a xyloglucan-oligosaccharide mixture may be about 2% to about 20% w/w. The concentration of xyloglucan-oligosaccharides with a DP of seven in a xyloglucan-oligosaccharide mixture may be 2% to 20% w/w. The concentration of xyloglucan-oligosaccharides with a DP of seven may be at least 2%, 4%, 6%, 8%, 10%, 12%, 15%, 17%, or 20% w/w.

The concentration of xyloglucan-oligosaccharides with a DP of eight in a xyloglucan-oligosaccharide mixture may be about 1% to about 15% w/w. The concentration of xyloglucan-oligosaccharides with a DP of eight in a xyloglucan-oligosaccharide mixture may be 1% to 15% w/w. The concentration of xyloglucan-oligosaccharides with a DP of eight may be at least 1%, 2%, 3%, 4%, 5%, 6%, 7%, 8%, 9%, 10%, or 15% w/w.

The concentration of xyloglucan-oligosaccharides with a DP of nine in a xyloglucan-oligosaccharide mixture may be about 2% to about 15% w/w. The concentration of xyloglucan-oligosaccharides with a DP of nine in a xyloglucan-oligosaccharide mixture may be 2% to 15% w/w. The concentration of xyloglucan-oligosaccharides with a DP of nine may be at least 1%, 2%, 3%, 4%, 5%, 6%, 7%, 8%, 9%, 10%, or 15% w/w.

The concentration of xyloglucan-oligosaccharides with a DP of ten in a xyloglucan-oligosaccharide mixture may be about 2% to about 15% w/w. The concentration of xyloglucan-oligosaccharides with a DP of ten in a xyloglucan-oligosaccharide mixture may be 2% to 15% w/w. The concentration of xyloglucan-oligosaccharides with a DP of ten may be at least 1%, 2%, 3%, 4%, 5%, 6%, 7%, 8%, 9%, 10%, or 15% w/w.

The concentration of mixed-linkage glucan-oligosaccharides with a DP of two in a mixed-linkage glucan-oligosaccharide mixture may be about 2% to about 30% w/w. The concentration of mixed-linkage glucan-oligosaccharides with a DP of two in a mixed-linkage glucan-oligosaccharide mixture may be 2% to 30% w/w. The concentration of mixed-linkage glucan-oligosaccharides with a DP of two may be at least 2%, 4%, 6%, 8%, 10%, 12%, 15%, 18%, 20%, 25%, or 30% w/w.

The concentration of mixed-linkage glucan-oligosaccharides with a DP of three in a mixed-linkage glucan-oligosaccharide mixture may be about 2% to about 20% w/w. The concentration of mixed-linkage glucan-oligosaccharides with a DP of three in a mixed-linkage glucan-oligosaccharide mixture may be 2% to 20% w/w. The concentration of mixed-linkage glucan-oligosaccharides with a DP of three may be at least 2%, 4%, 6%, 8%, 10%, 12%, 15%, 18%, or 20% w/w.

The concentration of mixed-linkage glucan-oligosaccharides with a DP of four in a mixed-linkage glucan-oligosaccharide mixture may be about 5% to about 20% w/w. The concentration of mixed-linkage glucan-oligosaccharides with a DP of four in a mixed-linkage glucan-oligosaccharide mixture may be 5% to 20% w/w. The concentration of mixed-linkage glucan-oligosaccharides with a DP of four may be at least 5%, 8%, 10%, 12%, 15%, 18%, or 20% w/w.

The concentration of mixed-linkage glucan-oligosaccharides with a DP of five in a mixed-linkage glucan-oligosaccharide mixture may be about 5% to about 20% w/w. The concentration of mixed-linkage glucan-oligosaccharides with a DP of five in a mixed-linkage glucan-oligosaccharide mixture may be 5% to 20% w/w. The concentration of mixed-linkage glucan-oligosaccharides with a DP of five may be at least 5%, 7%, 8%, 10%, 12%, 15%, 18%, or 20% w/w.

Also described herein are methods of making a foodstuff comprising at least two phases: 1) a first phase that comprises a polysaccharide and 2) a second phase that comprises a monosaccharide and/or disaccharide sugar/sweetener.

A method of preparing a foodstuff may comprise: (a) providing a first phase comprising at least two types of oligosaccharides selected from: cello-oligosaccharides with a DP from two to six; xylo-oligosaccharides with a DP from two to twelve; mixed-linkage glucan oligosaccharides with a DP from two to five; manno-oligosaccharides having a DP from two to twelve; and xyloglucan oligosaccharides having a DP from four to twelve; (b) providing a second phase comprising a monosaccharide, a disaccharide, or both; and (c) mixing the first phase and the second phase.

A method of preparing a foodstuff may comprise: (a) providing a first phase comprising at least two types of oligosaccharides selected from: cello-oligosaccharides with a DP from two to six; xylo-oligosaccharides with a DP from two to twelve; mixed-linkage glucan oligosaccharides with a DP from two to five; manno-oligosaccharides having a DP from two to twelve; and xyloglucan oligosaccharides having a DP from four to twelve; (b) providing a second phase comprising a monosaccharide, a disaccharide, or both; and (c) applying to second phase to the first phase or applying the first phase to the second phase.

Foodstuffs made by the methods provided herein may include foodstuffs with more than two phases including those with at least three, four, five, six, seven, eight, nine, or more phases.

The methods described herein can encompass mixing a first and a second phase or a phase comprising a first or second sweetening component by mechanical or non-mechanical means. Mixing includes stirring, beating, blending, binding, creaming, whipping, folding, or any other suitable method.

Additionally, the methods described herein can include applying a second phase to a first phase. Such application can comprise contacting a second phase to first phase. In certain embodiments, contacting may comprise frosting, icing, glazing, or filling a first phase with a second phase by mechanical or non-mechanical means. The methods described herein can further include one or more steps comprising baking, frying, boiling, cooling, and/or freezing.

The detailed description is further supplemented with reference to the following numbered embodiments. 1) A foodstuff comprising: a first sweetener component comprising at least two types of oligosaccharides selected from: cello-oligosaccharides with a degree of polymerization (DP) from two to six; xylo-oligosaccharides with a DP from two to twelve; manno-oligosaccharides having a DP from two to twelve; mixed-linkage glucan oligosaccharides with a DP from two to five; and xyloglucan oligosaccharides having a DP from four to twelve; and a second sweetener component comprising a monosaccharide, a disaccharide, or both. 2) The foodstuff of numbered embodiment 1, further comprising at least one of oil, flour, egg, margarine, butter, shortening, baking soda, baking powder, yeast, or corn starch. 3) The foodstuff of numbered embodiment 1 or numbered embodiment 2, wherein a melting temperature of the first sweetener component is different than a melting temperature of the second sweetener component. 4) The foodstuff of numbered embodiment 3, wherein the melting temperature of the first sweetener component is at least 1%, at least 2%, at least 5%, at least 10%, at least 15%, at least 20%, at least 25%, or at least 50% greater than the melting temperature of the second sweetener component. 5) The foodstuff of numbered embodiment 3, wherein the melting temperature of the first sweetener component is at least 1%, at least 2%, at least 5%, at least 10%, at least 15%, at least 20%, at least 25%, or at least 50% less than the melting temperature of the second sweetener component. 6) The foodstuff of any one of numbered embodiments 1 to 5, wherein the foodstuff is substantially free of a high-intensity sweetener. 7) The foodstuff of any one of numbered embodiments 1 to 6, wherein the foodstuff is substantially free of a polyol. 8) The foodstuff of any one of numbered embodiments 1 to 7, wherein the first sweetener component comprises a polysaccharide, wherein the polysaccharide is a cellulosic polysaccharide, a hemicellulosic polysaccharide, a polysaccharide derivative, or a polysaccharide aggregate. 9) The foodstuff of numbered embodiment 8, wherein the polysaccharide is a cellulosic polysaccharide. 10) The foodstuff of numbered embodiment 8, wherein the hemicellulosic polysaccharide is xylan. 11) The foodstuff of numbered embodiment 8, wherein the polysaccharide derivative is carboxymethylcellulose. 12) The foodstuff of numbered embodiment 8, wherein the polysaccharide aggregate is lignocellulosic material, for example, partially digested lignocellulosic material, such as from an enzymatic reaction that produced the oligosaccharides. 13) The foodstuff of any one of numbered embodiments 8 to 12, wherein the foodstuff comprises less than 15% by dry weight of the polysaccharide. 14) The foodstuff of any one of numbered embodiments 8 to 12, wherein the first phase comprises less than 15% by dry weight of the polysaccharide. 15) The foodstuff of any one of numbered embodiments 8 to 14, wherein the second sweetener component is substantially free of the polysaccharide. 16) The foodstuff of any one of numbered embodiments 1 to 15, wherein the second sweetener component comprises glucose, fructose, galactose, sucrose, maltose, lactose, or a combination thereof. 17) The foodstuff of any one of numbered embodiments 1 to 16, wherein the monosaccharide, disaccharide, or both is less than 10% by dry weight of the foodstuff. 18) The foodstuff of any one of numbered embodiments 1 to 16, wherein the monosaccharide, disaccharide, or both is less than 5% by dry weight, less than 4% by dry weight, less than 3% by dry weight, less than 2.5% by dry weight, less than 2% by dry weight, or less than 1% by dry weight of the foodstuff. 19) The foodstuff of any one of numbered embodiments 1 to 18, wherein the first sweetener component comprises at least 1% by dry weight of the foodstuff. 20) The foodstuff of any one of numbered embodiments 1 to 19, wherein the sweetener component comprises at least 2.5%, at least 5%, at least 10%, at least 12.5%, or at least 15% by dry weight of the foodstuff. 21) The foodstuff of any one of numbered embodiments 1 to 20, wherein the at least two types of oligosaccharides comprise the cello-oligosaccharides with a DP from two to six. 22) The foodstuff of any one of numbered embodiments 1 to 20, wherein the at least two types of oligosaccharides comprise the xylo-oligosaccharides with a DP from two to twelve. 23) The foodstuff of any one of numbered embodiments 1 to 20, wherein the at least two types of oligosaccharides comprise the mixed-linkage glucan oligosaccharides with a DP from two to five. 24) The foodstuff of any one of numbered embodiments 1 to 20, wherein the at least two types of oligosaccharides comprise the manno-oligosaccharides having a DP from two to twelve. 25) The foodstuff of any one of numbered embodiments 1 to 20, wherein the at least two types of oligosaccharides comprise the xyloglucan oligosaccharides having a DP from four to twelve. 26) The foodstuff of any one of numbered embodiments 1 to 20, wherein the at least two types of oligosaccharides comprise cello-oligosaccharides and xylo-oligosaccharides. 27) The foodstuff of any one of numbered embodiments 1 to 20, wherein the at least two types of oligosaccharides comprise cello-oligosaccharides and manno-oligosaccharides. 28) The foodstuff of any one of numbered embodiments 1 to 20, wherein the cello-oligosaccharides comprise at least 10% by dry weight, at least 15% by dry weight, at least 20% by dry weight, at least 25% by dry weight, or at least 30% by dry weight of the foodstuff. 29) The foodstuff of numbered embodiment 28, wherein the cello-oligosaccharides comprise greater than 50%, greater than 60%, greater than 70%, greater than 70%, greater than 80%, or greater than 90% cellobiose. 30) The foodstuff of any one of numbered embodiments 1 to 20, wherein the xylo-oligosaccharides comprise at least 10% by dry weight, at least 15% by dry weight, at least 20% by dry weight, at least 25% by dry weight, or at least 30% by dry weight of the foodstuff. 31) The foodstuff of numbered embodiment 30, wherein the xylo-oligosaccharides comprise greater than 30%, greater than 40%, greater than 50%, greater than 60%, greater than 70%, or greater than 75% xylobiose. 32) The foodstuff of any one of numbered embodiments 1 to 20, wherein the manno-oligosaccharides comprise at least 10% by dry weight, at least 15% by dry weight, at least 20% by dry weight, at least 25% by dry weight, or at least 30% by dry weight of the foodstuff. 33) The foodstuff of numbered embodiment 32, wherein the manno-oligosaccharides comprise greater than 30%, greater than 40%, greater than 50%, greater than 60%, greater than 70%, or greater than 75% disaccharide. 34) The foodstuff of any one of numbered embodiments 1 to 20, wherein the xylo-oligosaccharides comprise at least 10% by dry weight, at least 15% by dry weight, at least 20% by dry weight, at least 25% by dry weight, or at least 30% by dry weight of the foodstuff. 35) The foodstuff of any one of numbered embodiments 1 to 20 or numbered embodiment 34, wherein the xylo-oligosaccharides comprise xylo-oligosaccharides with one or more side branches. 36) The foodstuff of numbered embodiment 35, wherein the one or more side branches comprise glucuronosyl side branches, methylglucuronosyl side branches, arabinosyl side branches, or combinations thereof. 37) The foodstuff of any one of numbered embodiments 1 to 20 or numbered embodiments 34 to 36, wherein the xylo-oligosaccharides comprise xylose and arabinose monomers at a ratio from 20:1 to 2:1, 18:1 to 4:1, or 16:1 to 6:1. 38) The foodstuff of any one of numbered embodiments 1 to 20, wherein the manno-oligosaccharides comprise at least 10% by dry weight, at least 15% by dry weight, at least 20% by dry weight, at least 25% by dry weight, or at least 30% by dry weight of the foodstuff. 39) The foodstuff of any one of numbered embodiments 1 to 20, wherein the mixed-linkage glucan oligosaccharides comprise at least 10% by dry weight, at least 15% by dry weight, at least 20% by dry weight, at least 25% by dry weight, or at least 30% by dry weight of the foodstuff. 40) The foodstuff of any one of numbered embodiments 1 to 20, wherein the xyloglucan oligosaccharides comprise at least 10% by dry weight, at least 15% by dry weight, at least 20% by dry weight, at least 25% by dry weight, or at least 30% by dry weight of the foodstuff. 41) The foodstuff of any one of numbered embodiments 1 to 40, wherein the second sweetener component at least 5% by dry weight, at least 10% by dry weight, at least 20% by dry weight, at least 30% by dry weight, at least 40% by dry weight, at least 50% by dry weight, at least 60% by dry weight, at least 70% by dry weight, at least 80% by dry weight, or at least 100% by dry weight of the monosaccharide, the disaccharide, or both. 42) The foodstuff of any one of numbered embodiments 1 to 41, wherein the second sweetener component comprises glucose. 43) The foodstuff of any one of numbered embodiments 1 to 41, wherein the second sweetener component comprises fructose. 44) The foodstuff of any one of numbered embodiments 1 to 41, wherein the second sweetener component comprises sucrose. 45) The foodstuff of any one of numbered embodiments 1 to 41, wherein the second sweetener component comprises galactose. 46) The foodstuff of any one of numbered embodiments 1 to 41, wherein the second sweetener component comprises maltose. 47) The foodstuff of any one of numbered embodiments 1 to 41, wherein the second sweetener component comprises lactose. 48) The foodstuff of any one of numbered embodiments 1 to 47, wherein the second sweetener component comprises less than 10%, 5%, 2%, or 1% of the at least two types of oligosaccharide. 49) The foodstuff of any one of numbered embodiments 1 to 48, wherein the second sweetener component is substantially free of the at least two types of oligosaccharides. 50) The foodstuff of any one of numbered embodiments 1 to 49, wherein the foodstuff comprises a phenolic compound. 51) The foodstuff of numbered embodiment 50, wherein the phenolic compound comprises lignin, a lignin breakdown product, ferulic acid, a ferulic acid derivative, or any combination thereof. 52) The foodstuff of numbered embodiment 50 or numbered embodiment 51, wherein the first phase comprises the phenolic compound. 53) The foodstuff of numbered embodiment 50 or numbered embodiment 51, wherein the second phase is substantially free of the phenolic compound.

The detailed description is further supplemented with reference to the following numbered embodiments. 54) A cake comprising: a first phase comprising at least one type of oligosaccharide selected from: cello-oligosaccharides with a degree of polymerization (DP) from two to six; xylo-oligosaccharides with a DP from two to twelve; manno-oligosaccharides having a DP from two to twelve; mixed-linkage glucan oligosaccharides with a DP from two to five; and xyloglucan oligosaccharides having a DP from four to twelve; and a second phase comprising a monosaccharide, a disaccharide, or both, wherein the second phase is i) dispersed nonuniformly throughout a portion of the first phase, ii) disposed on a portion of an outer or inner surface of the cake, or iii) both. 55) A pie comprising: a first phase comprising at least one type of oligosaccharide selected from: cello-oligosaccharides with a degree of polymerization (DP) from two to six; xylo-oligosaccharides with a DP from two to twelve; manno-oligosaccharides having a DP from two to twelve; mixed-linkage glucan oligosaccharides with a DP from two to five; and xyloglucan oligosaccharides having a DP from four to twelve; and a second phase comprising a monosaccharide, a disaccharide, or both, wherein the second phase is i) dispersed nonuniformly throughout a portion of the first phase, ii) disposed on a portion of an outer or inner surface of the pie, or iii) both. 56) A cookie comprising: a first phase comprising at least one type of oligosaccharide selected from: cello-oligosaccharides with a degree of polymerization (DP) from two to six; xylo-oligosaccharides with a DP from two to twelve; manno-oligosaccharides having a DP from two to twelve; mixed-linkage glucan oligosaccharides with a DP from two to five; and xyloglucan oligosaccharides having a DP from four to twelve; and a second phase comprising a monosaccharide, a disaccharide, or both, wherein the second phase is i) dispersed nonuniformly throughout a portion of the first phase, ii) disposed on a portion of an outer or inner surface of the cookie, or iii) both. 57) A pastry comprising: a first phase comprising at least one type of oligosaccharide selected from: cello-oligosaccharides with a degree of polymerization (DP) from two to six; xylo-oligosaccharides with a DP from two to twelve; manno-oligosaccharides having a DP from two to twelve; mixed-linkage glucan oligosaccharides with a DP from two to five; and xyloglucan oligosaccharides having a DP from four to twelve; and a second phase comprising a monosaccharide, a disaccharide, or both, wherein the second phase is i) dispersed nonuniformly throughout a portion of the first phase, ii) disposed on a portion of an outer surface of the pastry, or iii) both. 58) The cake, pie, cookie, or pastry of any one of numbered embodiments 54 to 57, wherein the first phase is different than the second phase. 59) The cake, pie, cookie, or pastry of any one of numbered embodiments 54 to 58, wherein an average density of the first phase is less than an average density of the second phase. 60) The cake, pie, cookie, or pastry of numbered embodiment 59, wherein the average density of the second phase is at least 1.5 times, 2 times, 5 times, or 10 times greater than the average density of the first phase. 61) The cake, pie, cookie, or pastry of any one of numbered embodiments 54 to 58, wherein an average density of the second phase is less than an average density of the first phase. 62) The cake, pie, cookie, or pastry of numbered embodiment 61, wherein the average density of the first phase is at least 1.5 times, 2 times, 5 times, or 10 times greater than the average density of the second phase. 63) The cake, pie, cookie, or pastry of any one of numbered embodiments 54 to 62, wherein an average sweetness level of the first phase is less than an average sweetness level of the second phase. 64) The cake, pie, cookie, or pastry of numbered embodiment 63, wherein the sweetness level is a sweetness perception by a subject. 65) The cake, pie, cookie, or pastry of any one of numbered embodiments 54 to 64, wherein the second phase is at least 1.5 times, 2 times, 5 times, or 10 times sweeter than the first phase. 66) The cake, pie, cookie, or pastry of any one of numbered embodiments 54 to 65, wherein the first phase is substantially uniformly dispersed throughout the foodstuff. 67) The cake, pie, cookie, or pastry of any one of numbered embodiments 54 to 66, wherein the second phase is nonuniformly dispersed throughout the foodstuff. 68) The cake, pie, cookie, or pastry of any one of numbered embodiments 54 to 67, wherein the second phase is nonuniformly dispersed throughout the first phase. 69) The cake, pie, cookie, or pastry of any one of numbered embodiments 54 to 67, wherein the second phase is disposed on a portion of an outer surface of the first phase. 70) The cake, pie, cookie, or pastry of any one of numbered embodiments 54 to 67, wherein the second phase is coated on a portion of an outer surface of the first phase. 71) The cake, pie, cookie, or pastry of any one of numbered embodiments 54 to 67, wherein the second phase is disposed on a portion of an outer surface of the foodstuff. 72) The cake, pie, cookie, or pastry of any one of numbered embodiments 54 to 67, wherein the second phase is coated on a portion of an outer surface of the foodstuff. 73) The cake, pie, cookie, or pastry of any one of numbered embodiments 54 to 67, wherein the second phase is disposed within a portion of the first phase. 74) The cake, pie, cookie, or pastry of any one of numbered embodiments 54 to 67, wherein the second phase is disposed within a portion of the foodstuff. 75) The cake, pie, cookie, or pastry of any one of numbered embodiments 54 to 57, wherein a volume of the first phase is greater than a volume of the second phase in the foodstuff. 76) The cake, pie, cookie, or pastry of numbered embodiment 75, wherein the volume of the first phase is 1.5 times, 2 times, 5 times, or 10 times greater than the second phase in the foodstuff. 77) The cake, pie, cookie, or pastry of any one of numbered embodiments 54 to 57, wherein a mass of the first phase is greater than a mass of the second phase in the foodstuff. 78) The cake, pie, cookie, or pastry of numbered embodiment 113, wherein the mass of the first phase is 1.5 times, 2 times, 5 times, or 10 times greater than the mass of the second phase in the foodstuff. 79) The cake, pie, cookie, or pastry of any one of numbered embodiments 54 to 76, wherein the first phase is formed from a dough, batter, paste, mousse, pudding, custard, yogurt, frozen yogurt, ice cream, gelato, sorbet, sherbet, panna cotta, fudge, or a combination thereof. 80) The cake, pie, cookie, or pastry of any one of numbered embodiments 54 to 76, wherein the first phase comprises a baked dough, batter, paste, mousse, pudding, custard, or a combination thereof. 81) The cake, pie, cookie, or pastry of any one of numbered embodiments 54 to 76, wherein the first phase comprises a dough, batter, paste, mousse, pudding, custard, yogurt, frozen yogurt, ice cream, gelato, sorbet, sherbet, panna cotta, fudge, or a combination thereof. 82) The cake, pie, cookie, or pastry of any one of numbered embodiments 54 to 79, wherein the second phase is formed from a fruit, syrup, frosting, glaze, fondant, candy bar, hard candy, cream, chocolate confection, peanut butter confection, mint confection, butterscotch confection, or a combination thereof. 83) The cake, pie, cookie, or pastry of numbered embodiment 80, wherein the fruit comprises a fresh fruit or a dried fruit. 84) The cake, pie, cookie, or pastry of any one of numbered embodiments 54 to 82, wherein the second phase comprises a fruit, syrup, frosting, glaze, fondant, candy bar, hard candy, cream, chocolate confection, peanut butter confection, mint confection, butterscotch confection, or a combination thereof. 85) The cake, pie, cookie, or pastry of numbered embodiment 82, wherein the fruit comprises a fresh fruit or a dried fruit. 86) The cake, pie, cookie, or pastry of any one of numbered embodiments 54 to 83, wherein the foodstuff is substantially free of a high-intensity sweetener. 87) The cake, pie, cookie, or pastry of any one of numbered embodiments 54 to 83, wherein the first phase is substantially free of a high-intensity sweetener. 88) The cake, pie, cookie, or pastry of any one of numbered embodiments 54 to 83, wherein the second phase is substantially free of a high-intensity sweetener. 89) The cake, pie, cookie, or pastry of any one of numbered embodiments 54 to 83, wherein the foodstuff is substantially free of a polyol. 90) The cake, pie, cookie, or pastry of any one of numbered embodiments 54 to 83, wherein the first phase is substantially free of a polyol. 91) The cake, pie, cookie, or pastry of any one of numbered embodiments 54 to 83, wherein the second phase is substantially free of a polyol. 92) The cake, pie, cookie, or pastry of numbered embodiment 54, wherein the second phase comprises glucose, fructose, galactose, sucrose, maltose, lactose, or a combination thereof. 93) The cake, pie, cookie, or pastry of any one of numbered embodiments 54 to 87, wherein the monosaccharide, disaccharide, or both is less than 10% by dry weight of the first phase. 94) The cake, pie, cookie, or pastry of any one of numbered embodiments 54 to 87, wherein the monosaccharide, disaccharide, or both is less than 5%, less than 4%, less than 3%, less than 2.5%, less than 2%, or less than 1% by dry weight of the first phase. 95) The cake, pie, cookie, or pastry of any one of numbered embodiments 54 to 87, wherein the first phase is substantially free of monosaccharides, disaccharides, or both. 96) The cake, pie, cookie, or pastry of any one of numbered embodiments 54 to 90, wherein the foodstuff comprises a polysaccharide, wherein the polysaccharide is a cellulosic polysaccharide, a hemicellulosic polysaccharide, a polysaccharide derivative, or a polysaccharide aggregate. 97) The cake, pie, cookie, or pastry of numbered embodiment 91, wherein the polysaccharide is a cellulosic polysaccharide. 98) The cake, pie, cookie, or pastry of numbered embodiment 91, wherein the hemicellulosic polysaccharide is xylan. 99) The cake, pie, cookie, or pastry of numbered embodiment 91, wherein the polysaccharide derivative is carboxymethylcellulose. 100) The cake, pie, cookie, or pastry of numbered embodiment 91, wherein the polysaccharide aggregate is undigested lignocellulosic material. 101) The cake, pie, cookie, or pastry of any one of numbered embodiments 91 to 95, wherein the polysaccharide comprises less than 15% by dry weight of the foodstuff. 102) The cake, pie, cookie, or pastry of any one of numbered embodiments 91 to 95, wherein the polysaccharide comprises less than 15% by dry weight of the first phase. 103) The cake, pie, cookie, or pastry of any one of numbered embodiments 91 to 95, wherein the second phase is substantially free of the polysaccharide. 104) The cake, pie, cookie, or pastry of any one of numbered embodiments 54 to 98, wherein the first phase is substantially free of glucose, fructose, galactose, sucrose, maltose, and lactose. 105) The cake, pie, cookie, or pastry of any one of numbered embodiments 54 to 99, wherein the first phase comprises at least 1% by dry weight of the at least one type of oligosaccharide. 106) The cake, pie, cookie, or pastry of any one of numbered embodiments 54 to 99, wherein the first phase comprises at least 2.5%, at least 5%, at least 10%, at least 12.5%, or at least 15% by dry weight of the at least one type of oligosaccharide. 107) The cake, pie, cookie, or pastry of any one of numbered embodiments 54 to 102, wherein the at least one type of oligosaccharide comprises the cello-oligosaccharides with a DP from two to six. 108) The cake, pie, cookie, or pastry of any one of numbered embodiments 54 to 102, wherein the at least one type of oligosaccharide comprises the xylo-oligosaccharides with a DP from two to twelve. 109) The cake, pie, cookie, or pastry of any one of numbered embodiments 54 to 102, wherein the at least one type of oligosaccharide comprises the mixed-linkage glucan oligosaccharides with a DP from two to five. 110) The cake, pie, cookie, or pastry of any one of numbered embodiments 54 to 102, wherein the at least one type of oligosaccharide comprises the manno-oligosaccharides having a DP from two to twelve. 111) The cake, pie, cookie, or pastry of any one of numbered embodiments 54 to 102, wherein the at least one type of oligosaccharide comprises the xyloglucan oligosaccharides having a DP from four to twelve. 112) The cake, pie, cookie, or pastry of any one of numbered embodiments 54 to 106, wherein the at least one type of oligosaccharide comprises cello-oligosaccharides and xylo-oligosaccharides. 113) The cake, pie, cookie, or pastry of any one of numbered embodiments 54 to 106, wherein the at least one type of oligosaccharide comprises cello-oligosaccharides and manno-oligosaccharides. 114) The cake, pie, cookie, or pastry of any one of numbered embodiments 54 to 108, wherein the cello-oligosaccharides comprise at least 10% by dry weight, at least 15% by dry weight, at least 20% by dry weight, at least 25% by dry weight, or at least 30% by dry weight of the foodstuff. 115) The cake, pie, cookie, or pastry of any one of numbered embodiment 109, wherein the cello-oligosaccharides comprise greater than 50%, greater than 60%, greater than 70%, greater than 70%, greater than 80%, or greater than 90% cellobiose. 116) The cake, pie, cookie, or pastry of any one of numbered embodiments 54 to 110, wherein the xylo-oligosaccharides comprise at least 10% by dry weight, at least 15% by dry weight, at least 20% by dry weight, at least 25% by dry weight, or at least 30% by dry weight of the foodstuff. 117) The cake, pie, cookie, or pastry of any one of numbered embodiment 111, wherein the xylo-oligosaccharides comprise xylo-oligosaccharides with one or more side branches. 118) The cake, pie, cookie, or pastry of any one of numbered embodiment 111, wherein the one or more side branches comprise glucuronosyl side branches, methylglucuronosyl side branches, arabinosyl side branches, or combinations thereof. 119) The foodstuff of numbered embodiment 110 or 111, wherein the xylo-oligosaccharides comprise xylose and arabinose monomers at a ratio from 20:1 to 2:1, 18:1 to 4:1, or 16:1 to 6:1. 120) The cake, pie, cookie, or pastry of any one of numbered embodiments 54 to 113, wherein the manno-oligosaccharides comprise at least 10% by dry weight, at least 15% by dry weight, at least 20% by dry weight, at least 25% by dry weight, or at least 30% by dry weight of the foodstuff. 121) The cake, pie, cookie, or pastry of any one of numbered embodiments 54 to 115, wherein the mixed-linkage glucan oligosaccharides comprise at least 10% by dry weight, at least 15% by dry weight, at least 20% by dry weight, at least 25% by dry weight, or at least 30% by dry weight of the foodstuff. 122) The cake, pie, cookie, or pastry of any one of numbered embodiments 54 to 116, wherein the xyloglucan oligosaccharides comprise at least 10% by dry weight, at least 15% by dry weight, at least 20% by dry weight, at least 25% by dry weight, or at least 30% by dry weight of the foodstuff. 123) The cake, pie, cookie, or pastry of any one of numbered embodiments 54 to 117, wherein the second phase comprises at least 1% by dry weight, at least 2% by dry weight, at least 3% by dry weight, at least 5% by dry weight, at least 8% by dry weight, at least 10% by dry weight, or at least 15% by dry weight of the monosaccharide, the disaccharide, or both. 124) The cake, pie, cookie, or pastry of any one of numbered embodiments 54 to 118, wherein the second phase comprises glucose. 125) The cake, pie, cookie, or pastry of any one of numbered embodiments 54 to 118, wherein the second phase comprises fructose. 126) The cake, pie, cookie, or pastry of any one of numbered embodiments 54 to 118, wherein the second phase comprises sucrose. 127) The cake, pie, cookie, or pastry of any one of numbered embodiments 54 to 118, wherein the second phase comprises galactose. 128) The cake, pie, cookie, or pastry of any one of numbered embodiments 54 to 118, wherein the second phase comprises maltose. 129) The cake, pie, cookie, or pastry of any one of numbered embodiments 54 to 118, wherein the second phase comprises lactose. 130) The cake, pie, cookie, or pastry of any one of numbered embodiments 54 to 124, wherein the second phase comprises less than 10%, 5%, 2%, or 1% of the at least one type of oligosaccharide. 131) The cake, pie, cookie, or pastry of any one of numbered embodiments 54 to 125, wherein the second phase is substantially free of the at least one type of oligosaccharide. 132) The cake, pie, cookie, or pastry of any one of numbered embodiments 54 to 126, wherein the foodstuff comprises a phenolic compound. 133) The cake, pie, cookie, or pastry of numbered embodiment 127, wherein the phenolic compound comprises lignin, a lignin breakdown product, ferulic acid, a ferulic acid derivative, or any combination thereof. 134) The cake, pie, cookie, or pastry of numbered embodiment 127, wherein the first phase comprises the phenolic compound. 135) The cake, pie, cookie, or pastry of numbered embodiment 127, wherein the second phase is substantially free of the phenolic compound. 136) The cake, pie, cookie, or pastry of any one of numbered embodiments 54 to 130, wherein the first phase further comprises oil, flour, egg, margarine, butter, shortening, baking soda, baking powder, yeast, or corn starch. 137) The cake, pie, cookie, or pastry of any one of numbered embodiments 54 to 130, wherein the second phase further comprises palm oil, cocoa butter, butter, shortening, margarine, milk, or cream.

EXAMPLES

The following illustrative examples are representative of embodiments of the compositions and methods described herein and are not meant to be limiting in any way.

Example 1—Baked Goods Made With Oligosaccharide Mixtures and Natural Sugars Have High Levels of Perceived Sweetness To test the effect and desirability of a multiphase foodstuff on individuals, several traditional sweets were made that contained multiple phases and were deployed in a taste test. These sweets were sandwich cookies (sandwich biscuits), chocolate chip muffins, fruit muffins, and layer cakes. Each of these sweets were made as a first phase comprising a batter or dough with differing levels of a natural sugar/oligosaccharide mixture and combined with a second phase that only comprised sucrose or naturally occurring sugar. Sweets were made with a dough/batter phase containing: i) only oligosaccharide mixture (sucrose free); ii) 75% oligosaccharide mixture and 25% sucrose; iii) 50% oligosaccharide mixture and 50% sucrose; and iv) 25% oligosaccharide mixture and 75% sucrose. In each case, the second phase was made with only a monosaccharide and/or disaccharide sugar/sweetener or the sugar naturally present in the second phase.

Sweets were fed to four individuals and each individual rated each sweet on an arbitrary scale. As shown in FIGS. 1 to 5, baked goods made with dough or batter that completely lacked sucrose (and only contained oligosaccharide mixture) and comprised a second phase with full sugar (sucrose or naturally occurring), were perceived as sweet or sweeter than baked goods that were made with dough and/or batter comprising different levels of bakers sugar.

Example 2—Sandwich Cookies (Biscuits)

Figure 6:
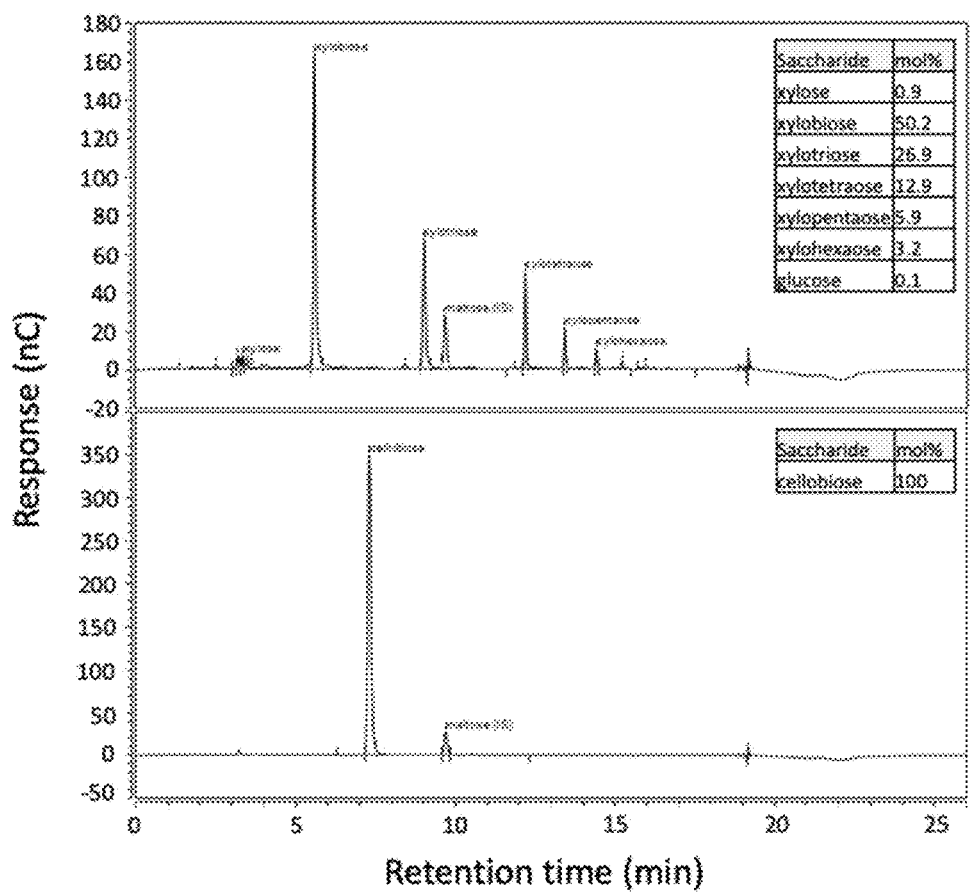
FIG. 6 shows HPLC traces illustrating saccharides comprising the xylo-oligosaccharide composition (top) and the cello-oligosaccharide composition (bottom) used to make an oligosaccharide mixture. The oligosaccharide mixture comprises 45% (w/w) xylo-oligosaccharide, 40% (w/w) cello-oligosaccharide, and 15% (w/w) microcrystalline cellulose.

The sandwich cookies (biscuits) were prepared as described below. HPLC traces illustrating oligosaccharides comprising the xylo-oligosaccharide composition (top) and the cello-oligosaccharide composition (bottom) used to make the oligosaccharide mixture are shown in FIG. 6. The oligosaccharide mixture comprises 45% (w/w) xylo-oligosaccharide, 40% (w/w) cello-oligosaccharide, and 15% (w/w) microcrystalline cellulose.

1. Cookies/biscuits (first phase):
    a. 25 g wholemeal flour, 25 g oatmeal, 12.5 g caster sugar (sugar) or 12.5 g oligosaccharide mixture, 0.25 g cinnamon, and 0.25 g all-spice mix were combined in a bowl with a food processor. The mixture was blitzed a few times to combine.
    b. 25 g cold cubed butter was added, and the mixture was pulsed until a crumbled texture was achieved.
    c. 2 g water was added, and the mixture was pulsed a few more times.
    d. The mixture was removed from the food processor and brought together into a ball.
    e. The mixture was rolled between two sheets of baking paper to 0.25 cm thickness.
    f. The rolled mixture was cut with a 4.5 cm ring cutter to make about 14 cookies/biscuits.
    g. The cookies/biscuits were bake in a preheated oven at 170° C. for 7 minutes.
2. Icing (second phase):
    a. 20 g softened butter and 60 g icing sugar were combined.
    b. 0.25 teaspoon vanilla and ½ tablespoon milk were added and mixed until fluffy.
3. Sandwich or non-sandwich cookies/biscuits were constructed as follows:
    a. No sugar cookie/biscuit+12 g icing total (9 g total sucrose) (#1)
    b. No sugar cookie/biscuit+6 g icing total (4.5 g total sucrose) (#2)
    c. 25% sugar cookie/biscuit, 9.4 oligosaccharide mixture+3.1 g sugar (3.1 g total sucrose) (#3)
    d. 50% sugar cookie/biscuit, 6.2 g oligosaccharide mixture+6.2 g sugar (6.2 g total sucrose) (#4)
    e. 75% sugar cookie/biscuit, 3.1 g oligosaccharide mixture+9.4 g sugar (9.4 g total sucrose) (#5)

The biscuits had a texture of similar to that when using sugar and had a crisp, crumbly, consistency, and had a sugar-like rise and color (yellow/light brown with browned edges and cracks) and a conventional biscuit-like wrinkling structure. The biscuit was itself noticeably less sweet than a biscuit with sucrose instead of saccharide mixture. Taste-testing showed that, for the same amount of sucrose per serving, when sucrose was contained in icing rather than in the biscuit batter cakes tasted roughly 1.5 arbitrary units sweeter when the sweetness of the cake with 75% sucrose in batter and no icing was defined as having a sweetness of 10 arbitrary units.

The nutritional composition of the components were as follows (Table 1):

TABLE 1

| Nutritional info shown per 100 g of product | #1. No sugar, with 12 g icing | #2. No sugar, with 6 g icing | #3. 25% sugar | #4. 50% sugar | #5. 75% sugar |
| --- | --- | --- | --- | --- | --- |
| Energy (kcal) | 435 | 434 | 441 | 450 | 458 |
| Energy (kJ) | 1812 | 1808 | 1838 | 1875 | 1910 |
| Protein (g) | 6.2 | 6.6 | 7.0 | 7.0 | 7.0 |
| Fat (g) | 25.2 | 25.5 | 26.0 | 26.0 | 26.0 |
| Saturates (g) | 14.6 | 14.8 | 15.0 | 15.0 | 15.0 |
| Carbohydrate (g) | 51.0 | 49.9 | 48.6 | 48.5 | 48.6 |
| Sugars (g) | 16.6 | 13.3 | 11.0 | 12.2 | 13.6 |
| Dietary Fiber (g) | 4.5 | 4.8 | 4.6 | 4.1 | 3.5 |
| Salt (g) | 0.01 | 0.01 | 0.01 | 0.01 | 0.02 |
| Sweetness | 10.8 | 7.5 | 5.0 | 7.0 | 10.0 |
| Sweetness/kcal | 0.025 | 0.017 | 0.011 | 0.016 | 0.022 |

Regulatory rules for nutritional labeling differ in different countries. In many countries, most or all monosaccharides and disaccharides constitute labeled "sugars" and are assigned a calorie value of 4 kcal/g. In many countries, most or all soluble, non-digestible carbohydrates of DP 3 or greater constitute labelled "dietary fiber" and are assigned a calorie value of 2 kcal/g. Currently, in the United State, not all soluble, non-digestible carbohydrates of DP 3 or greater constitute labeled "dietary fiber," rather they are labeled as carbohydrates, but are assigned a calorific value of 2 kcal/g. In the United State, all insoluble, non-digestible carbohydrates constitute labelled "dietary fiber," and are assigned a calorific value of 0 kcal/g. Calorie calculations in Tables 1-5 are done with: (i) saccharides of DP 1 or 2 being labelled "sugars" and being assigned a calorific value of 4 kcal/g; (ii) soluble, non-digestible saccharides of DP 3 or greater being labelled "carbohydrates" and being assigned a calorific value of 2 kcal/g; and (iii) insoluble saccharides being labelled "fiber" and being assigned a calorific value of 0 kcal/g.

Example 3—Chocolate Chip Muffins

The chocolate chip muffins were prepared as follows:
1. Cakes (first phase)
   a. 50 g plain flour, 26.25 g caster sugar (sugar) or oligosaccharide mixture, 0.75 teaspoon (tsp) baking powder, and 0.6 g salt were combined to form a dry mix. The oligosaccharide mixture comprises 45% (w/w) xylo-oligosaccharide, 40% (w/w) cello-oligosaccharide, and 15% (w/w) microcrystalline cellulose.
   b. 45 g milk, 17 g vegetable oil, and 13 g egg were combined to form a wet mix.
   c. The dry and wet mixes were mixed until just combined
2. Chocolate chips (second phase) were added where relevant (see below).
3. Muffins were constructed as follows:
   a. No sugar batter+30 g chocolate chips (16.5 g total sucrose) (#1)
   b. No sugar batter+15 g chocolate chips (8.95 g total sucrose) (#2)
   c. 25% sugar batter, no chocolate chips (6.6 g total sucrose) (#3)
   d. 50% sugar batter, no chocolate chips (13.1 g total sucrose) (#4)
   e. 75% sugar batter, no chocolate chips (19.7 g total sucrose) (#5)
4. The muffins were baked in a preheated oven at 170° C. for 10-12 minutes.

The cakes had a texture similar to that when using sugar and had a soft, cakey, chewy consistency, were able to hold moisture, and had a sugar-like rise and color (yellow/light brown with browned edges and cracks) and a conventional cake-like wrinkling structure. The cake was itself noticeably less sweet than a cake with sucrose instead of an oligosaccharide mixture. Taste-testing showed that, for the same amount of sucrose per serving, when sucrose was contained in chocolate chips rather than in the cake batter, cakes tasted roughly 2 arbitrary units sweeter when the sweetness of the cake with 75% sucrose in batter and no chocolate chips was defined as having a sweetness of 10 arbitrary units.

The nutritional composition of the components were as follows (Table 2):

TABLE 2

| Nutritional info shown per 100 g of product | #1. No sugar, with 30 g choc. chips | #2. No sugar, with 15 g choc. chips | #3. 25% sugar | #4. 50% sugar | #5. 75% sugar |
|---|---|---|---|---|---|
| Energy (kcal) | 317 | 297 | 283 | 293 | 303 |
| Energy (kJ) | 1326 | 1242 | 1185 | 1228 | 1272 |
| Protein (g) | 5.4 | 5.4 | 5.4 | 5.4 | 5.4 |
| Fat (g) | 16.1 | 14.8 | 13.2 | 13.2 | 13.2 |
| Saturates (g) | 4.7 | 3.4 | 1.7 | 1.7 | 1.7 |
| Carbohydrate (g) | 45.6 | 44.3 | 42.7 | 42.6 | 42.7 |
| Sugars (g) | 19.9 | 16.4 | 13.7 | 15.3 | 16.9 |
| Dietary Fiber (g) | 3.2 | 3.5 | 3.2 | 2.6 | 1.9 |
| Salt (g) | 0.88 | 0.94 | 1.02 | 1.02 | 1.02 |
| Sweetness | 11.3 | 8.8 | 5.5 | 7.6 | 10.0 |
| Sweetness/kcal | 0.035 | 0.029 | 0.019 | 0.026 | 0.033 |

Example 4—Blueberry Muffins

The blueberry muffins were prepared as follows:
1. Cakes (first phase)
   a. 50 g plain flour, 26.25 g caster sugar (sugar) or oligosaccharide mixture, 0.75 tsp baking powder, and 0.6 g salt were combined to form a dry mix. The oligosaccharide mixture comprises 45% (w/w) xylo-oligosaccharide, 40% (w/w) cello-oligosaccharide, and 15% (w/w) microcrystalline cellulose.
   b. 45 g milk, 17 g vegetable oil, and 13 g egg were combined to form a wet mix.
   c. The dry and wet mixes were mixed until just combined and zest of 0.2 lemon was added.
2. Blueberries (second phase) were added where relevant (see below).
3. Muffins were constructed as follows:
   a. No sugar batter+30 g dried blueberries (17.9 g total sucrose) (#1)
   b. No sugar batter+15 g dried blueberries (8.95 g total sucrose) (#2)
   c. 25% sugar batter, no blueberries (6.6 g total sucrose) (#3)
   d. 50% sugar batter, no blueberries (13.1 g total sucrose) (#4)
   e. 75% sugar batter, no blueberries (19.7 g total sucrose) (#5)
4. Muffins were baked in a preheated oven at 170° C. for 10-12 minutes.

The cakes had a texture similar to that when using sugar and had a soft, cakey, chewy consistency, were able to hold moisture, and had a sugar-like rise and color (yellow/light brown with browned edges and cracks) and a conventional cake-like wrinkling structure. The cake was itself noticeably less sweet than a cake with sucrose instead of a saccharide mixture. Taste-testing showed that, for the same amount of sucrose per serving, when sucrose was contained in blueberries rather than in the cake batter, cakes tasted sweeter until batter sucrose content was raised to 75% w/w of the amount in the conventional recipe.

The nutritional composition of the components were as follows (Table 3):

TABLE 3

| Nutritional info shown per 100 g of product | #1. No sugar, with 30 g blueberries | #2. No sugar, with 15 g blueberries | #3. 25% sugar | #4. 50% sugar | #5. 75% sugar |
| --- | --- | --- | --- | --- | --- |
| Energy (kcal) | 287 | 280 | 282 | 292 | 302 |
| Energy (kJ) | 1202 | 1171 | 1177 | 1221 | 1264 |
| Protein (g) | 4.6 | 5.0 | 5.3 | 5.3 | 5.3 |
| Fat (g) | 11.3 | 12.1 | 13.1 | 13.1 | 13.1 |
| Saturates (g) | 1.5 | 1.6 | 1.7 | 1.7 | 1.7 |
| Carbohydrate (g) | 49.4 | 46.2 | 42.5 | 42.5 | 42.5 |
| Sugars (g) | 22.4 | 17.7 | 13.7 | 15.2 | 16.8 |
| Dietary Fiber (g) | 4.0 | 3.9 | 3.2 | 2.6 | 2.0 |
| Salt (g) | 0.85 | 0.92 | 1.01 | 1.01 | 1.01 |
| Sweetness | 10.3 | 11.3 | 8.8 | 5.5 | 7.6 |
| Sweetness/kcal | 0.036 | 0.040 | 0.031 | 0.019 | 0.025 |

Example 5—Cranberry Muffins

The cranberry muffins were prepared as follows:
1. Cakes (first phase)
   a. 50 g plain flour, 26.25 g caster sugar (sugar) or oligosaccharide mixture, 0.75 tsp baking powder, and 0.6 g salt were combined to form a dry mix. The oligosaccharide mixture comprises 45% (w/w) xylo-oligosaccharide, 40% (w/w) cello-oligosaccharide, and 15% (w/w) microcrystalline cellulose.
   b. 45 g milk, 17 g vegetable oil, and 13 g egg were combined to form a wet mix.
   c. The dry and wet mixes were mixed together until just combined and zest of 0.2 orange was added.
2. Cranberries (second phase) were added where relevant (see below).
3. Muffins were constructed as follows:
   a. No sugar batter+30 g dried cranberries (20.2 g total sucrose) (#1)
   b. No sugar batter+15 g dried cranberries (10.1 g total sucrose) (#2)
   c. 25% sugar batter, no cranberries (6.6 g total sucrose) (#3)
   d. 50% sugar batter, no cranberries (13.1 g total sucrose) (#4)
   e. 75% sugar batter, no cranberries (19.7 g total sucrose) (#5)
4. Muffins were baked in a preheated oven at 170° C. for 10-12 minutes.

The cakes had a texture similar to that when using sugar and had a soft, cakey, chewy consistency, were able to hold moisture, and had a sugar-like rise and color (yellow/light brown with browned edges and cracks) and a conventional cake-like wrinkling structure. The cake was itself noticeably less sweet than a cake with sucrose instead of a saccharide mixture. Taste-testing showed that, for the same amount of sucrose per serving, when sucrose was contained in cranberries rather than in the cake batter, cakes tasted sweeter until batter sucrose content was raised to 75% w/w of the amount in the conventional recipe.

The nutritional composition of the components were as follows (Table 4):

TABLE 4

| Nutritional info shown per 100 g of product | #1. No sugar, with 30 g cranberries | #2. No sugar, with 15 g cranberries | #3. 25% sugar | #4. 50% sugar | #5. 75% sugar |
| --- | --- | --- | --- | --- | --- |
| Energy (kcal) | 285 | 279 | 282 | 292 | 302 |
| Energy (kJ) | 1193 | 1167 | 1180 | 1223 | 1266 |
| Protein (g) | 4.5 | 4.9 | 5.3 | 5.3 | 5.3 |
| Fat (g) | 11.2 | 12.1 | 13.1 | 13.1 | 13.1 |
| Saturates (g) | 1.5 | 1.6 | 1.7 | 1.7 | 1.7 |
| Carbohydrate (g) | 49.0 | 46.1 | 42.6 | 42.5 | 42.6 |
| Sugars (g) | 22.5 | 17.7 | 13.7 | 15.2 | 16.8 |
| Dietary Fiber (g) | 4.2 | 4.0 | 3.2 | 2.6 | 2.0 |
| Salt (g) | 0.85 | 0.92 | 1.01 | 1.01 | 1.01 |
| Sweetness | 10.0 | 8.0 | 4.3 | 6.5 | 10.0 |
| Sweetness/kcal | 0.035 | 0.029 | 0.015 | 0.022 | 0.033 |

Example 6—Jam Layer Cakes

The jam layer cakes were prepared as follows:
1. Cakes (first phase)
   a. 50 g plain flour, 26.25 g caster sugar (sugar) or oligosaccharide mixture, 0.75 tsp baking powder, and 0.6 g salt were combined to form a dry mix. The oligosaccharide mixture comprises 45% (w/w) xylo-oligosaccharide, 40% (w/w) cello-oligosaccharide, and 15% (w/w) microcrystalline cellulose.
   b. 45 g milk, 17 g vegetable oil, and 13 g egg were combined to form a wet mix.
   c. The dry and wet mixes were mixed together until just combined and 0.25 tsp vanilla extract was added.
2. Jam (second phase) was added to make layer cakes where relevant (see below).
3. Cakes were constructed as follows:
   a. No sugar batter+30 g jam sandwiched once baked (17.1 g sucrose) (#1)
   b. No sugar batter+15 g jam sandwiched once baked (8.5 g sucrose) (#2)
   c. 25% sugar batter, no jam (6.6 g total sucrose) (#3)
   d. 50% sugar batter, no jam (13.1 g total sucrose) (#4)
   e. 75% sugar batter, no jam (19.7 g total sucrose) (#5)
4. Cakes were baked in a preheated oven at 170° C. for 10-12 minutes.

The cakes had a texture similar to that when using sugar and had a soft, cakey, chewy consistency, were able to hold moisture, and had a sugar-like rise and color (yellow/light brown with browned edges and cracks) and a conventional cake-like wrinkling structure. The cake was itself noticeably less sweet than a cake with sucrose instead of a saccharide mixture. The jam had a conventional sweet and fruity taste and a conventional thick and sticky texture. Taste-testing showed that, for the same amount of sucrose per serving, when sucrose was contained in jam rather than in the cake batter, cakes tasted roughly 2 arbitrary units sweeter when the sweetness of the cake with 75% sucrose in batter and no jam was defined as having a sweetness of 10 arbitrary units.

The nutritional composition of the components were as follows (Table 5):

TABLE 5

| Nutritional info shown per 100 g of product | #1. No sugar, with 30 g jam | #2. No sugar, with 15 g jam | #3. 25% sugar | #4. 50% sugar | #5. 75% sugar |
| --- | --- | --- | --- | --- | --- |
| Energy (kcal) | 269 | 271 | 283 | 293 | 303 |
| Energy (kJ) | 1129 | 1134 | 1183 | 1226 | 1269 |
| Protein (g) | 4.5 | 4.9 | 5.3 | 5.3 | 5.3 |
| Fat (g) | 11.1 | 12 | 13.1 | 13.1 | 13.1 |
| Saturates (g) | 1.5 | 1.6 | 1.7 | 1.7 | 1.7 |
| Carbohydrate (g) | 45.6 | 44.1 | 42.4 | 42.4 | 42.4 |
| Sugars (g) | 17.7 | 15.2 | 13.7 | 15.2 | 16.8 |
| Dietary Fiber (g) | 3.4 | 3.6 | 3.2 | 2.5 | 1.9 |
| Salt (g) | 0.87 | 0.93 | 1.01 | 1.01 | 1.01 |
| Sweetness | 11.4 | 8.9 | 5.5 | 8.0 | 10.0 |
| Sweetness/kcal | 0.042 | 0.033 | 0.019 | 0.027 | 0.033 |

Example 7—Chocolate Oat Crunch Cookies (Biscuits)

Figure 7:
FIG. 7 shows a food product comprising a cookie (biscuit) as an oligosaccharide-containing phase and chocolate topping as a sugar-containing phase according to aspects of the disclosure.

Chocolate oat crunch cookies (biscuits) were made as follows:
1. Cookies/biscuits (first phase)
   a. 60 g self-raising whole wheat flour, 40 g oats, 1 tsp salt, and 60 g of an oligosaccharide mixture, as described above, comprising xylo-oligosaccharides (primarily xylo-oligosaccharides with a degree of polymerization (DP) from two to eight), cello-oligosaccharides (primarily cellobiose), and microcrystalline cellulose in a ratio of 9:8:3, respectively, were combined to form a dry mix.
   b. 56 g butter was mixed into the dry mix to form a composition with a breadcrumb texture.
   c. 25 ml of milk and 1 tsp vanilla extract were added to the breadcrumb texture composition and worked to form dough.
   d. The dough was then divided into 10 even-sized balls, which were placed onto a greased baking tray, flattened, and cooked at 180° C. for 15 minutes.
2. Chocolate mix (second phase)
   a. 50 g milk chocolate and 15 g butter were melted together over a bain-marie and stirred until combined.
3. Chocolate oat crunch cookies/biscuits
   a. Each cookie/biscuit was topped with 5 g chocolate mix and then cooled to set.
4. The cookies/biscuits were golden brown with (i) a crunchy, crumbly texture and good snap and (ii) a subtle sweetness that was enriched by the smooth, glossy chocolate topping. As shown in FIG. 7, the cookies/biscuits had cracked, oaty (or oat-like) textures, and were slightly domed on their upper sides. The chocolate topping complimented the flavor of the cookies/biscuits. A layer of topping (chocolate mix) that was from 1 to 5 mm thick was the best at providing the flavor and sweetness. The topping had greater than twice the sweetness of the cookies/biscuit.

Furthermore, the cookie/biscuit had a first texture and the chocolate mix had a second texture. The first texture was different than the second texture. The chocolate spread was disposed on portions of the top sides of the outer surfaces of the oat crunch cookies. In some cases, the volume of the cookie/biscuit was greater than the volume of chocolate spread disposed on its surface (e.g., the biscuits/cookies shown in FIG. 7). The cookies/biscuits were also less dense than the chocolate spread.

Example 8—Shortbread With Chocolate Chips

A shortbread with chocolate chips was made as follows:
1. Shortbread (first phase)
   a. 230 g butter and 100 g of an oligosaccharide mixture, as described above, comprising xylo-oligosaccharides (primarily xylo-oligosaccharides with a DP from two to eight), cello-oligosaccharides (primarily cellobiose), and microcrystalline cellulose in a ratio of 9:8:3, respectively, were thoroughly mixed until well blended.
b. 210 g plain flour and 20 g corn flour were added to the butter/oligosaccharide mixture to form a composition with a breadcrumb texture.
c. 4 tsp vanilla extract was then added to the breadcrumb texture composition and mixed to form a dough, which was promptly refrigerated for 20 minutes.
d. Next, 80 g milk chocolate chips (second phase) were kneaded into the dough.
e. The dough was then rolled, cut into shape, and baked for 10 minutes at 175° C.

Figure 8:
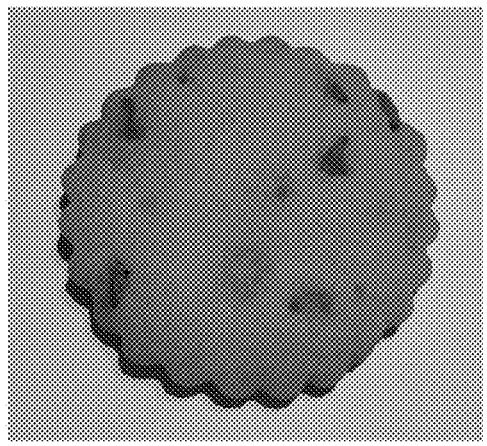
FIG. 8 shows a food product comprising a cookie (biscuit) as an oligosaccharide-containing phase interspersed with chocolate chips as a sugar-containing phase according to aspects of the disclosure.

2. As is shown in FIG. 8, the result was a short shortbread with a pale beige color and smooth surface. The shortbread was subtly sweet and buttery with a delicate vanilla flavor and a crumbly texture which provided a good snap. Chocolate chips were dispersed nonuniformly throughout the shortbread (with some chocolate chips disposed within and other chocolate chips disposed on or at the surface of the shortbread) and provided a rich sweetness that complimented the delicate cookie/biscuit flavor. Shortbread with chocolate pieces from 3 to 10 mm in thickness provided the best effect; when smaller than 3 mm in thickness, the chocolate pieces melted into the structure of the shortbread and did not elicit the same intense sweetness sensation.

Furthermore, the shortbread had a first texture and the chocolate chips had a second texture. The first texture was different than the second texture. While the shortbread (not including the chocolate chips) comprised a greater percentage of the volume of the shortbread (including the chocolate chips) than the chocolate chips alone, the higher density and sweetness of the chocolate chips combined with the lower density and sweetness of the shortbread (not including the chocolate chips) to provide a complex and enjoyable flavor and consistency.

Example 9—Shortbread Thumbprint With Fruit Jam

Figure 9:
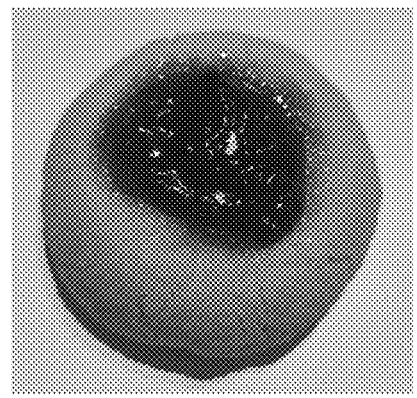
FIG. 9 shows a food product comprising a shortbread cookie (biscuit) as an oligosaccharide-containing phase and fruit jam topping as a sugar-containing phase according to aspects of the disclosure.

Shortbread thumbprints with fruit jam were made as follows:
1. Shortbread (first phase)
   a. 200 g butter and 100 g of an oligosaccharide mixture, as described above, comprising xylo-oligosaccharides (primarily xylo-oligosaccharides with a DP from two to eight), cello-oligosaccharides (primarily cellobiose), and microcrystalline cellulose in a ratio of 9:8:3, respectively, were thoroughly mixed until smooth.
   b. 210 g plain flour was mixed into the butter/oligosaccharide mixture to form a composition with a breadcrumb texture.
   c. 4 tbsp vanilla extract was added and mixed to form a dough, which was then refrigerated for 20 minutes.
   d. Next, the dough was separated into 30 g balls which were placed onto baking parchment. Shallow depressions were formed on the top of the balls by applying pressure with the distal phalanx of a thumb.
   e. The dough balls were then baked at 175° C. for 10 minutes.
2. Strawberry jam (second phase)
   a. After the shortbreads had cooled, strawberry jam was placed in the thumbprint concavity on the top of each shortbread.
3. An example shortbread thumbprint with fruit jam is shown in FIG. 9. The result was short, crumbly shortbread biscuits which had good snap and would melt in the mouth. The shortbreads were pale beige in color and had bright red circles of jam disposed on at least a portion of the tops of their outer surfaces. The biscuits were subtly sweet and buttery with delicate vanilla flavors that were complimented by the sharp, sweet, and fruity jam.

While the jam was sweeter and denser than the shortbread, the small size of the jam spots relative to the larger volumes of the shortbread allowed the different textures and flavors of both phases to compliment and mix.

Example 10—Soft Vegan Whole Meal Cookies

Figure 10:
FIG. 10 shows a food product comprising a vegan cookie as an oligosaccharide-containing phase interspersed with sultanas as a sugar-containing phase according to aspects of the disclosure.

Soft vegan whole meal cookies were made as follows:
1. Soft vegan wholemeal cookie (first phase)
   a. 36 g of an oligosaccharide mixture, as described above, comprising xylo-oligosaccharides (primarily xylo-oligosaccharides with a DP from two to eight), cello-oligosaccharides (primarily cellobiose), and microcrystalline cellulose in a ratio of 9:8:3, respectively, was mixed with 18 g coconut oil, 18 g vegetable baking fat, 1 tsp vanilla extract, and 26 g hazelnut milk.
   b. Next, 36 g wholemeal flour, ½ tsp ground cinnamon, and 16 g ground oats were stirred into the mixture to form a dough.
   c. This was followed by the addition of 24 g of sultanas (second phase) and chopped pecans, which were stirred into the dough.
   d. The dough was divided into 6 balls, placed on parchment paper, and baked for 10 minutes at 180° C.
2. The resulting cookies were soft, chewy, and slightly cakey, with subtly sweet, malty flavors complimented by notes of cinnamon, vanilla, and nutty pecan. The sultanas provided hints of treacly sweetness that increased the overall sweetness of the cookies. An example of a vegan wholemeal cookie is shown in FIG. 10.

The sultanas were dispersed nonuniformly throughout the cookies. While the sultanas constituted a smaller percentage of the volume of the food product than the cookie material, their higher densities and sweetness (relative to the cookie material) allowed them to provide poignant notes of treacly flavor. The differences in cookie and sultana texture combined to provide a complex gustatory experience.

Example 11—Wholemeal Cookies

Whole meal cookies were made as follows:
1. Wholemeal cookie (first phase)
   a. 37 g butter was creamed with 35 g of an oligosaccharide mixture, as described above, comprising xylo-oligosaccharides (primarily xylo-oligosaccharides with a DP from two to eight), cello-oligosaccharides (primarily cellobiose), and microcrystalline cellulose in a ratio of 9:8:3, respectively, to form a mixture.
   b. ½ tsp vanilla and 18 g egg were then added to the mixture.

c. Next, 35 g wholemeal flour, ¼ tsp baking soda, ½ tsp ground cinnamon, 15 g ground oats, 1 g smashed cornflakes, and 32 g sultanas (second phase) were stirred into the mixture.

d. The resulting dough was divided into tablespoon sized portions, dropped onto baking parchment, and baked for 10 minutes at 180° C.

Figure 11:
FIG. 11 shows a food product comprising a cookie as an oligosaccharide-containing phase interspersed with sultanas as a sugar-containing phase according to aspects of the disclosure.

2. The resulting cookies were soft, chewy, and slightly cakey, with the cornflakes adding occasional crunchiness. The cookies had subtly sweet, malty, buttery flavors, complimented by notes of cinnamon and vanilla. The sultanas provided hints of treacly sweetness that increased the overall sweetness of the cookies. An example wholemeal cookie is shown in FIG. 11.

The sultanas were sweeter, denser, and of a considerably different texture than the cookies. However, because the sultanas were nonuniformly dispersed throughout the cookies and constituted a lower percentage of the volume of the food product than the cookie material, the sultanas delicately accented the sweet, malty, and buttery flavors of the cookies.

Example 12—Carrot Cupcakes With Cream Cheese Topping

Figure 12:
FIG. 12 shows a food product comprising carrot cupcakes as a first oligosaccharide-containing phase and cream cheese topping as a sugar-containing phase according to aspects of the disclosure.

Carrot cupcakes with cream cheese topping were made as follows:

1. Carrot cupcakes (first phase)
   a. 120 g of an oligosaccharide mixture, as described above, comprising xylo-oligosaccharides (primarily xylo-oligosaccharides with a DP from two to eight), cello-oligosaccharides (primarily cellobiose), and microcrystalline cellulose in a ratio of 9:8:3, respectively, was creamed with 1 egg to form a pale and creamy mixture.
   b. Next, 100 ml sunflower oil, 125 g self-rising flour, ½ tsp bicarbonate of soda, 165 g grated carrots, 38 g chopped walnuts, ¼ tsp salt, 2 tsp cinnamon, ½ tsp all-spice, ½ tsp nutmeg, and 1 tsp vanilla extract were beaten into the mixture to form a batter.
   c. 110 g crushed pineapple was added to the batter.
   d. The batter was then poured into cupcake cases and baked for 30-35 minutes at 170° C.
2. Cream cheese topping (second phase)
   a. 50 g cream cheese, 100 g mascarpone, 50 g butter, 35 g oligosaccharides, 7 g vanilla extract, 8 g lemon extract, zest from 1 lemon, and 20 g crushed pineapple were mixed to form cream cheese frosting.
3. Finally, the cupcakes were topped with cream cheese frosting.
4. Exemplary carrot cupcakes with cream cheese topping are shown in FIG. 12. The resulting cupcakes were soft and spiced, with carrot and pineapple dispersed throughout, adding sweetness. The cream cheese topping was coated on top of at least a portion of the outer surfaces of the cupcakes and was also sweetened by the addition of pineapple. The cream cheese topping contributed a moist, creamy texture that complimented the soft, cakey texture of the cupcakes.

Because the cream cheese topping was denser and sweeter than the cupcakes, the volume of cream cheese topping applied to a cupcake's surface was generally less than the volume of the cupcake.

Example 13—Chocolate Orange Cupcakes With Ganache

Figure 13:
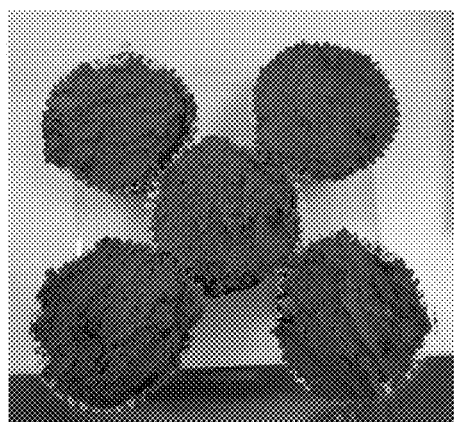
FIG. 13 shows a food product comprising chocolate orange cake as an oligosaccharide-containing phase and ganache as a sugar-containing phase according to aspects of the disclosure.

Chocolate orange cupcakes with ganache were prepared as follows:

1. Chocolate orange cakes (first phase)
   a. 25 g cocoa powder was mixed into 45 ml boiling water to form a paste.
   b. 50 g butter, ½ tsp vanilla, 2 eggs, 4 tablespoons (tbsp) milk, 85 g self-rising flour, ½ tsp baking powder, the zest and juice of ½ of an orange, and 150 g of an oligosaccharide mixture, as described above, comprising xylo-oligosaccharides (primarily xylo-oligosaccharides with a DP from two to eight), cello-oligosaccharides (primarily cellobiose), and microcrystalline cellulose in a ratio of 9:8:3, respectively, were beaten into the paste.
   c. The resulting composition was divided into cupcake cases and baked at 180° C. for 20 minutes.
2. Ganache (second phase)
   a. 50 g chocolate and 100 ml double cream were placed in a bowl and heated over a bain-marie until combined.
   b. 15 g icing sugar and juice from ½ of an orange were mixed into the chocolate/cream mixture, thus forming a ganache.
   c. The ganache was set to cool and then beaten until peaks formed.
3. Finally, the cupcakes were topped with the ganache.
4. The resulting cupcakes were soft, rich, and chocolatey, with hints of orange flavor (e.g., similar to the cupcakes made with cane sugar). The chocolate ganache increased the sweetness of the cupcakes considerably. Examples of chocolate orange cupcakes are shown in FIG. 13.

The chocolate ganache was disposed on at least a portion of the surfaces of the outer portions of the cupcakes. Thus, it was possible to separately taste the sweeter, denser chocolate ganache and the more lightly textured and delicately flavored cupcakes before these features would mix upon chewing. The lower volume of chocolate ganache relative to cupcake allowed the different flavors of the ganache and cupcake to delicately balance.

Example 14—Vanilla Swiss Roll With Strawberry Mascarpone Cream

Figure 14:
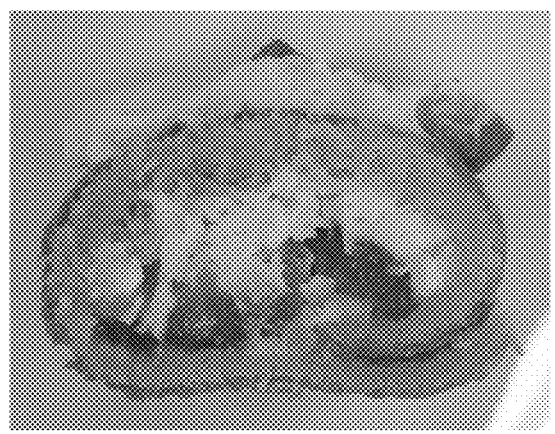
FIG. 14 shows a food product comprising a cake as a first oligosaccharide-containing phase, strawberries as a sugar-containing phase, and mascarpone cream as a second oligosaccharide-containing phase according to aspects of the disclosure.

A vanilla Swiss roll with strawberry mascarpone cream was prepared as follows:

1. Vanilla sponge cake (first phase)
   a. 3 eggs were beaten with 105 g of an oligosaccharide mixture, as described above, comprising xylo-oligosaccharides (primarily xylo-oligosaccharides with a DP from two to eight), cello-oligosaccharides (primarily cellobiose), and microcrystalline cellulose in a ratio of 9:8:3, respectively, until the mixture was thick and pale yellow.
   b. 59 ml water and 1 tsp vanilla extract were then added to the mixture.
   c. Next, 62 g plain flour, 1 tsp baking powder, and ¼ tsp salt were folded into the mixture until it attained a smooth texture.
   d. The mixture was transferred into a parchment-lined shallow baking sheet and then baked for 12 minutes at 170° C.
   e. The resulting cake was inverted onto a tea towel that had been dusted with an oligosaccharide mixture comprising xylo-oligosaccharides (primarily xylo-oligosaccharides with a DP from two to eight), cello-oligosaccharides (primarily cellobiose), and microcrystalline cellulose in a ratio of 9:8:3, respectively, peeled from the parchment, rolled inside of the towel, and left to cool.
2. Mascarpone cream (additional oligosaccharide-containing phase) with strawberries (second phase)
   a. 110 g mascarpone was beaten with 15 g crushed pineapple, 8 g vanilla, zest of 1 lemon, 15 g lemon juice, and 70 g of an oligosaccharide mixture comprising xylo-oligosaccharides (primarily xylo-oligosaccharides with a DP from two to eight), cello-oligosaccharides (primarily cellobiose), and microcrystalline cellulose in a ratio of 9:8:3, respectively, until creamy.
   b. Next, 100 g diced strawberries (second phase) were stirred into the mixture.
3. Finally, the cooled cake was unrolled, and the strawberry mascarpone cream was spread evenly on its surface. The cake was then rolled (as shown in FIG. 14), and the remaining strawberry mascarpone cream was spread on top. Thus, the mascarpone cream was disposed substantially evenly within and on at least a portion of the top portion of the outer surface of the Swiss roll, while the strawberries were disposed unevenly throughout the food product.
4. The resulting vanilla Swiss roll was light and soft with a slightly sweet vanilla flavor, similar to the one made with cane sugar. The mascarpone cream filling added considerable tangy flavor and sweetness to the product, the sweetness mainly coming from the crushed pineapple and the strawberries.

The strawberries were sweeter, denser, and tougher than the Swiss roll and mascarpone cream, and thus provided strong bursts of flavor, sweetness, and texture notes. Because the strawberries constituted a smaller percentage of the volume of the food product than either the Swiss roll or the mascarpone cream, the flavors of all three components were able to delicately combine.

Example 15—Cinnamon and Berry Granola Bars

Figure 15:
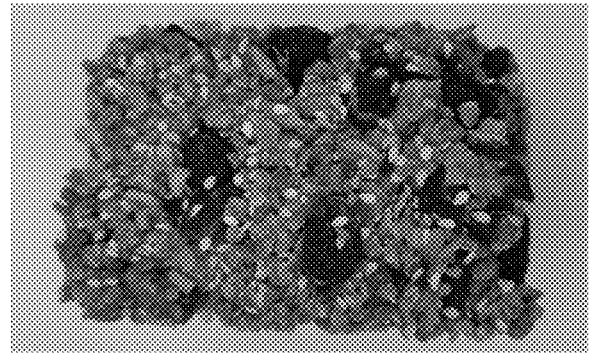
FIG. 15 shows a food product comprising granola as an oligosaccharide-containing phase and berries as a sugar-containing phase according to aspects of the disclosure.

Cinnamon and berry granola bars were prepared as follows:
1. Granola (first phase)
   a. 100 g oats, 100 g sunflower seeds, 50 g sesame seeds, and 50 g chopped walnuts were mixed and then toasted in an oven for 5 minutes to form a dry mixture.
   b. 150 g butter was whisked with 100 g of an oligosaccharide mixture, as described above, comprising xylo-oligosaccharides (primarily xylo-oligosaccharides with a DP from two to eight), cello-oligosaccharides (primarily cellobiose), and microcrystalline cellulose in a ratio of 9:8:3, respectively, to form a smooth, wet mixture.
   c. The wet mixture was warmed in a pan with 3 tbsp agave syrup and stirred until melted.
   d. The dry and wet mixtures were combined and stirred with 1 tsp ground cinnamon and 100 g mixed berries (second phase) until all solid components were coated.
   e. The resulting mixture was tipped into a lined baking tray, pressed to flatness, and then baked at 180° C. for 30 minutes. Once cooled, the resulting cinnamon and berry granola product was divided into bars.
2. An example of a cinnamon and berry granola bar is shown in FIG. 15. The resulting bars had the texture of nutty, crumbly cereal bars, and were similar to the cinnamon and berry granola bars made with cane sugar.

The bars had sweet, nutty flavors with hints of cinnamon. The sweetness of the bars was enriched by the agave syrup and the mixed dried berries, which provided hints of treacly sweetness.

The berries were nonuniformly dispersed throughout the granola bars and constituted a smaller portion of the total volume of the bars than the granola. The sweet, dense, softly textured berries pleasantly counterbalanced the less sweet, less dense, and tougher granola.

Example 16—Almond Butter Granola Bars

Figure 16:
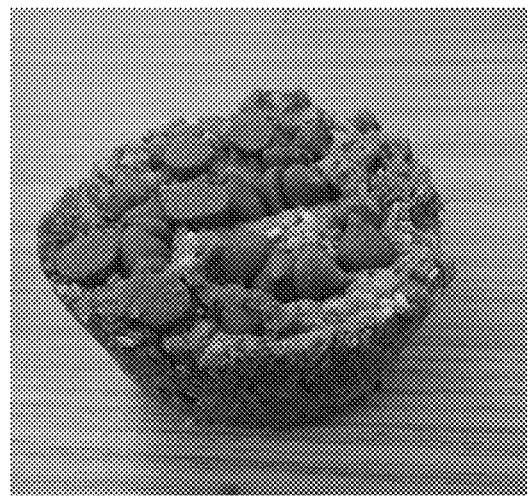
FIG. 16 shows a food product comprising almond butter granola bars as an oligosaccharide-containing phase a chocolate chips as a sugar-containing phase according to aspects of the disclosure.

Almond butter granola bars were prepared as follows:
1. Granola bars (first phase)
   a. 60 g almond butter was first melted with 30 g coconut oil.
   b. 60 g of an oligosaccharide mixture, as described above, comprising xylo-oligosaccharides (primarily xylo-oligosaccharides with a DP from two to eight), cello-oligosaccharides (primarily cellobiose), and microcrystalline cellulose in a ratio of 9:8:3, respectively, was then mixed into the oil/butter mixture, and left to cool for 3 minutes.
   c. The resulting mixture was whisked with 1 tsp cinnamon, 50 g oats, 50 g chopped almonds, 50 g chopped walnuts, 25 g sunflower seeds, 15 g sesame seeds, and 25 g egg white.
   d. The mixture was then transferred into a lined baking tray and pressed down until tightly compressed.
   e. The mixture was topped with 30 g chocolate chips (second phase) and then recompressed.
   f. The mixture was then baked at 180° C. for 15 minutes until the edges were slightly brown.
   g. The resultant granola bar was set to cool, and then sliced into smaller bars.
2. The resultant granola bars had sweet, creamy, nutty almond flavors with hints of cinnamon and vanilla, and were similar to those made with cane sugar. The texture of the bars was similar to those of nutty, crumbly cereal bars. The chocolate chip topping was nonuniformly disposed over the top surface of the bars and added hints of rich sweetness that elevated the overall sweetness of the bars. An example of an almond butter granola bar is shown in FIG. 16.

Even though the volume of the granola bars was greater than the volume of chocolate chip topping, the higher density and sweetness of the chocolate chips allowed the chocolate chip topping to provide the bars with a rich chocolate profile, while the soft, melty texture of the chocolate chip topping pleasantly balanced the tougher, crunchy texture of the granola.

Example 17—Date Oat Flapjack Bars

Date oat flapjack bars were made as follows:
1. Oat flapjack mixture (first phase)
   a. 280 g of an oligosaccharide mixture, as described above, comprising xylo-oligosaccharides (primarily xylo-oligosaccharides with a DP from two to eight), cello-oligosaccharides (primarily cellobiose), and microcrystalline cellulose in a ratio of 9:8:3, respectively, was mixed with 230 g coconut oil.
   b. The resultant composition was mixed with 280 g oats, 110 g apple sauce, 20 g vanilla extract, and 10 g cinnamon.

Figure 17:
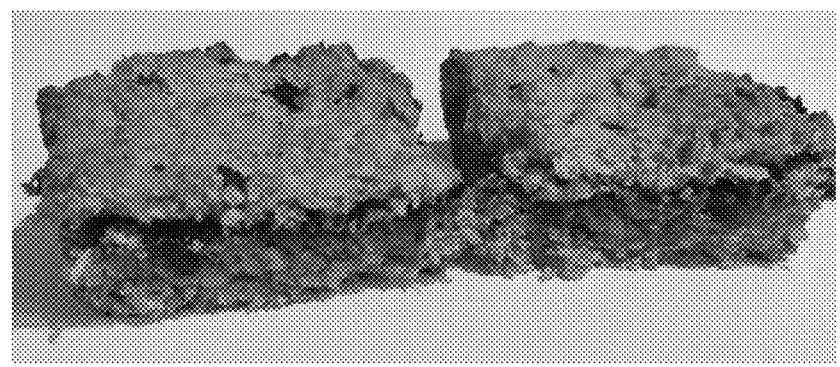
FIG. 17 shows a food product comprising oat bar layers as an oligosaccharide-containing phase and blended dates as a sugar containing phase according to aspects of the disclosure.

2. Date spread (second phase)
   a. 150 g chopped dried dates was heated in a saucepan with a splash of water.
   b. The dates were then blended to form a spread.
3. Half of the oat flapjack mixture was spread over a greased tin, then compressed.
4. The date spread was then evenly distributed over the oat flapjack mixture.
5. This was followed by addition of the remaining half of the oat flapjack mixture over the date spread.
6. The entire product was again compressed, and then baked at 175° C. for 15 minutes.
7. The resultant date oat flapjack bars are shown in FIG. 17. The bars were golden brown, crumbly, had sweet oat flavors with hints of coconut and cinnamon, and were similar to ones made with cane sugar or syrup. The sweetness of the oligosaccharide mixture was enhanced by the sweet apple sauce and the date filling.

The date filling layer was disposed in the middle of the oat flapjack bars, between layers of oat bar. Its gooey texture nicely complimented the chewier texture of the oat layers. While the date filling constituted a lesser total volume than the oat bar layers, its higher density and sweetness allowed its flavors to be discerned over the coconut and cinnamon flavors of the oat bar layers.

Example 18—Tiramisu

Figure 18:
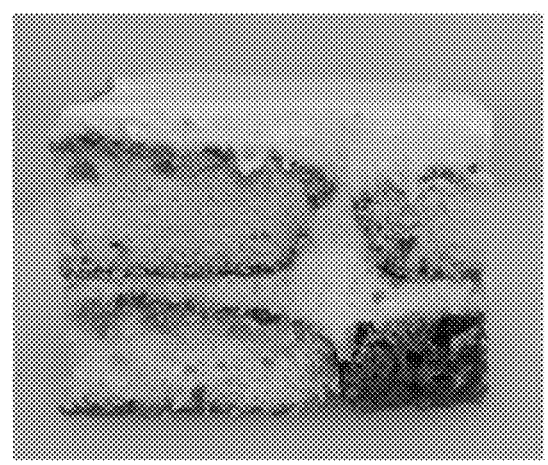
FIG. 18 shows a food product comprising mascarpone cream as an oligosaccharide-containing phase and lady finger cookies as a sugar-containing phase according to aspects of the disclosure.

Tiramisu was made as follows:
1. Coffee-soaked lady fingers (second phase)
   a. 1 cup espresso was stirred with 2 tbsp rum.
   b. 8 sugar-containing lady fingers were dipped into the rum-espresso mixture and then arranged in a single layer on the bottom of a dish.
2. Mascarpone cream (first phase)
   a. 3 eggs were whisked with 35 g of an oligosaccharide mixture, as described above, comprising xylo-oligosaccharides (primarily xylo-oligosaccharides with a DP from two to eight), cello-oligosaccharides (primarily cellobiose), and microcrystalline cellulose in a ratio of 9:8:3, respectively.
   b. The mixture was placed over a bain-marie and whisked for an additional 9-10 minutes on low heat until it adopted a lighter color and slightly thickened. The mixture was then allowed to cool.
   c. 225 g mascarpone and 2 tbsp rum were first beaten together, then whisked into the egg/oligosaccharide mixture until well incorporated to form a mascarpone cream.
   d. 218 g whipping cream was beaten until medium peaks began to form. Half of the whipped cream was folded into the mascarpone cream. The remaining half of the whipped cream was then blended into the mascarpone cream until just incorporated to avoid overfolding.
3. Half of the cream was spread over the layer of lady fingers. Then, 8 more lady fingers were dipped in the rum-espresso mixture and laid on top, and the remaining mascarpone cream was used to cover the new layer of lady fingers. The resultant tiramisu was refrigerated overnight before finally being dusted with cocoa powder.
4. The tiramisu had a rich, creamy, and slightly sweet mascarpone cream layered between sweet, coffee-soaked lady finger biscuits. The sweetness of the sugar containing lady fingers enhanced the sweetness of the product. The resultant tiramisu is shown in FIG. 18.

The lady fingers were disposed within the mascarpone cream, so that while the outside of the tiramisu appeared uniform, the inside was streaked with soft, melty ladyfingers and velvety mascarpone cream. While the volume of the tiramisu was primarily comprised of mascarpone cream, the denser and sweeter ladyfingers provided a pleasant balance of rum/coffee flavor notes.

Example 19—Raspberry Custard

Figure 19:
FIG. 19 shows a food product comprising custard as an oligosaccharide-containing phase and raspberries as a sugar-containing phase according to aspects of the disclosure.

Raspberry custard was made as follows:
1. Custard (first phase)
   a. 3 egg yolks were whisked together with 30 g of an oligosaccharide mixture, as described above, comprising xylo-oligosaccharides (primarily xylo-oligosaccharides with a DP from two to eight), cello-oligosaccharides (primarily cellobiose), and microcrystalline cellulose in a ratio of 9:8:3, respectively.
   b. 200 ml double cream, 100 ml whole milk, and 20 g vanilla bean paste were heated gently with occasional stirring in a separate saucepan until the mixture was just below its boiling point.
   c. ½ cup of the warm cream mix was whisked into the egg/oligosaccharide mixture. The new egg/oligosaccharide mixture was then gradually added into the saucepan with the remainder of the cream mixture, and stirred over gentle heat until it reached a desired thickness.
   d. Raspberries (second phase) were then added on top of the cup.
2. The resultant custard was pale yellow in color and had a smooth, sweet, and rich profile. The raspberry topping added a sharp hit of sweetness and a fruity flavor which enhanced the overall sweetness of the product. The raspberry custard is shown in FIG. 19.

The raspberries, which were nonuniformly dispersed on top of the custard, provided a delicate and tender texture that complimented the smooth, creamy texture of the custard. The higher density and sweetness of the raspberries was balanced by the larger amount (by volume) of custard, so that the flavors of both phases were readily discernible.

Example 20—Panna Cotta With Caramel Syrup

Panna cotta with caramel syrup was made as follows:
1. Panna cotta (first phase)
   a. 25 g powdered gelatin was sprinkled into 40 ml of cold water, forming a gelatin mix. Once formed, the gelatin mix was allowed to sit for 20 minutes.
   b. 300 ml single cream and 200 ml whole milk were gently heated in a saucepan just below the boiling point.
   a. 60 g of an oligosaccharide mixture, as described above, comprising an oligosaccharide mixture comprising xylo-oligosaccharides (primarily xylo-oligosaccharides with a DP from two to eight), cello-oligosaccharides (primarily cellobiose), and microcrystalline cellulose in a ratio of 9:8:3, respectively, and 15 g caster sugar were then added to the cream. The resultant mixture was removed from the heat.
   c. The gelatin mix was then stirred into the cream/oligosaccharide mixture. The product was divided across 4 ramekins and allowed to stand for 10 minutes before chilling in the fridge.

Figure 20:
FIG. 20 shows a food product comprising panna cotta as an oligosaccharide-containing phase and caramel syrup as a sugar-containing phase according to aspects of the disclosure.

2. Each ramekin of panna cotta was topped with 20 ml caramel syrup (second phase).
3. The resultant panna cotta was a sweet, set cream with a smooth, jelly-like texture, and yellow coloring. The sweetness of the oligosaccharide mixture in the panna cotta was enhanced by the addition of the caster sugar and caramel syrup, which boosted the overall sweetness of the product. An example of the panna cotta product is shown in FIG. 20.

While the panna cotta was considerably less sweet and dense than the caramel syrup, the volume of caramel syrup coating portions of the surface of the panna cotta was small compared to the volume of the panna cotta. Accordingly, the smooth, jelly-like panna cotta was not masked by the denser, thicker caramel layer, but nicely mixed with the caramel to provide a sweet, multifaceted flavor profile.

Example 21—Chocolate Chip Vanilla Ice Cream

Figure 21A:
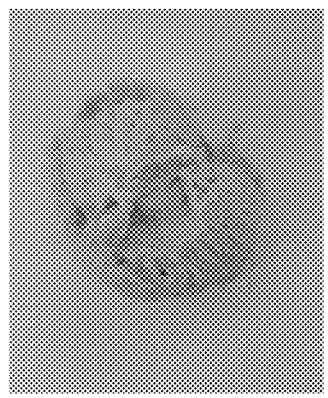
FIG. 21A shows ice cream that was made with oligosaccharides according to aspects of the disclosure.
Figure 21B:
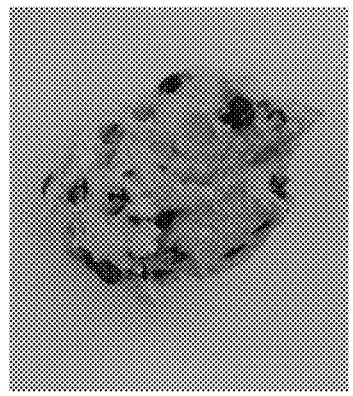
FIG. 21B shows a food product comprising ice cream as an oligosaccharide-containing phase and chocolate chips as a sugar-containing phase according to aspects of the disclosure.

Chocolate chip vanilla ice cream was made as follows:
1. Vanilla ice cream (first phase)
   a. 3 egg yolks, 25 ml whole milk, and 52 g of an oligosaccharide mixture, as described above, comprising an oligosaccharide mixture comprising xylo-oligosaccharides (primarily xylo-oligosaccharides with a DP from two to eight), cello-oligosaccharides (primarily cellobiose), and microcrystalline cellulose in a ratio of 9:8:3, respectively, were whisked together, and then left for 15 minutes to hydrate.
   b. 75 ml whole milk, 200 ml double cream, and 15 g vanilla bean paste were gently heated in a saucepan until near boiling.
   c. The egg/oligosaccharide mixture was then whisked into the cream mixture along with 1 tsp corn flour. Whisking continued until the product was smooth and frothy.
   d. The resultant mixture was transferred into a clean saucepan and heated until thickened, carefully keeping the mixture below boiling.
   e. The mixture was left to cool before stirring in 40 g chocolate chips (second phase, optional) and 20 ml vodka.
   f. The mixture was then churned in an ice cream maker for 15 minutes until resembling double cream. The product was transferred into a container and frozen overnight.
2. The resultant ice cream was creamy white in color, with visible flecks of vanilla bean, and a smooth, short consistency that allowed for easy scooping. The creamy vanilla flavor was accented by a slight sweetness. The sweetness and vanilla flavor were boosted by the inclusion of chocolate chips, which were dispersed nonuniformly throughout the ice cream. FIG. 21A shows the ice cream product without chocolate chips, while FIG. 21B shows the ice cream product interspersed with chocolate chips.

When present, the chocolate chips were nonuniformly dispersed throughout the ice cream and comprised a lesser percentage of the volume of the food product. Nonetheless, their higher density, sweetness, and hardness complimented the soft, creamy, less sweet ice cream.

Example 22—Chocolate Chip Shortbread

Figure 22:
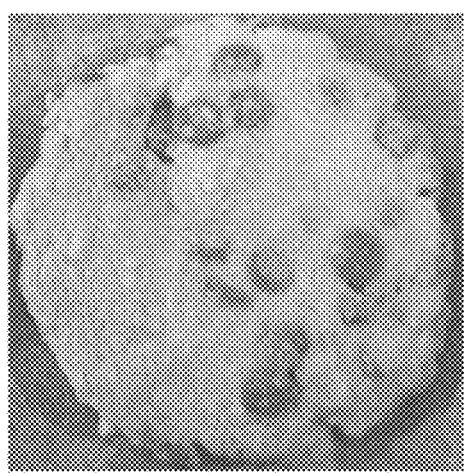
FIG. 22 shows a food product comprising a cookie (biscuit) as an oligosaccharide-containing phase and chocolate chips as a sugar-containing phase according to aspects of the disclosure.

Chocolate chip shortbreads were made as follows:
1. Shortbread dough (first phase)
   a. 100 g butter was creamed with 50 g of an oligosaccharide mixture comprising xylo-oligosaccharides (primarily xylo-oligosaccharides with a DP from two to eight), cello-oligosaccharides (primarily cellobiose), and microcrystalline cellulose in a ratio of 15:2:3, respectively.
   b. 100 g plain flour was then added to the butter/oligosaccharide mixture to form breadcrumbs.
   c. The breadcrumbs were combined with 1 tsp vanilla extract and mixed to form a dough, which was then refrigerated for 20 minutes.
2. 50 g milk chocolate chips (second phase) were then kneaded into the dough.
3. The dough was rolled and cut into shapes which were then baked for 10 minutes at 175° C.
4. The resultant shortbreads were pale beige in color with dark chocolate chips nonuniformly dispersed throughout and smooth surfaces. The products were short and crumbly with good snap and would melt in the mouth. The chocolate chips added a hint of rich sweetness that complimented the delicate vanilla flavor of the shortbreads. There was no noticeable difference between the chocolate chip shortbreads made with the 15:2:3 ratio of xylo-oligosaccharides, cello-oligosaccharides, and microcrystalline cellulose, and the shortbreads made with the 9:8:3 ratio. An example of a shortbread product is shown in FIG. 22.

The denser, sweeter chocolate chips were nonuniformly dispersed throughout the lighter, less sweet shortbreads. Even though the chocolate chips were a minor percent of the volume of the shortbreads, their hard, crunchy textures paired nicely with the crumbly, melty textures of the shortbreads.

Example 23—Comparison of Chocolate Chip Muffins

Two sets of chocolate chip muffins (Muffin 1 and Muffin 2) were created according to the recipes described in Table 6 below.
1. 105.8 g of an oligosaccharide mixture comprising xylo-oligosaccharides (primarily xylo-oligosaccharides with a DP from two to eight), cello-oligosaccharides (primarily cellobiose), and microcrystalline cellulose in a ratio of 15:2:3, respectively and 105.8 g room temperature butter were combined. For muffin set 2 only, 15 g cane sugar was also combined.
2. 94.6 g eggs and 9 g vanilla extract were mixed in.
3. 74.3 g self-rising flour and 2.3 g baking powder (dry ingredients) were separately combined.
4. Wet ingredients (combined oligosaccharide mixture, butter, eggs, and vanilla) were added to dry ingredients.
5. Mixture from "4" was beaten together for 30 seconds or until smooth batter was obtained.
6. 60 g chocolate chips were folded in.
   a. Chocolate used for muffin set 1: 37% cocoa solids; 24% milk solids; 46% monosaccharides and disaccharides, of which 37% sucrose.
   b. Chocolate used for muffin set 2: 40% cocoa solids; 14% milk solids; 44% saccharide mixture; 22% monosaccharides and disaccharides, of which 0% sucrose.
7. Oven was preheated to 170° C. (fan).
   a. 50 g of batter was scooped into cupcake cases.
   b. Batter was baked for 16 minutes.

Eight individuals tasted the muffins blind and were asked which was sweeter. Two tasters thought Muffin 1 (sucrose in the chocolate) was sweeter. Five tasters thought Muffin 2 (sucrose in the batter) was sweeter. One taster thought the sweetness of Muffin 1 and the sweetness of Muffin 2 were the same. Results indicated that with the same amount of sucrose in muffins, higher sweetness level can be perceived when sucrose is evenly distributed throughout the muffin batter compared to when sucrose is present only in the chocolate pieces (chips).

TABLE 6

Final Composition Calculations

| Ingredient | Muffin 1 (g) | Muffin 2 (g) |
|---|---|---|
| Oligosaccharide mixture | 105.8 | 105.8 |
| Sucrose | 0 | 15 |
| Unsalted butter | 105.8 | 105.8 |
| Eggs | 94.6 | 94.6 |
| Self-rising flour | 74.3 | 74.3 |
| Baking powder | 2.3 | 2.3 |
| Vanilla extract | 9 | 9 |
| Chocolate | 60 | 60 |
| TOTAL | 451.8 | 466.8 |
| Total sucrose | 22.08 | 15 |
| Total mono/disaccharides | 62.51 | 63.11 |

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

What is claimed is:

1. A foodstuff having a reduced caloric content, the foodstuff comprising:
   a. a first phase comprising one or more ingredients; wherein at least one of the one or more ingredients is a sweetener; and
   b. a second phase comprising cello-oligosaccharides with a degree of polymerization (DP) from two to six, xylo-oligosaccharides with a DP from two to twelve and polysaccharides, wherein the first phase and the second phase comprise at least one physical difference between the first phase and the second phase, the physical difference selected from the group consisting of: color, texture, average density, and combinations thereof, the second phase comprises at least 5% by dry weight of the xylo-oligosaccharides and the cello-oligosaccharides, a weight ratio of cello-oligosaccharides to xylo-oligosaccharides in the foodstuff is 5:95 to 95:5, wherein the cello-oligosaccharides and xylo-oligosaccharides replace a monosaccharide and/or a disaccharide sweetener in the foodstuff resulting in the foodstuff having a reduced caloric content compared to a full-sugar foodstuff, wherein the foodstuff having a reduced caloric content has a perceived sweetness that is about equal to the full-sugar foodstuff comprising the monosaccharide and/or disaccharide sweetener.

2. The foodstuff of claim 1, wherein the second phase further comprises a monosaccharide, a disaccharide, or a combination thereof.

3. The foodstuff of claim 1, wherein the second phase further comprises a sugar alcohol and/or a high intensity sweetener.

4. The foodstuff of claim 1, wherein the second phase is non-uniformly dispersed in the first phase.

5. The foodstuff of claim 1, wherein the foodstuff is a baked good or a dessert composition.

6. The foodstuff of claim 4, wherein the first phase is a bakery composition, and the second phase is a fat-based composition.

7. The foodstuff of claim 5, wherein the first phase is a fat-based composition.

8. The foodstuff of claim 7, wherein an average density of the first phase is less than an average density of the second phase.

9. The foodstuff of claim 1, wherein the second phase comprises by-products of a browning reaction.

10. The foodstuff of claim 1, wherein the foodstuff comprises at least 1% w/w of the cello-oligosaccharides and the xylo-oligosaccharides.

11. The foodstuff of claim 1, wherein the foodstuff comprises less than 15% w/w of the polysaccharides.

12. A method of preparing a foodstuff having a reduced caloric content, the method comprising:
   a. providing a first phase comprising one or more ingredients; wherein at least one of the one or more ingredients is a sweetener;
   b. providing a second phase comprising cello-oligosaccharides with a degree of polymerization (DP) from two to six, xylo-oligosaccharides with a DP from two to twelve and polysaccharides;
   c. mixing, combining, and/or coating the first phase and the second phase with one another to non-uniformly distribute the second phase in the first phase;
   wherein the first phase and the second phase comprise at least one physical difference between the first phase and the second phase, the physical difference selected from the group consisting of: color, texture, average density, and combinations thereof, the second phase comprises at least 5% by dry weight of the xylo-oligosaccharides and the cello-oligosaccharides, a weight ratio of cello-oligosaccharides to xylo-oligosaccharides in the foodstuff is 5:95 to 95:5, wherein the cello-oligosaccharides and xylo-oligosaccharides replace a monosaccharide and/or a disaccharide sweetener in the foodstuff resulting in the foodstuff having a reduced caloric content compared to a full-sugar foodstuff, wherein the foodstuff having a reduced caloric content has a perceived sweetness that is about equal to the full-sugar foodstuff comprising the monosaccharide and/or disaccharide sweetener.

13. The method of claim 12, wherein the second phase further comprises a monosaccharide, a disaccharide, or a combination thereof.

14. The method of claim 12, wherein the second phase further comprises a sugar alcohol and/or a high intensity sweetener.

15. The method of claim 12, wherein the foodstuff comprises less than 15% w/w of the polysaccharides.

16. The foodstuff of claim 1, wherein the foodstuff has a color that is about equal to the full-sugar foodstuff.

17. The foodstuff of claim 1, wherein a perceived texture of the foodstuff is similar to a perceived texture of the full-sugar foodstuff.

18. The foodstuff of claim 1, wherein the second phase is substantially free of fructose, galactose, sucrose, maltose, and lactose.

* * * * *